United States Patent [19]

Willetts

[11] Patent Number: 5,010,495

[45] Date of Patent: Apr. 23, 1991

[54] INTERACTIVE LANGUAGE LEARNING SYSTEM

[75] Inventor: John A. Willetts, Kensington, Md.

[73] Assignee: American Language Academy, Rockville, Md.

[21] Appl. No.: 305,223

[22] Filed: Feb. 2, 1989

[51] Int. Cl.$^5$ .............................................. G10L 5/00
[52] U.S. Cl. ................... 364/513.5; 364/900; 364/419
[58] Field of Search ...... 364/513.5, 419, 900 MS File

[56] References Cited

U.S. PATENT DOCUMENTS

| | | | |
|---|---|---|---|
| 4,403,965 | 9/1983 | Hawkins . | |
| 4,421,487 | 12/1983 | Laughon et al. . | |
| 4,457,719 | 7/1984 | Dittakavi et al. . | |
| 4,549,867 | 10/1985 | Dittakavi . | |
| 4,579,533 | 4/1986 | Anderson et al. . | |
| 4,582,441 | 4/1986 | Carter | 364/513.5 |
| 4,591,929 | 5/1986 | Newsom . | |
| 4,627,001 | 12/1986 | Stapleford | 364/513.5 |
| 4,695,962 | 9/1987 | Goudie . | |
| 4,710,877 | 12/1987 | Ahmed . | |
| 4,749,353 | 6/1988 | Breedlove . | |
| 4,769,846 | 9/1988 | Simmons . | |
| 4,829,576 | 5/1989 | Porter | 364/513.5 |
| 4,831,654 | 5/1989 | Dick | 364/513.5 |

OTHER PUBLICATIONS

Parham, "Computers That Talk", *Classroom Computer Learning* (Mar. 1988) pp. 26–36, 63.
Antex Electronics Product Brochures, Model VP-620E.
Brower, "Word Torture Eases Pain of Language Learning", *MacWEEK* (Nov. 29, 1988) p. 14.
Barbour, "Computerized Speech: Talking Its Way Into the Classroom", *Electronic Learning* (Jan. 1987) pp. 15–16.
Jack, "Worte & Saltz: A German Tutor For Kids Or Adults", 2 *Color Computer Magazine* No. 3, p. 20 (May 1984).
MacEnglish ™ Learning Systems, Questions and Answers, 4 pages, Proficiency, 185 South State, Suite 950, Salt Lake City, Utah 84111, 1990.
Pronunciation Plus: More Than Just a Pronunciation Guide, Brochure, 4 pages, Proficiency, Salt Lake City, Utah, 1990.
MacEnglish ™ Sound Center, Leaflet, 1 page, Proficiency, Salt Lake City, Utah 1990.
WorkBase, Leaflet, 1 page, Proficiencey, Salt Lake City, Utah, 1990.
Executive English: Communication Behind the Doors (List continued on next page.)

*Primary Examiner*—Emanuel S. Kemeny
*Attorney, Agent, or Firm*—Nixon & Vanderhye

[57] ABSTRACT

An interactive computer assisted language learning system which allows a student to select a model phrase from text displayed on an electronic display; record (in digitized form) his own pronunciation of that phrase; and instantly listen to the digitized vocal version of the selected phrase and his own recorded pronunciation for comparison purposes. An audio CLIP mode permits the student to select any (random) portion of displayed text (e.g., a phrase, a small part of a phrase, a single word, a syllable, or a phoneme) using cursor control or the like and to control the system to play the voice corresponding to that selected portion. A SoundSort text reconstruction exercise based on aural clues automatically randomizes the order of plural phrases, provides digitized utterances of the phrases in the randomized order, and requires the student to reconstruct the original order using a visual display interface. Integration of digitized sound in a high-level authoring system (as distinct from an authoring language) is provided. An easy-to-use "WYSIWYG" ("What you see is what you get") user interface reduces or eliminates user mistakes and associated frustration and does not require the user to have any programming ability. An extremely flexible authoring system allows a teacher to link recorded digitized sound with customized on-screen text (which may but need not match the digitized sound). This allows a wide variety of free-form exercises to be created.

25 Claims, 39 Drawing Sheets

OTHER PUBLICATIONS of Corporate America, Brochure, 4 pages, Profficiency, Salt Lake City, Utah, 1990.

Inform: An English-Teaching Magazine and More, Brochure, 4 pages, Proficiency, Salt Lake City, Utah, 1990.

Pronunciation Plus, TESOL Questionnaire, 4 pages, 1990.

Executive English, TESOL Evaluation, 4 pp, 1990; and INFORM, TESOL Questionnaire, 6 pages, 1990.

Price List, Intechnical Learning Systems, Inc., Leaflet, 1 page, ILSI TM 2801 Parklawn, Suite 402, P.O. Box 30877, Midwest City, OK 73140, Feb. 1988.

01888609 Intechnica Marketing New Voice Technology, *Journal Record*, Oklahoma City, OK, Press Release, p. 2, Mar. 9, 1988.

01981129 Intechnica Acquires $1.7 Million Contract, *Journal Record*, Oklahama City, OK, Press Release, p. 3, Jul. 2, 1988.

Cook, "Hardware Review: Crystal Clear Speech—And In Any Langauage," *Micro User*, vol. v1, Issue No. 11, p. 77, Jan. 1984; and A Remarkable Aid for Teachers of English As a Second Language, Brochure, 8 pages, ILSI TM Intechnical Learning Systems, Inc., 2801 Parklawn, Suite 402, P.O. Box 30877, Midwest City, OK 73110, 1987.

SpeechNet Brochure entitled "LET'S Talk About an Affordable Language Lab" published by Wordware Publishing Inc.

Brochure entitled "Lessonade" published by Wordware Publishing Inc.

"Ready, Set Go" advertisement published by Wordware Publishing Inc.

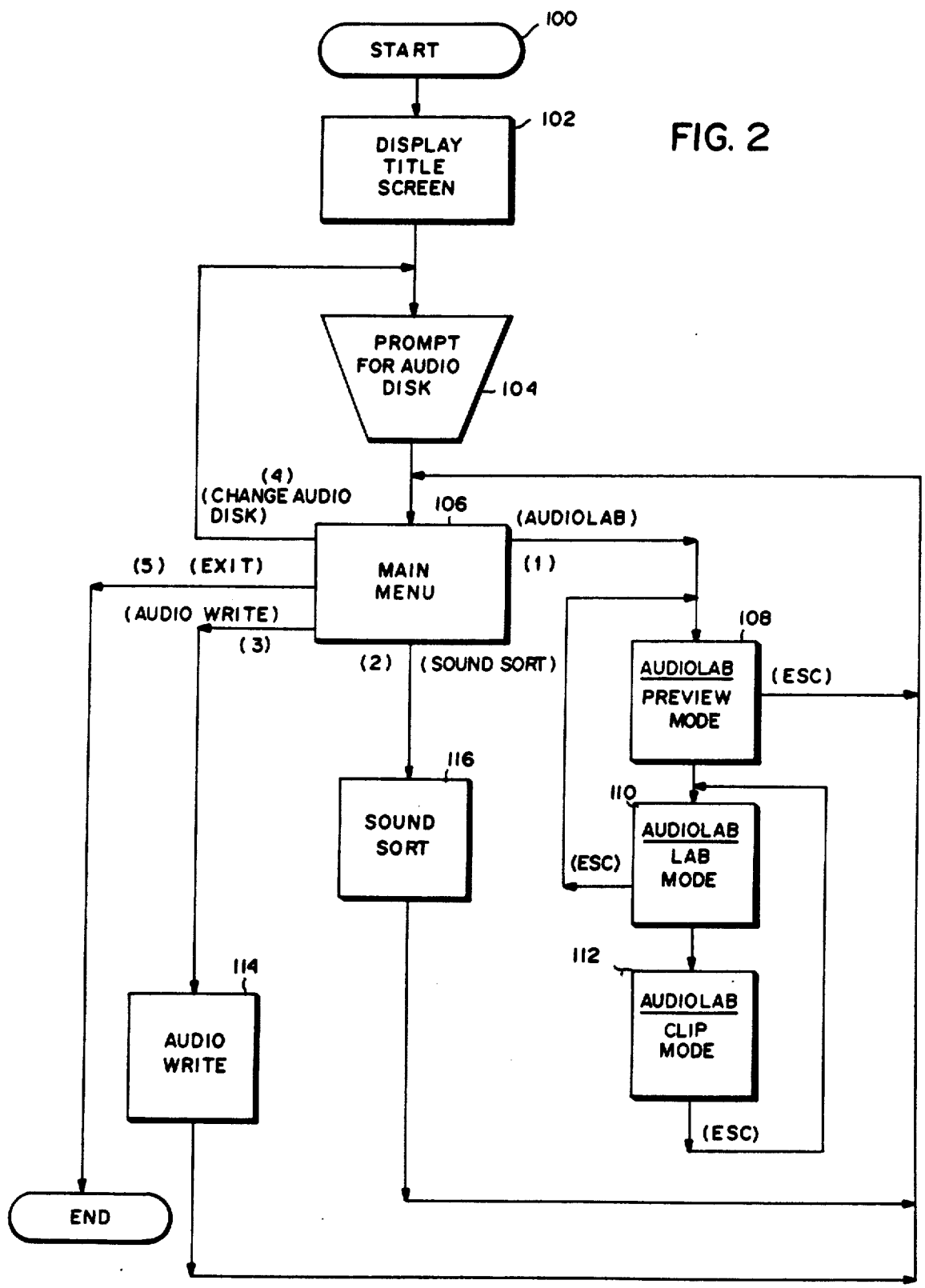

FIG. 3A
PREVIEW MODE - LISTEN TO ENTIRE TEXT
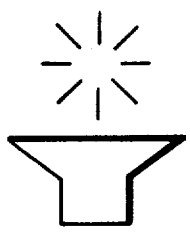
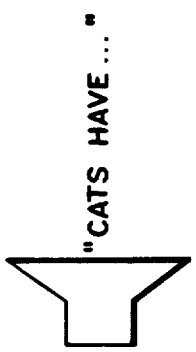
1
PRESS F7 TO TURN WRITTEN TEXT OFF AND ON
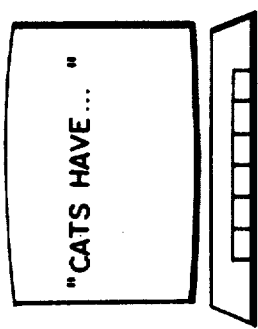
"CATS HAVE..."
2
PRESS F2 TO LISTEN
"CATS HAVE..."
3
PRESS ESC TO STOP LISTENING
PRESS ↑↓ TO CHANGE VOLUME
PRESS ESC TO RETURN TO MAIN MENU
PRESS ENTER TO GO TO LAB MODE

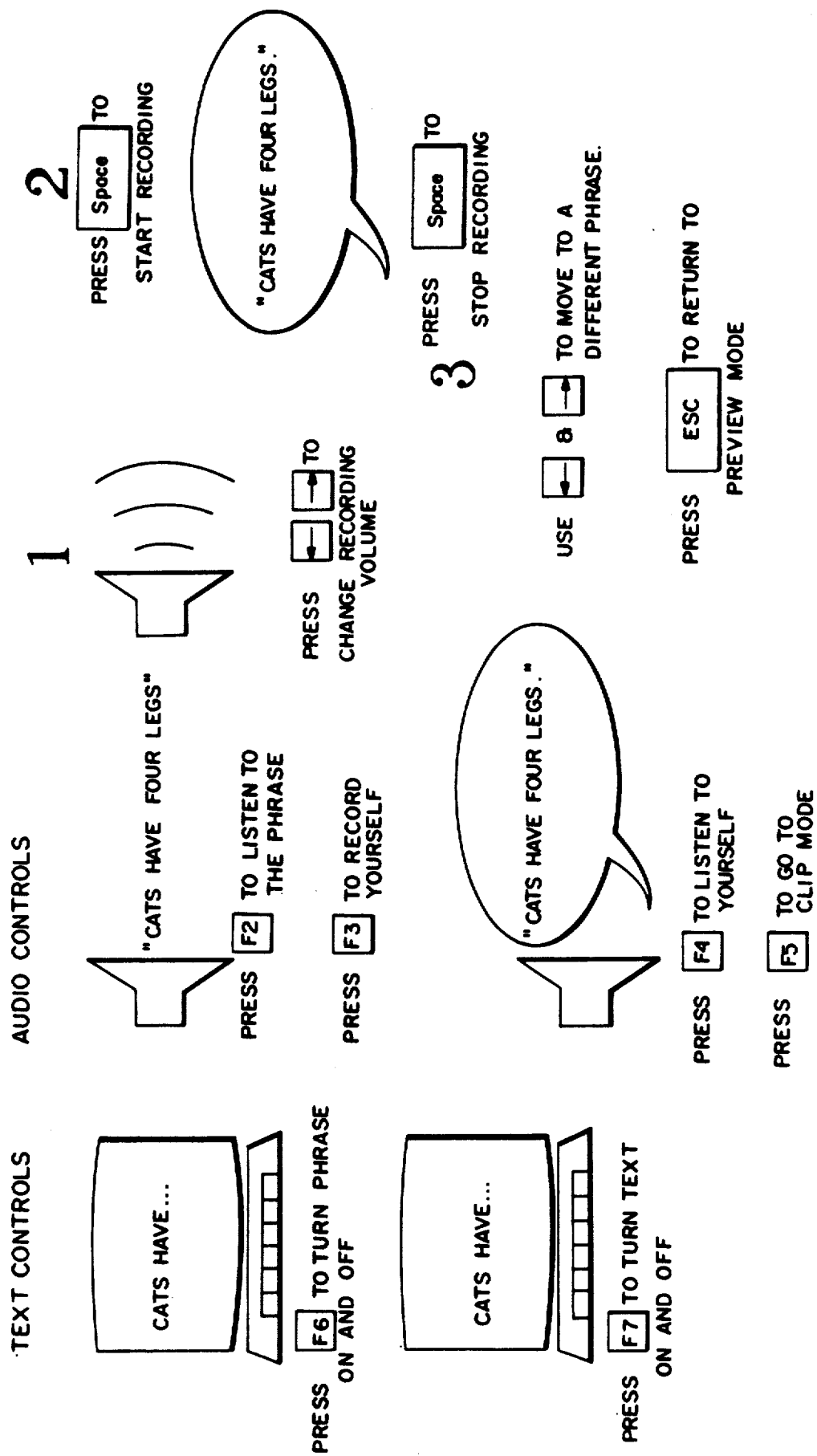

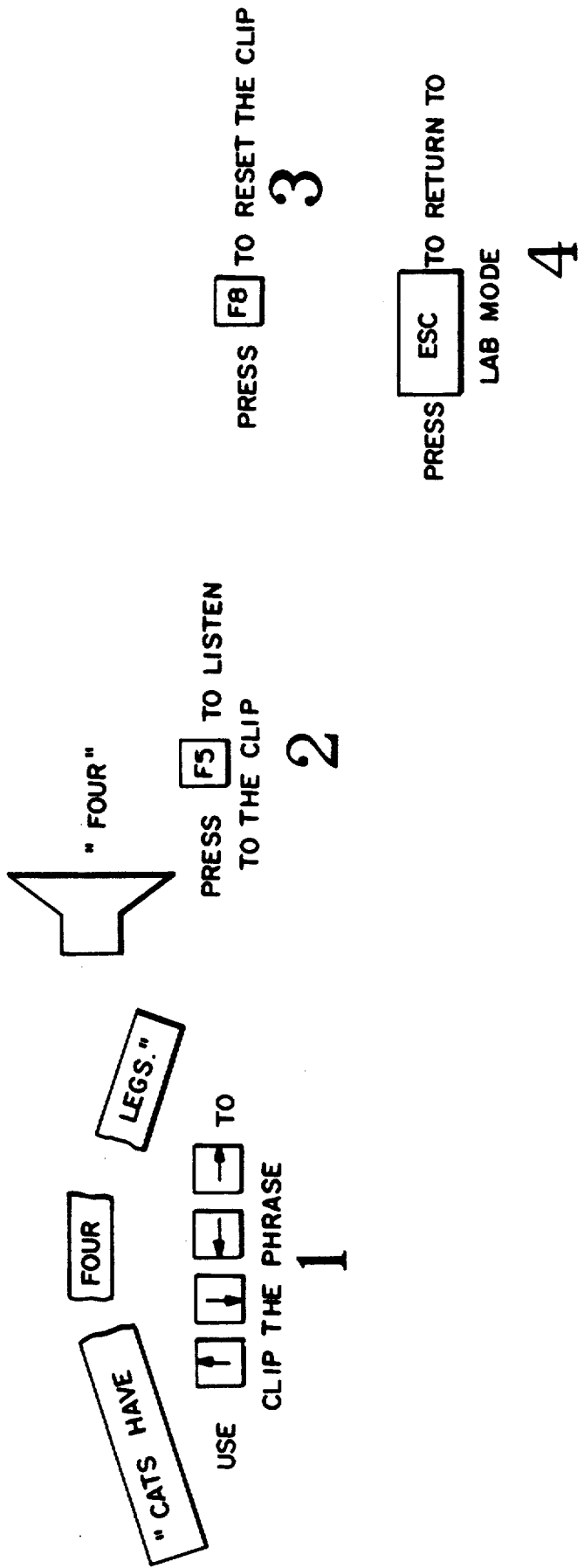

FIG.5
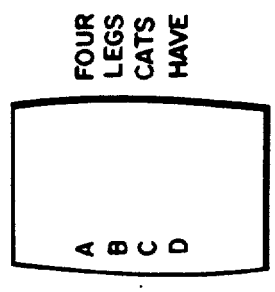
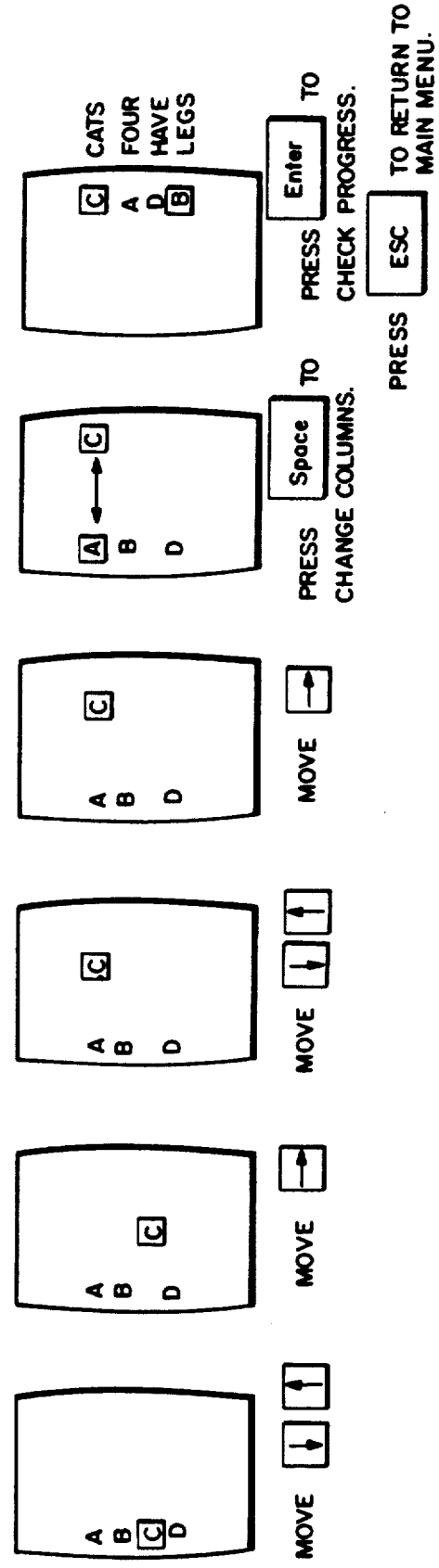

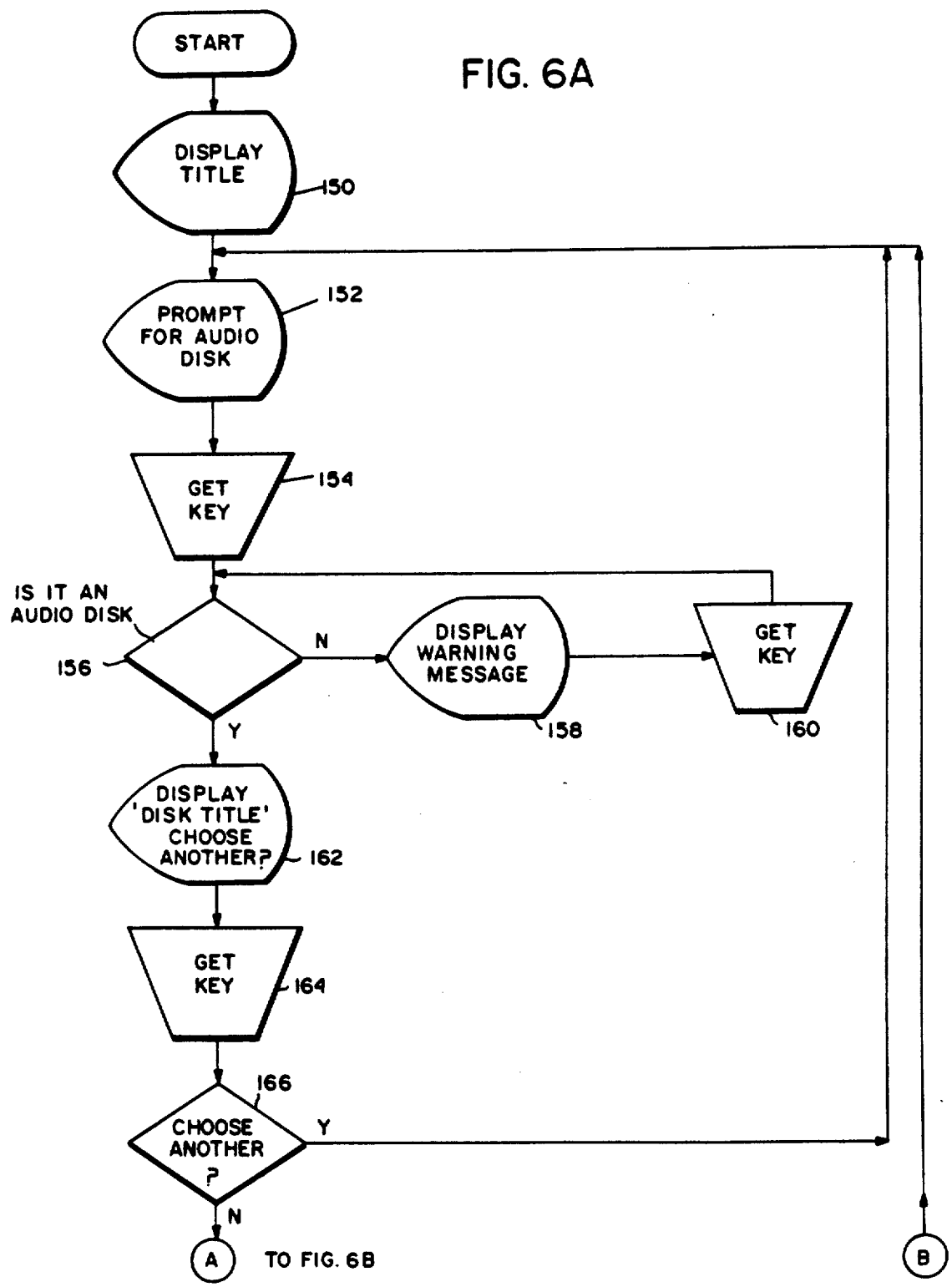

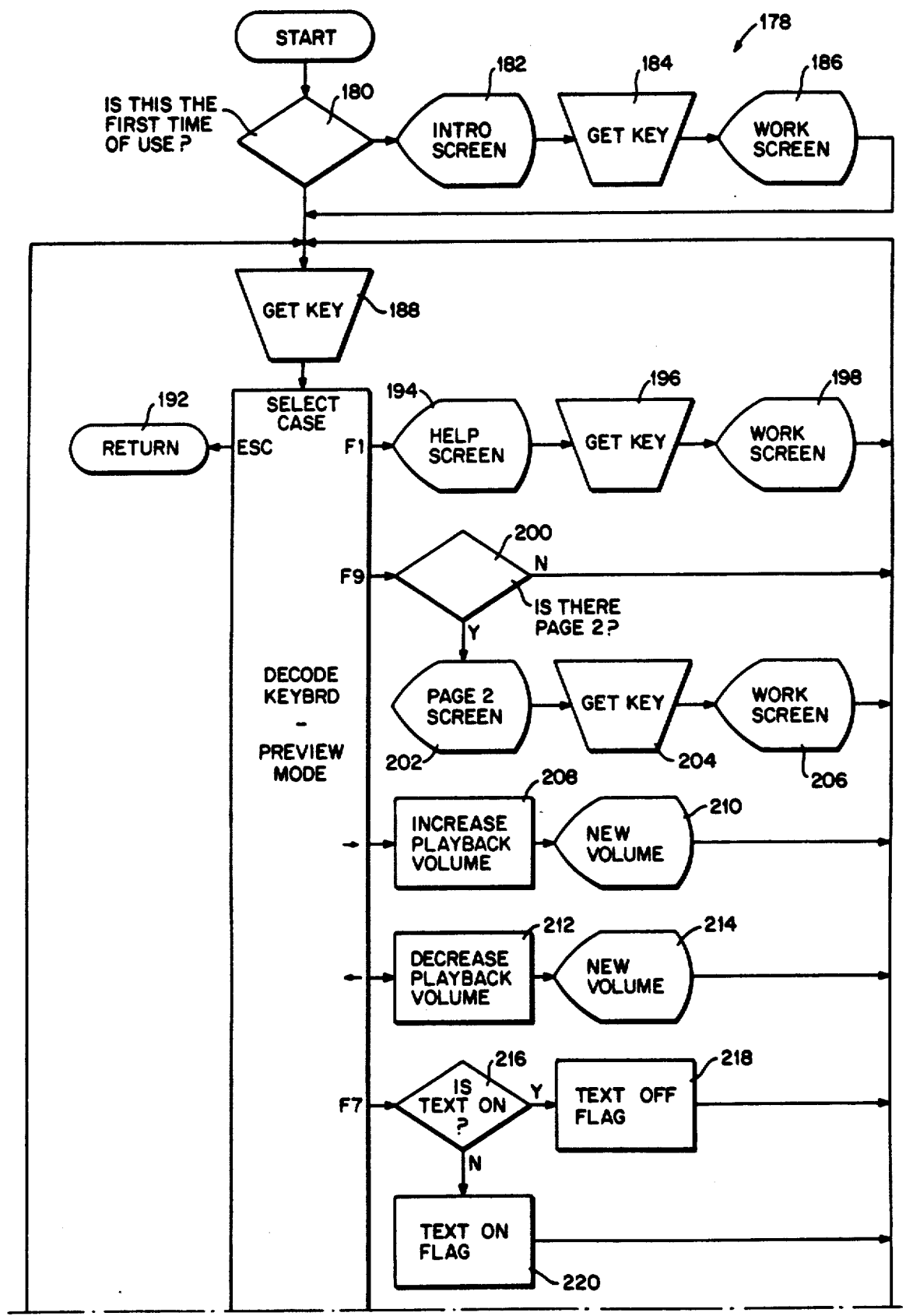
FIG. 7A          TO FIG. 7B

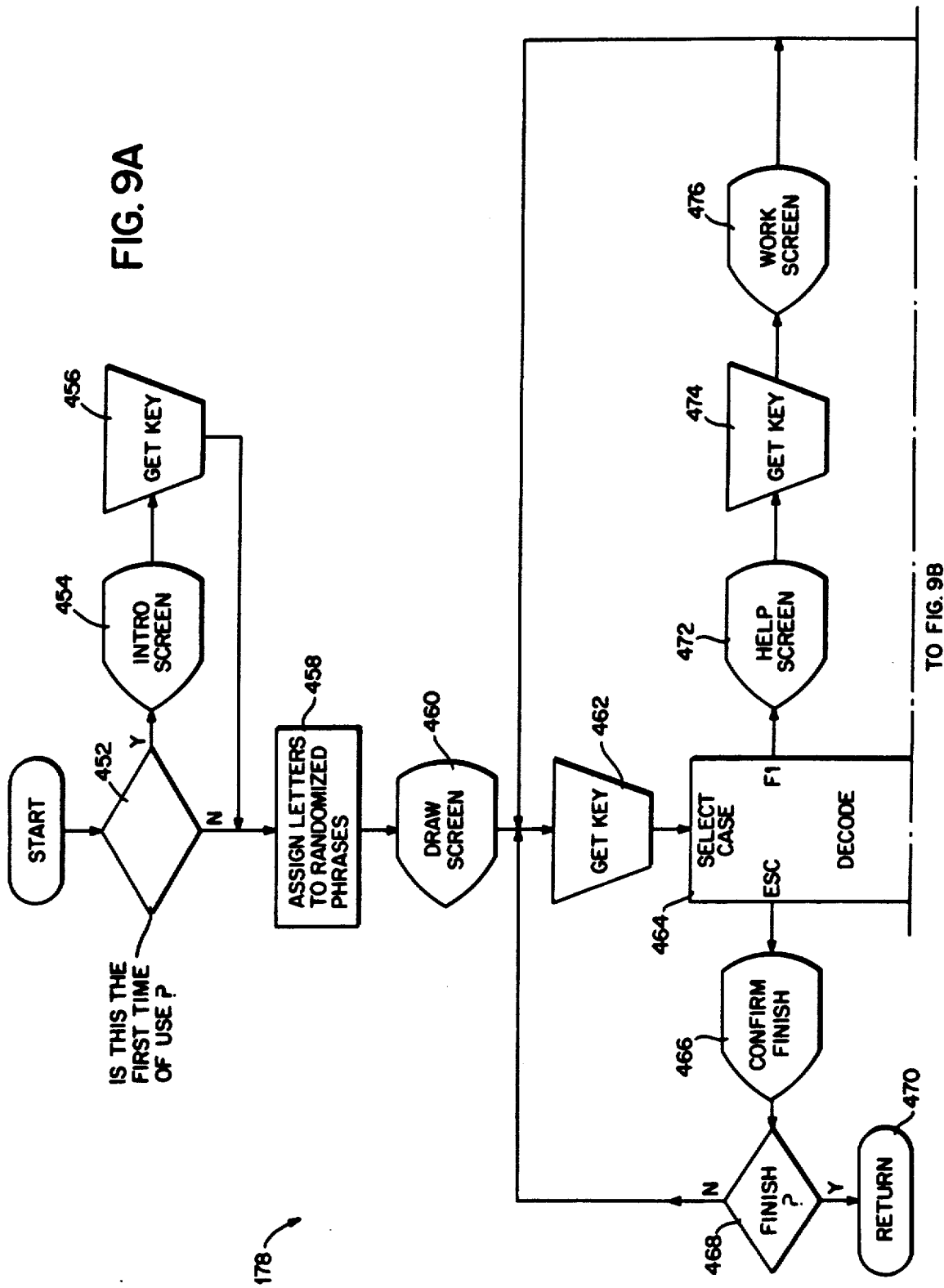

TO FIG. 15B

INTERACTIVE LANGUAGE LEARNING SYSTEM

FIELD OF THE INVENTION

The invention relates to computer systems with speech capabilities. More particularly, the invention pertains to a computerized interactive language learning system which provides visual text displays and associated digitized audio speech.

BACKGROUND AND SUMMARY OF THE INVENTION

As communications and high speed transportation continue to make our world seem smaller, knowing a second language becomes more important and valuable. Unfortunately, traditional language instruction in the classroom by itself generally does not, due to time constraints, sufficiently immerse the student in the second language he or she is studying to ensure rapid learning.

While written materials (e.g., textbooks, workbooks, and the like) provide some opportunity for the student to study by himself, written materials cannot effectively assist the student in pronunciation and other aural aspects of language learning. Although some written language study materials are accompanied by prerecorded audio tapes or records allowing the student to listen to the language being spoken, even these prerecorded audio materials have the disadvantage that they cannot provide the student with feedback about his or her pronunciation. In the past, the only way to obtain effective spoken language drills and practice outside of the classroom environment was to hire a language tutor (an expensive proposition) or to spend time with someone who was already fluent in the unfamiliar language.

The concept of using computer hardware/software to provide synthesized or digitized spoken language is generally known. The following is a somewhat representative (but by no means exhaustive) listing of prior publications, prior issued U.S. patents, and published software packages relating to computer-assisted language learning with speech capabilities:

U.S. Pat. No. 4,579,533 to Anderson et al;
U.S. Pat. No. 4,591,929 to Newsom;
U.S. Pat. No. 4,749,353 to Breedlove;
U.S. Pat. No. 4,695,962 to Goudie;
U.S. Pat. No. 4,710,877 to Ahmed;
Brower, "Word Torture Eases Pain Of Language Learning", 2 *MacWEEK* n.48, p. 14 (29 Nov. 1988);
Parham, "Computers That Talk", 8 *Classroom Computer Learning* n. 6, pp. 26–36, 63 (March 1988);
Jack, "Worte & Satze: A German Tutor For Kids Or Adults", 2 Color Computer Magazine n.3, p. 20 (May 1984);
Barbour, "Computerized Speech: Talking Its Way Into The Classroom", 6 *Electronic Learning*, n.4, p. 15 (Jan 1987);
PEAL SOFTWARE (Los Angeles, Calif.), "Representational Play", "Keytalk", and "Exploratory Play" software packages;
"E Z Pilot II Authoring System" software by Hartley Courseware, Inc., Dimondale, Mich.;
"Smoothtalker Version 2.0" software by First Byte Inc.;
"Experlogo-Talker/Prologo" software by Experintelligence, Inc.;
"Voice Master Version 4.0" system by Covox Inc.

"Basic Language Series—Spatial Concepts" by Science Research Association;
"Talking Text Writer" and "Talking Text Speller" software published by Scholastic Inc., Jefferson City, Mo.;
"Reading Skills Development Program" software available from American Educational Computer, Inc., Oklahoma City, Okla.;
"Writing To Read" by International Business Machines;
"Language Experience" software series from Teacher Support Software, Gainesville, Fla.; and
Houghton Mifflin's "Listen and Learn" series, Houghton Mifflin Educational Software Division, Hanover, N.H.

Additional patents generally relating to learning aids with speech synthesizers include:

U.S. Pat. No. 4,769,846 to Simmons;
U.S. Pat. No. 4,403,965 to Hawkins;
U.S. Pat. No. 4,421,487 to Laughon et al;
U.S. Pat. No. 4,457,719 to Dittakavi et al; and
U.S. Pat. No. 4,549,867 to Dittakavi.

The Anderson et al '533 patent cited above discloses a microprocessor based electronic teaching aid which enables the student viewing a display to designate any word or portion of text for vocalization by synthesized speech techniques. The "reading" material provided by the system is stored in a preprogrammed (fixed) source. Read only memory. Pointers are used to point to the start addresses for the words. Mass storage devices are avoided in favor of semiconductor ROM memory. Speech data is stored in the memory as individual words in a dictionary. No facility for inputting digitized student utterances into the system is provided.

U.S. Pat. No. 4,591,929 to Newsom teaches a second language learning system connected to a magnetic tape recorder. An electronic interface controls the tape recorder functions. The last phrase played back by the tape recorder is converted into digital form and stored in an electronic store to permit the student to reproduce the phrase as many times as desired without having to rewind the tape. The student can also record his own voicing of a phrase in a different portion of the electronic store and can then selectively reproduce the teaching phrase or his response—re-recording his voicing until satisfied.

U.S. Pat. No. 4,710,877 to Ahmed discloses a computer-based language learning system including a speech synthesis capability using linear predictive coding. A menu driven student interface is used to step a student through preprogrammed lessons featuring visual and synthesized speech stimulae.

U.S. Pat. No. 4,695,962 to Goudie teaches a system which attempts to increase the naturalness of synthesized speech produced from linear predictive encoded speech data by substituting different data depending upon whether words are reproduced in isolation in a word mode or together with other words in a phrase mode.

The Breedlove '353 patent discloses a hand-held microprocessor based system that converts student utterances into digital form and allows the student to store the digitized utterances in memory associated with student inputted text such as correct word spelling.

The "Word Torture" software program referenced above is another example of a computer-assisted language learning system. This program, published by Hyperglot Software Co. of Knoxville, Tenn., is designed to run on an Apple MacIntosh personal computer equipped with a "Hypercard" programmable database which supports digitized and synthesized sound. Foreign language study stacks provide automated vocabulary drills that work from English to a foreign language or vice versa, and permit users to adjust interval times and add new words. The system also provides digitized pronunciations of foreign language alphabets.

Other systems (including the Scholastic Software "Talking Text Writer" program) are essentially talking word processors with speech synthesis capabilities to allow students to hear whatever is typed and well as hear text entered by the teacher.

However, as observed by Parkham in his survey article "Computers That Talk" discussed above, language arts system developers have in the past had great difficulties providing acceptable, useful systems. Known text-to-speech synthesis algorithms are capable of converting written text into synthesized spoken words by referencing prestored "phonemes" (sets of sounds). The "Smoothtalker", "Experlogo-Talker" and "Talking Text Writer" systems referenced above are examples of systems which use text-to-speech synthesis. While text-to-speech synthesis may be acceptable for talking word processors, user interfaces, or the like, known algorithms cannot produce the range of inflections (stress and intonations) and pronunciations required for language learning.

The digitized speech approach (i.e., in which actual human speech is converted to digital signals using digitizing hardware for later reproduction) is capable of producing speech as realistic as recorded voice—in any language and including accent and inflection. However, the use of digitized speech is extremely memory intensive (a limitation which has proven to be a major roadblock in its use in the past). A single second of digitized speech can occupy 64 Kbytes of storage space (somewhat less if compression algorithms are used). To reduce the amount of memory required, some system developers have used methods for reusing words by encoding and storing individual words and phrases individually. This has, however, been a problematic approach for language learning in the past—since it has been shown that students learn best when presented with words in natural context (and the same word or phrase is often pronounced differently depending upon context—see the Goudie '962 patent referenced above).

Most prior digitized speech systems have been limited to playing back prestored digitized speech. However, some prior systems also permitted the student to digitize his own speech for later play back. For example, Covox, Inc. claims its "Voice Master" speech synthesis system supposedly speaks in the user's own voice, in any language, and with any accent. To record speech, a "learn" command is inputted and the student speaks into a microphone. To play back the recorded speech, the student inputs the "speak" command. Up to 64 different words, phrases or other sounds can be in memory at any one time—with additional words being stored on disk and loaded as needed.

See also U.S. Pat. No. 4,591,929 to Newsom discussed above, which teaches: (a) digitizing a spoken phrase spoken by the user and storing the digitized user's phrase in an electronic store along with a digitized teaching phrase (played back from a tape recorder); (b) and permitting the user to selectively reproduce the teaching phrase or his own response. However, Newsom provides only minimal digitized speech storage (e.g., a single teaching phrase) and requires the student to control the functions of a tape recorder in order to select a different teaching phrase. The process of rewinding/fast forwarding a tape recorder is extremely cumbersome. Moreover, Newsom provides no facility for integrating textual material, graphical or other display, or other study aids with his strictly oral lesson.

Hence, although much prior work has been done in the area of computer-assisted language learning, there is room for much further improvement.

For example, no one in the past has successfully developed a truly interactive computer assisted language learning system which integrates visual displays with preprogrammed digitized speech and which also interactively digitizes student speech and permits the student to easily listen to his own pronunciation and compare it with the digitized pronunciation of a model word or phrase he selects. Significantly, the present invention may provide the very first truly interactive computer assisted language learning system which allows a student to select a model phrase from text displayed on an electronic display; record (in digitized form) his own pronunciation of that phrase; and instantly listen to the digitized vocal version of the selected phrase and his own recorded pronunciation for comparison purposes.

Many other significant advantageous features are provided by the present invention, including the following:

SoundSort—A text reconstruction exercise based on aural clues. In accordance with this feature of the invention, the system automatically randomizes the order of plural phrases, provides digitized utterances of the phrases in the randomized order, and requires the student to reconstruct the original order using a visual display interface.

An audio CLIP mode which permits the student to select any (random) portion of displayed text (e.g., a phrase, a small part of a phrase, a single word, a syllable, or a phoneme) using cursor controls and to control the system to play the digitized speech corresponding to that selected portion. This feature allows the student to concentrate on difficult phrases.

Integration of digitized sound in a high-level authoring system (as distinct from an authoring language) is provided. An easy-to-use "WYSIWYG" ("What you see is what you get") user interface reduces or eliminates mistakes and associated frustration and does not require the user to have any programming ability.

An extremely flexible authoring system allows a teacher to link recorded digitized speech with customized on-screen text (which may but need not match the digitized speech). This allows a wide variety of free-form exercises to be created.

The system permits the student to hear his own speech and the correct (model) speech, each at a keystroke, with no delay.

Teacher-composed customized help screens and instructions can be referred to by the student upon depressing a single keystroke. This feature permits great increases in the number of possible teacher-created lesson formats and also provides great flexibility in customization and ease of use not provided in other systems.

Despite the fact that digitized speech is employed, interrupt driven hardware in conjunction with software operating in the background permits essentially continuous replay of digitized audio data stored on a mass storage device—without pauses due to loading and reloading of memory (for up to 23 hours of continuous speech from a CD ROM mass storage device for example).

The presently preferred exemplary embodiment of the invention provides a system including several functional modules which are implemented in hardware, software or both. A digital speech processor connected to a conventional personal computer is used to convert digitized speech data to audio signals and vice versa under control of a memory resident interrupt driven software module (this module handles all play and record requests for the speech processor). A public domain RAMdisk driver sets aside memory for use as a simulated (virtual) disk drive. In the preferred embodiment, all recorded speech is placed on the virtual disk first, then copied to other mass storage devices (e.g., floppy disk).

The personal computer processor executes program control steps in the preferred embodiment which provide a wide variety of useful functions. These functions may be divided into "teacher" functions (used to create and compose lessons and exercises); and "student" functions (performed by the student for learning purposes). The student functions generally operate on lessons and exercises previously created by the teacher using the teacher functions.

One of the teacher functions is a "Text Writer" word processor permitting the teacher to compose texts. A lesson authoring utility is then used to record segments of sound (phrases) which are linked to phrases in on-screen text(s) composed with the word processor. The teacher may also select a second (page two) textual display format to be presented as instructions or help to the student. After recording the phrases, the teacher selects which of three student functions will be used with the newly created lesson. The teacher may, therefore, create texts and exercises appropriate to any of the three functions.

Three student functions are provided in the preferred embodiment: (a) AudioLab (which provides aural and oral practice and learning); (b) SoundSort (an aural text reconstruction exercise); and (c) AudioWrite (a writing exercise focusing on listening comprehension).

The AudioLab student function in the preferred embodiment provides three modes: (i) PREVIEW, (ii) LAB, and (iii) CLIP.

In the PREVIEW mode, the student can listen to an entire prerecorded lesson with the option to view the corresponding complete text on the personal computer display screen. Thus, the student hears the digitized model speech of a lesson and can also view the displayed corresponding text (generally the text of the speech) as an audio-visual lesson.

In the LAB mode, the student can select individual phrases from the recording. The student may also view the complete text on the display—or only the text corresponding to a phrase selected by the student. The student can also record himself speaking any individual phrase of his choosing, and play back his own speech and the corresponding preprogrammed model digitized speech so as to compare the two.

In the CLIP mode, the student can work with any selected portion of the current phrase (down to 0.1 seconds long in the preferred embodiment). The student can play the entire original phrase or only a portion of the phrase he selects; record himself speaking; and compare his played back speech to the original. Moreover, the student can examine phrases in three different ways in the preferred embodiment: forwards (e.g., "This/is-/an/el/e/phant"); backwards (e.g., "phant"—"e/-phant"—"el/e/phant"); or middle (e.g., "is/an").

The SoundSort function provides a computer puzzle exercise which randomizes (jumbles) the order of phrases in a lesson text. A column of symbols is displayed representing the phrases in the lesson text. The student must restore the symbols into the correct order by moving the symbols around the display screen (using interactive cursor controls and the like). The only clues provided by the preferred embodiment as to the correct order of the phrases are aural versions of the phrases obtained by listening to selected phrases (as many times as the student desires) and by listening to the complete, original lesson. The text is not shown on the screen in the preferred embodiment—requiring the student to listen to the phrases and reorder them into the proper context.

The AudioWrite function of the preferred embodiment provides the digitized speech lesson one phrase at a time, and requires the student to type or reconstruct what he hears (with complete freedom of correction and repetition). The phrase typed in by the student is then compared to the original text, and any differences are flagged as errors. Punctuation, spacing and capitalization are provided by the system in the preferred embodiment and are thus not tested.

Thus, the highly integrated speech and visuals provided by the present invention permits a student to:

see, hear, record and compare complete text or dialogue, phrase by phrase (or by selected portions of phrase);

practice listening comprehension; and instantly, randomly access any part of a recorded selection. The system also provides teachers with an easy-to-use utility for creating an infinite variety of exercises.

BRIEF DESCRIPTION OF THE DRAWINGS

These and other features and advantages of the present invention will be better and more completely understood by studying the following detailed description of a presently preferred exemplary embodiment in conjunction with the appended sheets of drawings, of which:

FIG. 2 is a high level schematic flow chart-type description of the options presented to a student by the system shown in FIG. 1;

FIGS. 3A-5 are graphical flow illustrations of the options shown in FIG. 2;

FIGS. 6A-6B are together a flow chart of exemplary program control steps performed by the FIG. 1 system to provide the options shown in FIG. 2;

DETAILED DESCRIPTION OF PRESENTLY PREFERRED EXEMPLARY EMBODIMENTS

Figure 1:
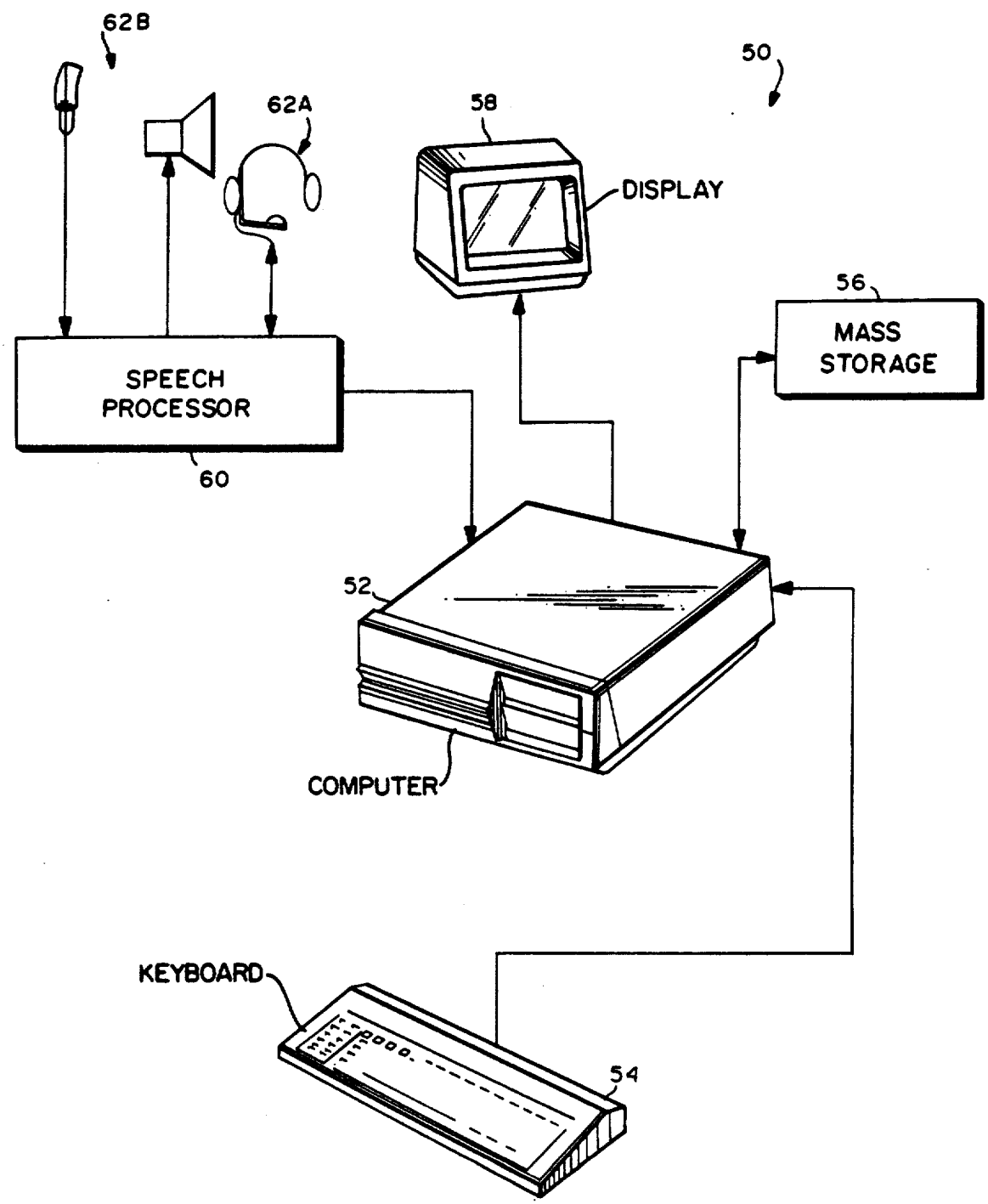
FIG. 1 is a schematic block diagram of a presently preferred exemplary embodiment of an interactive language learning system in accordance with the present invention.

FIG. 1 is a schematic block diagram of a presently preferred exemplary embodiment of an interactive language learning system 50 in accordance with the present invention. In the preferred embodiment, system 50 includes a conventional personal computer 52 (e.g., IBM PC or true compatible provided with a conventional DOS disk operating system version 2.1 or higher and at least 384 kilobytes of random access memory); a keyboard input device 54; a mass storage device 56 (which may be one or more floppy diskette drives and associated floppy diskettes, Winchester-type hard disk drives and/or CD ROM drives); a conventional CRT-type display 58; and a speech processor 60 connected to an appropriate audio input/output device (a conventional headset-type speaker/microphone arrangement 62a and/or a microphone/loudspeaker combination 62b with appropriate external audio amplifiers as necessary).

In the preferred embodiment, speech processor 60 is a modified conventional model VP625 PC-compatible digital processor board manufactured by ANTEX Electronics of Gardenia, Calif. This conventional speech processor, which is described in readily available ANTEX Electronics published specifications and can be purchased directly from the manufacturer, plugs directly into a so-called expansion slot of personal computer 52, and makes available on the personal computer rear panel an audio input/output socket. Speech processor 60 converts audio signals applied to its audio input into ADPCM (Adaptive Differential Pulse Code Modulation) encoded digital data in a conventional manner for storage on mass storage device 56—and also converts previously recorded ADPCM encoded digital data stored on the mass storage device into an audio signals provided at the speech processor audio output socket (also in a conventional manner).

Speech processor 60 samples the audio waveform presented at its audio input (e.g., from the microphone of headset 62a or from separate microphone 62b) at either 8, 12 or 16 kHz using ADPCM encoding technology. At the 16 kHz sampling rate, full fidelity sound is produced with a frequency response of 20 Hz to 7.0 kHz. The use of ADPCM provides a data reduction of better than 2-to-1 over other standard digitization techniques.

Speech processor 60 of the preferred embodiment operates in background under interrupt control of the conventional DOS disk operating system and the associated microprocessor internal to personal computer 52—using any one of several programmable interrupt and I/O addresses. Speech processor 60 also provides software programmable volume controls on both audio input and output and a software-addressable level detector to provide an indication of signal amplitude during record/playback.

In the preferred embodiment, speech processor board 60 is modified so that headset 62a can be connected directly to it using a DB-9 headset connector and is also provided with a program controlled volume level and dual input capability (to support both the astatic microphone of an AKG K-18 headset and an external 5 V signal). A microphone preamplifier stage is also included to provide an increased signal-to-noise ratio.

Mass storage device 56 in the preferred embodiment stores three types of digital signal information: (a) digitized speech information; (b) text information associated with the speech information; and (c) program control instructions (which control the processor and other associated components within personal computer 52 to perform the interactive language learning functions provided by the present invention). Keyboard 54 is used to permit the user (student or teacher) to interact with the execution of the program control steps, while display 58 permits the user to view graphics, text and other visually-presented information.

STUDENT FUNCTIONS

FIG. 2 is a high-level flow chart-type diagram of the options presented to a student by system 50, and FIGS. 3A-5 are graphical illustrations of these options. The options provided by the preferred embodiment to the student in effect constitute an audio visual user interface with which the student may interact in order to learn a second language.

Upon starting system 50 (e.g., by powering on personal computer 52 and its associated peripherals and controlling the personal computer to begin executing program instructions stored in mass storage device 56, FIG. 2, block 100), a display title screen is displayed on display 58 (block 102) and system 50 then prompts the student for an audio disk (block 104). Typically, lessons are stored on floppy diskettes so that the student may easily change lessons by simply inserting another diskette into personal computer 52. System 50 displays the names of the lessons stored on the audio disk to permit the student to change lessons if he desires. A main menu is then displayed on display 58 which permits the student to select between five different options in the preferred embodiment: (1) AudioLab; (2) SoundSort; (3) AudioWrite; (4) Change Audio Disk; and (5) Exit. The student uses up arrow and down arrow cursor control keys in the preferred embodiment to select one of the five options, and then depresses the enter key to cause that option to be executed.

The exit option causes the interactive language learning functions provided by the preferred embodiment to terminate execution. The option to change audio disk causes system 50 to prompt for a new audio disk (block 104). The AudioLab, SoundSort and AudioWrite options perform interactive language learning functions that will now be explained.

The AudioLab function provides the student with practice in pronounciation and listening comprehension. In the preferred embodiment, the AudioLab option or function has three different modes: PREVIEW (block 108); LAB (block 110); and CLIP (block 112). In the PREVIEW mode, the student listens to the entire selected text and also sets the playback volume for all of the routines (AudioLab, SoundSort and AudioWrite). In the LAB mode (block 110), the student listens to phrases from the text and may also record his own speech and may compare his played back voice to the original. In both the PREVIEW and LAB mode the student may choose to see the phrases and text in different combinations again on display 58 or he can choose to listen without viewing the text. From the LAB mode, student may select the CLIP mode (block 112). In the CLIP mode, the student may choose to work on any selected portion of a phrase to permit him to practice difficult sounds.

Upon selecting the AudioLab option from main display 106 in the preferred embodiment, system 60 begins performing the AudioLab PREVIEW mode (block 108). FIG. 3A is a graphical description of some of the options presented by the preferred embodiment in the PREVIEW mode. The student may adjust volume level by depressing the left arrow key (to decrease volume level) or the right arrow key (to increase volume level)—and this volume level adjustment remains in effect for all functions (programs) provided by system 50. To begin playing a prerecorded lesson, the student depresses the F2 function on keyboard 54 on the preferred embodiment. In the preferred embodiment, this causes system 50 to begin producing audio in headset 62a by controlling speech processor 60 to convert digitized speech stored on mass storage device 56 into audio signals.

In the preferred embodiment, one or more screens of text may be associated with a particular block of stored digitized speech, and in the PREVIEW mode this text may be displayed by display 58 while system 50 produces the converted audio signals from the digitized speech. This associated text is typically actual text corresponding to the speech being reproduced (since the student may then "read along" with the digitized speech being played back), but it may have some other contents—depending upon what the teacher desires (as will be explained). To stop the speech (and text) generation, the student may depress the ESC (escape) key of keyboard 54. To resume speech/text reproduction, the student may depress the F2 key again. Depressing the ESC key another time returns the student to the main menu (FIG. 2, block 106). Depressing the ENTER key causes the LAB mode to be entered (FIG. 2, block 110). On-line help is available by depressing the F1 key in the preferred embodiment.

FIG. 3B is a graphical illustration of options available to the student in the LAB mode of the AudioLab function (FIG. 2, block 110). In this LAB mode, the student can select different phrases (e.g., sentences) to listen to in isolation one or more times. If the student wishes to concentrate on a specific phrase, he selects the LAB mode by depressing the ENTER key. Once in the LAB mode, the student may select the phrase he wishes to concentrate on using cursor control keys. If in the PREVIEW mode the student has his text turned off (this is the default mode), then in the LAB mode only the selected phrase will be displayed by display 58. If, on the other hand, the student in the PREVIEW mode selected that the text should be displayed (by depressing F7), the full text is displayed on display 58 but the selected phrase is highlighted. The left arrow and the right arrow keys in the preferred embodiment move the display "work box" to different phrases, and the F6 key is used to turn a phrase on and off—thereby selecting the phrase to be treated using the LAB mode.

Once the student has selected a phrase, he can depress the F2 key to control speech processor 60 to play back the digitized speech corresponding to that phrase. By depressing the F3 key, the student may record his own pronunciation of the same phrase. Once the F3 key is depressed, the student is prompted to depress the space key to begin recording (and may adjust the recording level using the left arrow and right arrow keys). Upon depressing the space bar, speech processor 60 begins converting audio applied at its audio input (e.g., from the microphone in headset 62a) into digitized speech information and storing the digitized speech (on a virtual disk). When the student is through speaking, he depresses the space bar again to stop recording. The student may then depress the F4 key to instantly play back his own just-recorded speech —or depress the F2 key to listen again to the model pronunciation of the selected phrase. Depressing the ESC key returns system 50 to the PREVIEW mode (FIG. 2, block 108), while depressing the F5 key controls system 52 to perform the AudioLab CLIP mode (FIG. 2, block 112).

The CLIP mode in the preferred embodiment allows the student to analyze any section or part of a phrase selected in the LAB mode. A graphical illustration of options presented to the student in the CLIP mode are shown in FIG. 3C. In the preferred embodiment, the CLIP mode permits the student to examine any section or part of the model digitized speech recording down to a single phoneme (0.1 seconds in duration). In addition, the complete phrase can be heard by depressing a control key (e.g., F2).

In the CLIP mode, the cursor control keys (up arrow, down arrow, left arrow, right arrow) are used to select which part of the current phrase is to be played back. A graphical illustration of the length of the currently selected portion of the phrase is displayed at the bottom of display 58 in the preferred embodiment. In the preferred embodiment, this graphical illustration includes a horizontal line having a length proportional to the length of the selected phrase portion. The length and position of this horizontal line change in response to cursor controls to change the length and position of the selected portion relative to the current phrase.

Once the student has selected the portion of the phrase he wishes to concentrate on, he depresses the F5 key to listen to the selected portion. As in the LAB mode, the student may record and play back his own voice using the F3 and F4 keys, and alternate playback of his voice with playback of the selected clip by toggling the F5 and F4 keys. Depressing the F8 key resets the clip to allow the student to select a different part of the phrase. Depressing the ESC key returns system 50 to the LAB mode (FIG. 2, block 110).

The AudioWrite function (FIG. 2, block 114) provides the student with an exercise in listening and writing by requiring the student to type phrases he hears. The student may listen to each phrase as many times as he wishes, and may also listen to the entire text before concentrating on each phrase (since in the preferred embodiment the typing exercise operates on a phrase-by-phrase basis). Once the student has typed a particular phrase, he can depress the ENTER key to control system 50 to compare the text typed in by the student with model text and indicate any errors in the student-generated text.

Figure 4:
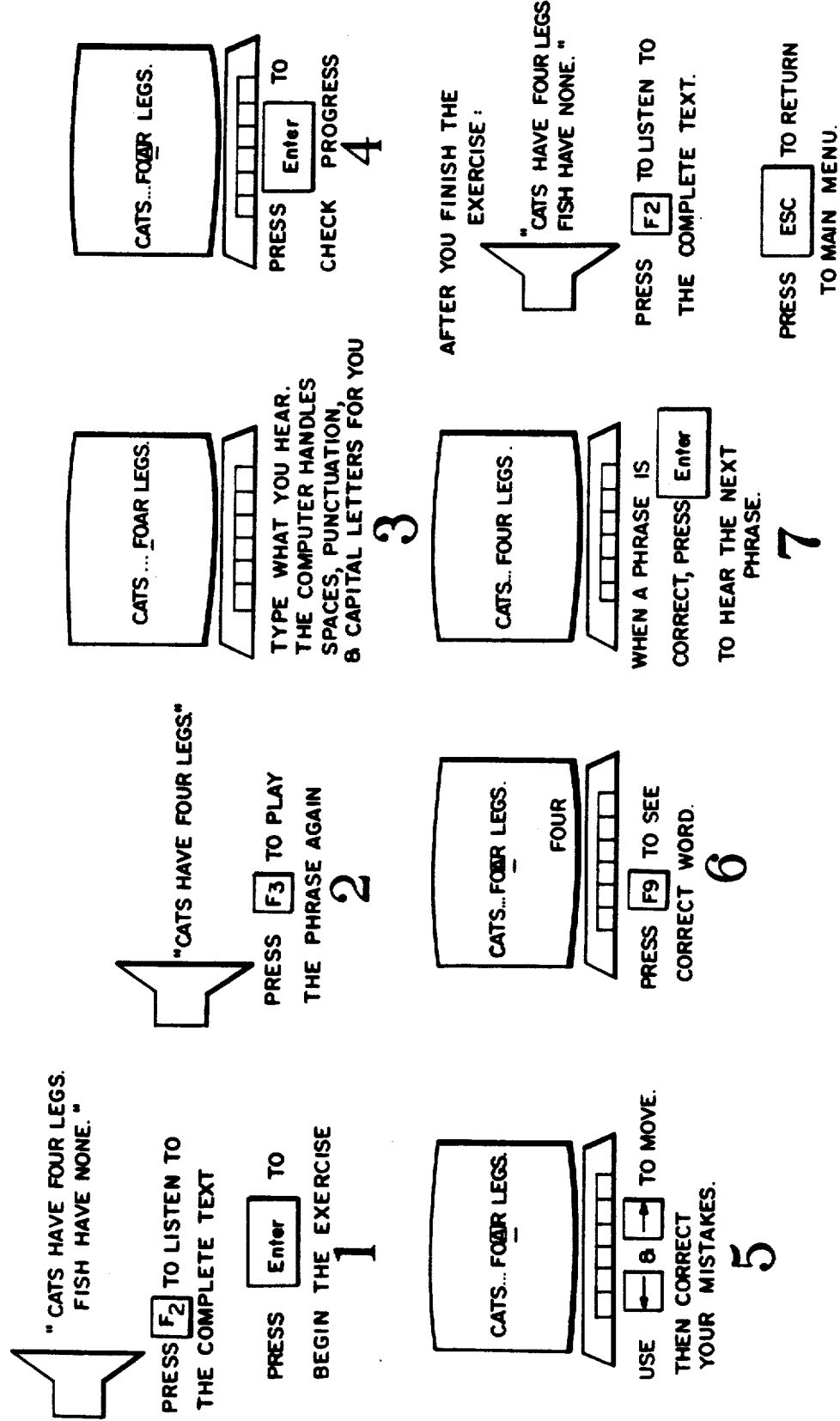

FIG. 4 is a graphical illustration of the options available to the student in the AudioWrite function (FIG. 2, block 114). Upon initiating the AudioWrite function, the student may depress the F2 key to listen to the entire text, or simply depress the ENTER key to start the exercise without listening to the whole text. Once the exercise has begun, system 50 controls speech processor 60 to produce the audio corresponding to the first phrase of an exercise without displaying the corresponding text on display 58. The student may depress the F3 key to control speech processor 60 to replay the spoken phrase (the phrase may be replayed as many times as the student wishes). The student then enters text by depressing the keys on keyboard 54 (in the preferred embodiment, system 50 adds spaces, punctuation and capitalization so the student may concentrate on spelling and grammar). The student may depress the ENTER key at any time to check his progress. Upon depressing the ENTER key, system 50 compares the text keyed in by the student with the text version of the phrase being spoken by speech processor 60—and highlights any portions of the student-typed text which do not correspond to the model text. The student may use his cursor control keys to move the cursor to the erroneous characters and correct his mistakes by retyping over the incorrect characters already there. The student may depress the F9 key at any time to control system 50 to display the correct word corresponding to the student's inputted word the cursor points to. The displayed model word disappears when any other key is depressed. When the student has correctly entered a phrase, he depresses the enter key to hear the next phrase. When the student finishes the exercise, he may depress the F2 key to listen to the entire text, or depress the ESC key to return to the main menu (FIG. 2, block 106).

The SoundSort function provided by the preferred embodiment of the present invention presents the the student with an audio puzzle to solve. The "pieces of the puzzle" are the phrases in the model text—but jumbled in a randomized order. The student must put the phrases back in the correct order based only on aural clues. In the preferred embodiment, each phrase is identified by a symbol (e.g., the letters A, B, C) displayed on display 58. The student controls system 50 to move the letters from a "jumbled" ordered list displayed on the left-hand column of display 58 to a correctly ordered list in the right-hand display column based on context of the associated phrases. Thus, system 50's SoundSort function associates a randomly ordered sequence of phrases with displayed symbols, and then requires the student to reorder the displayed symbols to correspond to the correct order of the phrase sequence. The student may listen to the phrases as many times as he wishes, but system 50 does not display the text associated with the phrases—only the symbols associated with the phrases.

FIG. 5 is a graphical illustration of the SoundSort function depicted at FIG. 2, block 16. Upon initiating the SoundSort function, display 58 displays a vertical column of symbols (e.g., A, B, C, D)—each one symbolizing a phrase which is a portion of a sentence or passage. The student may depress the F2 key to listen to the entire text in the correct order—or he may use his up arrow and down arrow cursor control keys to highlight one of the displayed symbols. One symbol is always highlighted in the preferred embodiment. Depressing the F3 key causes digitized speech processor 60 to reproduce the speech corresponding to the highlighted phrase. The student may then use his right arrow cursor control key to move the symbol corresponding to the phrase he has just heard to the center column—and may use the up arrow and down arrow cursor control keys to move the symbol up and down the center column—and then use the right arrow key to "park" the symbol in a desired position in the right-hand column. The object of the exercise is to move all of the symbols from the left-hand column to the right-hand column—and to rearrange the order of the symbols so that their rearranged order corresponds to the correct order of the phrases. The space bar may be depressed to change columns (e.g., from the left-hand column to the right-hand column or vice versa). By depressing the ENTER key, the student is provided with an indication of his progress—since system 50 will highlight those symbols moved to the right-hand column that are in the correct order. The student may depress the F2 key at any time to listen to the entire text—and use the left arrow and right arrow cursor control keys to select the starting point of the text to be reproduced in audio form. This feature is especially useful when a long passage or string of sentences is being operated upon (since the student may, for example, wish to concentrate only on the last half of the passage and may not therefore wish to listen to the entire passage from beginning to end). To exit the SoundSort function, the student may depress the ESC key to return to the main menu (FIG. 2, block 106).

Now that the overall student interface provided by system 50 has been described, a detailed description of exemplary program control steps performed by personal computer 52 under software control in the preferred embodiment to provide that student interface will be presented in connection with FIGS. 6–9C.

Figure 6B:
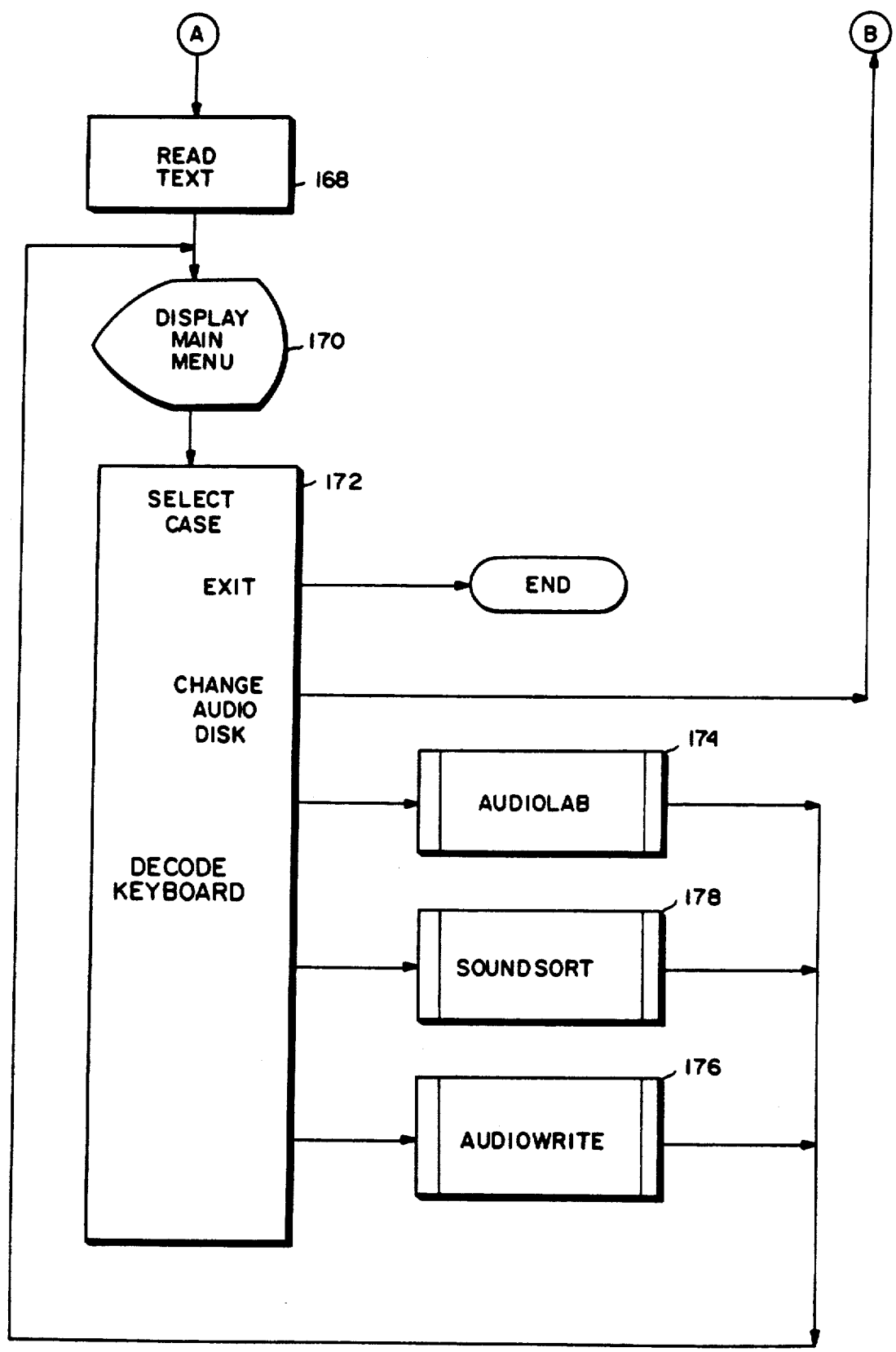
Figure 7B:
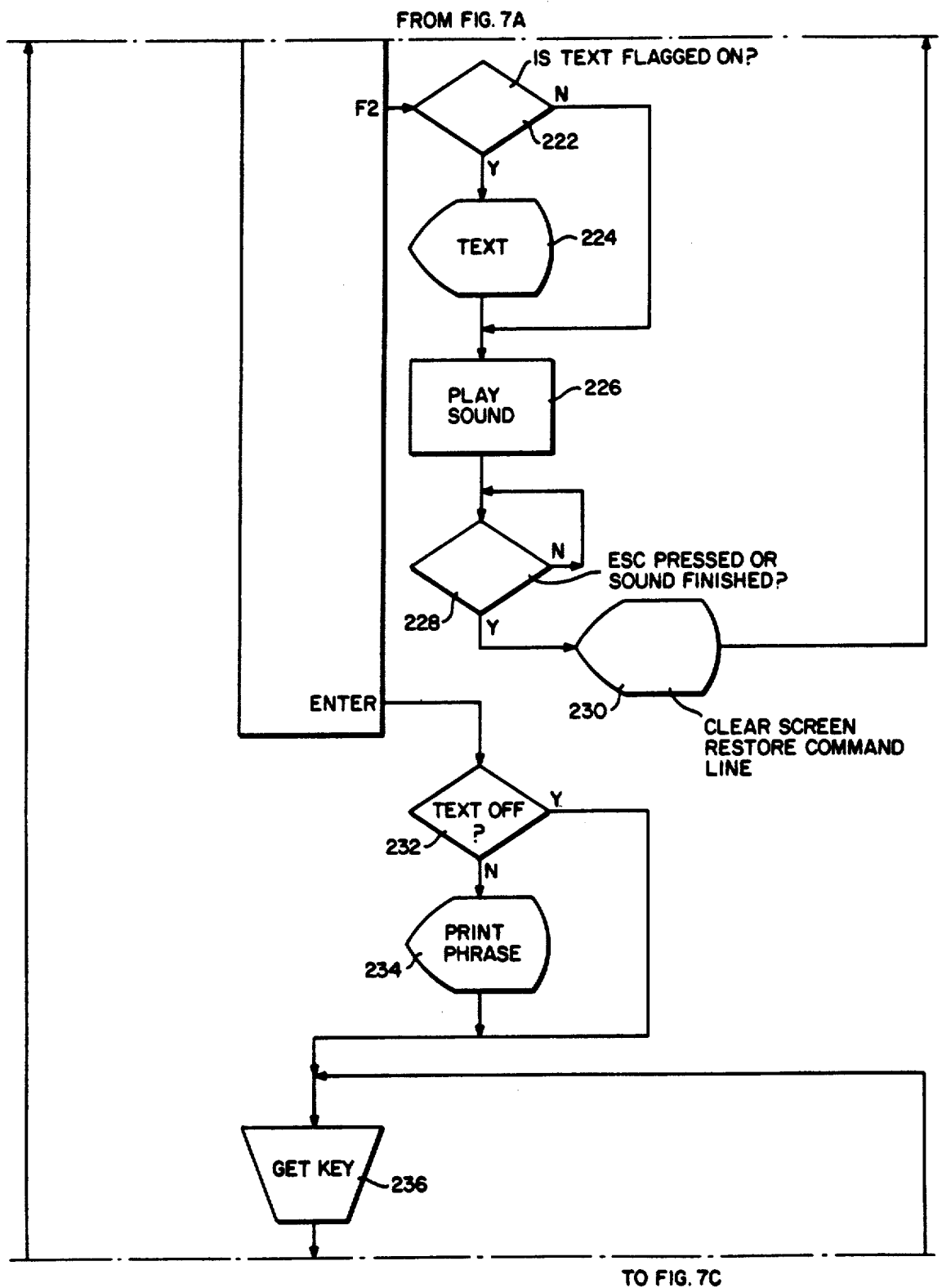
FIGS. 7A-7D are together a flow chart of exemplary program control steps relating to the AudioLab routine function shown in FIG. 6.
Figure 7C:
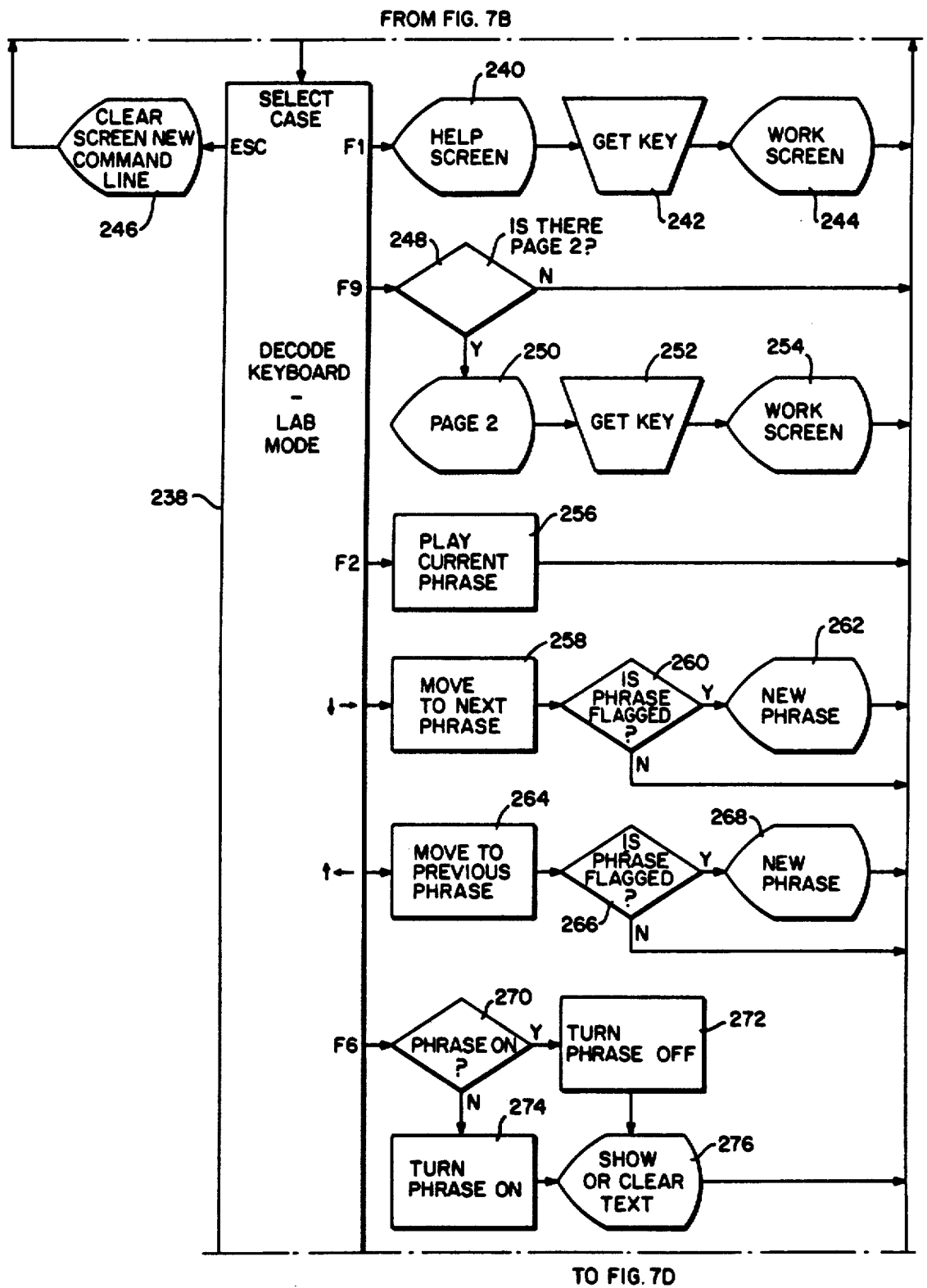
Figure 7D:
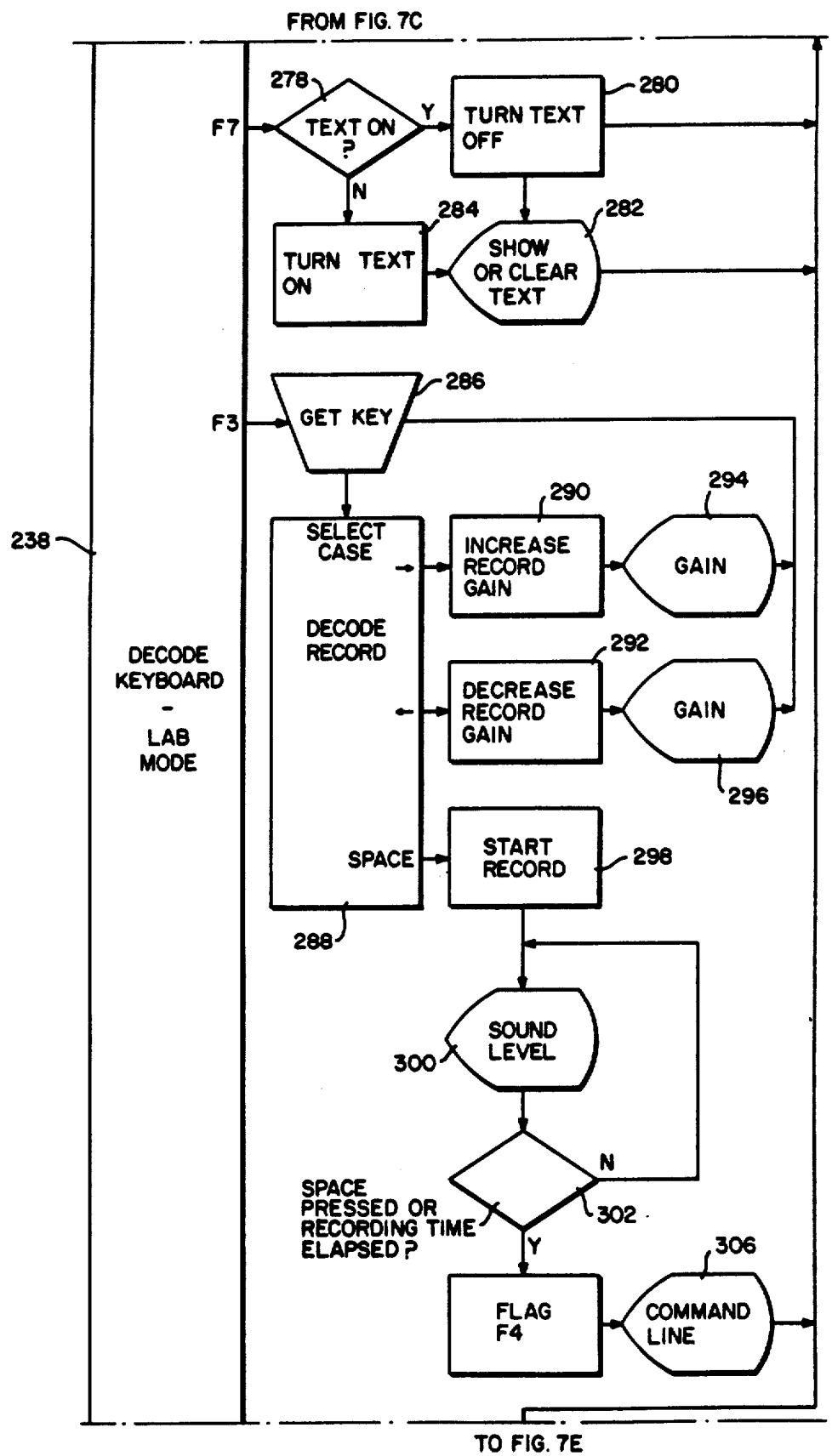
Figure 7E:
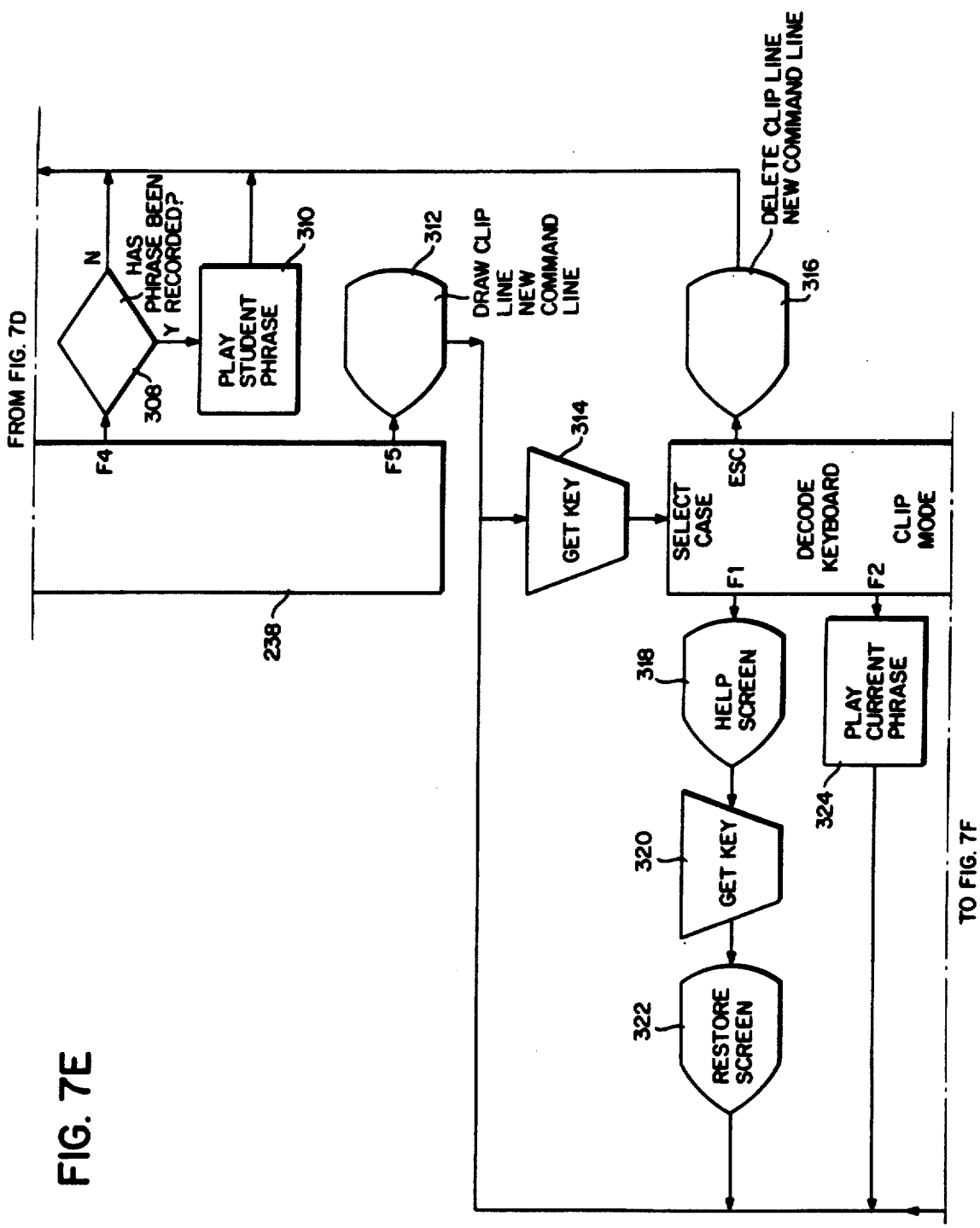
Figure 7F:
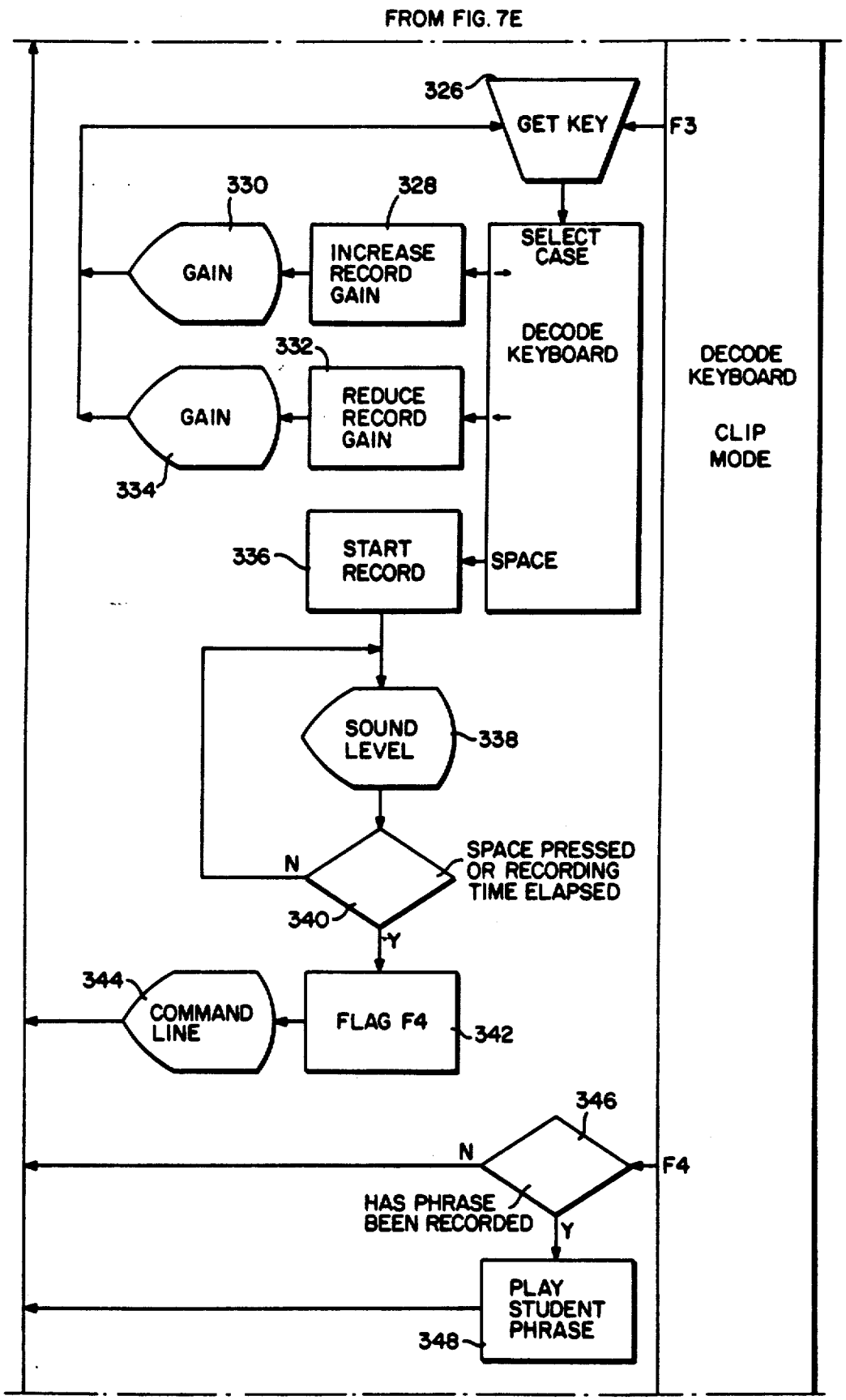
Figure 7G:
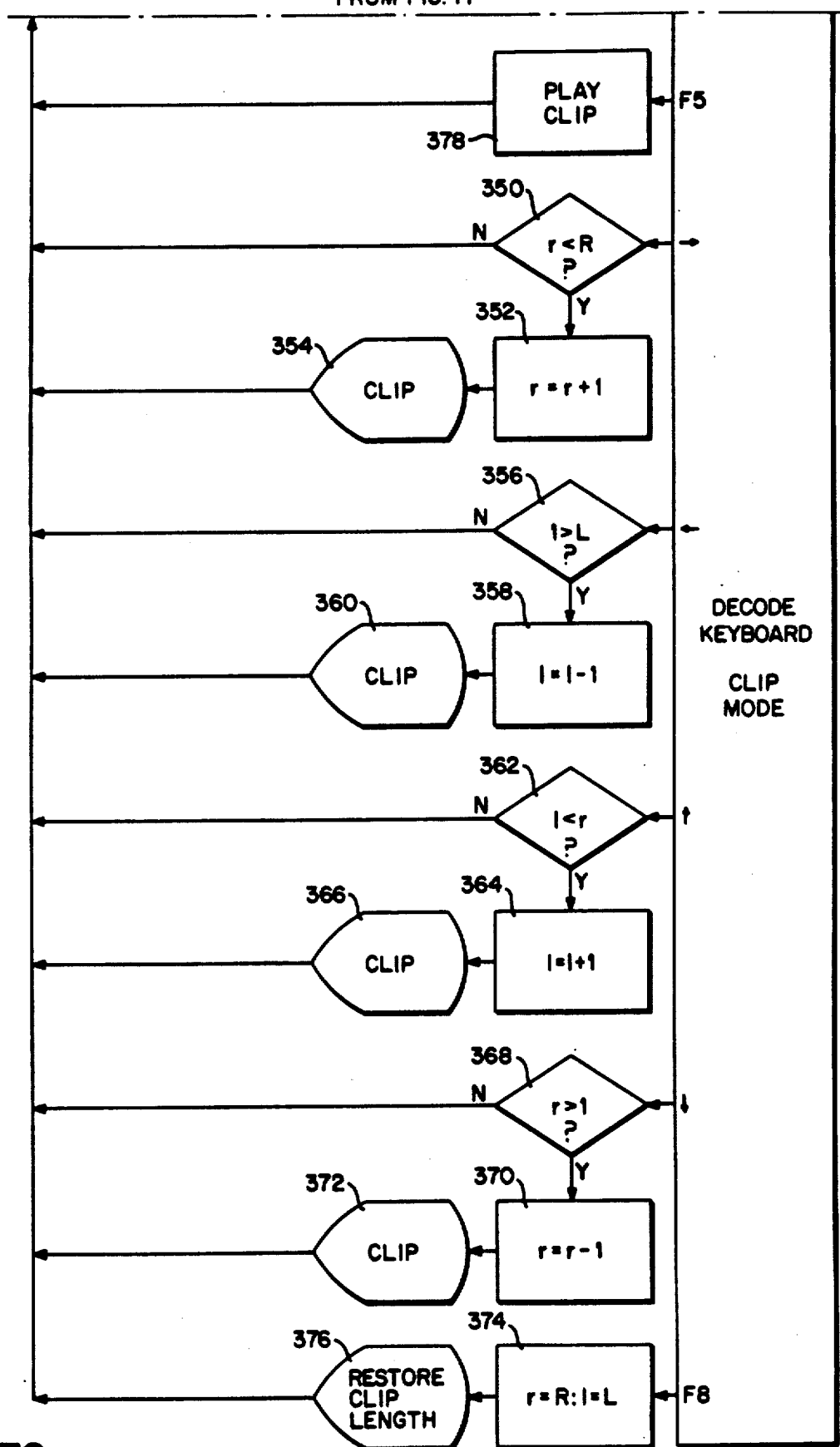

FIGS. 6A–6B are together a schematic flow diagram of an exemplary program control main routine performed by the preferred embodiment system 50. Upon starting system 50, as described previously, a title is first displayed (block 150), and then the system prompts the student for an audio disk (block 152) and waits for the student to depress a key (block 154). System 50 then determines whether the floppy diskette and the floppy diskette drive contains correctly formatted lesson data (decision block 156). If the diskette being tested is not appropriately formatted, a warning message is displayed on display 58 (block 158), system 50 waits for the student to depress another key (block 160), and then rechecks the diskette contents (block 156).

Once an appropriate diskette is inserted into the floppy diskette drive, system 50 reads a title of the lesson (and a page two flag) stored on the diskette and displays that title on display 58 (block 162). If the student wishes to choose another lesson, he depresses an appropriate key (decoded by blocks 164, 166) which cause system 50 to repeat blocks 152–166. If the student is satisfied with the lesson on the current diskette, he depresses, for example, the N key (decoded by blocks 164, 166), which controls system 50 to read the contents of the current diskette (block 168). System 50 then displays a main menu display format (block 170) and waits for the student to select one of the five options described previously (decode block 172). The student may select execution of the AudioLab routine (block 174, shown in greater detail in FIGS. 7A–7D), the Audio- Write routine 176 (shown in greater detail in FIGS. 8A-8B), or the SoundSort routine (shown in greater detail in FIGS. 9A-9C) using cursor controls and the ENTER key as described previously.

Referring now to FIG. 7A, the Audiolab routine in the preferred embodiment first queries an internal flag to determine whether this is the first time the student has used AudioLab function in this session—and if so, displays an introductory screen (blocks 180-186). System 50 then awaits depression of a key (block 188), and decodes that key (block 190) to determine what operation to perform next. Depression of the ESC key causes a return to the FIG. 6A-6B main routine (block 192). If the student depresses the F1 key, the currently displayed screen is saved, and a help screen is displayed in its place (block 194). Upon depression of a further key (block 196), the saved work screen is returned to the display (block 198).

If the student depresses the F9 key, system 50 determines whether there is a "page two" associated with the currently displayed text (e.g., by checking a page two flag that is set when a page two exists —decision block 200). In the preferred embodiment, a teacher generates a lesson or exercise by recording a spoken passage; inputting a main screen of information corresponding to that passage (this main screen is typically the textual version of the spoken passage, but may be any text the teacher wishes), and may also key in a "page two" screen providing supplementary text associated with the spoken phrase. Thus, some lessons may have a page two screen associated with them and others may not. In the preferred embodiment, page two text format is stored in files separately from the page one display formats—and the existence of the page two file is flagged in a file called "file.dat". If a page two display format does exist, it is displayed in a manner similar to the way the help screen is displayed (blocks 202, 204, 206) in response to depression of F9.

The student may affect the volume of audio produced by speech processor 60 in the preferred embodiment by depressing the right arrow key (to increase the volume level) or the left arrow key (to decrease volume level). Volume is controlled by writing a new volume level byte to speech processor 60 (blocks 208, 212) in a conventional fashion. The preferred embodiment also displays the current volume level on the lower right-hand portion of display 58 in the form of a horizontal bar the length of which indicates volume level (blocks 210, 214).

The student may select whether or not he wishes display 58 to display the page one text corresponding to the spoken passage by depressing the F7 key. "Text off" is the default condition. If the student depresses the F7 key when the text is already displayed (decision block 216), the text off flag is set (block 218) to suppress the display of text. If the student depresses the F7 key when system 50 is not displaying text (decision block 216), a text on flag is set (block 220) to result in display of the complete page one text associated with the current lesson.

When the student depresses the F2 key, he causes the entire text of the lesson to be displayed on display (but only if the text on flag is set by block 220; blocks 222, 224). System 50 then controls speech processor 60 to reproduce the audio corresponding to the lesson by reading digitized speech information from mass storage device 56 and converting it to audio signals. In the preferred embodiment, digitized speech is stored on mass storage device 56 in the form of separate and discrete phrases. Files are packed 4-bit ADPCM sound data in the preferred embodiment. Speech processor 60 in the preferred embodiment accepts a string of several file names to be played in sequence. Each separate recorded phrase file is loaded and played with an interval of 0.25 seconds between to give the impression of continuous replay. Up to 186 seconds of audio can be played from a single floppy diskette, and up to twenty-three hours may be played from a CD ROM storage device. In the preferred embodiment, the actual mechanism for presenting digitized speech to speech processor 60 includes reading digital information from mass storage device 56. Speech processor 60 then reads the digitized information into its own 32K buffer and converts the information to audio form. When speech processor 60 reaches the end of the data stored in its buffer, it automatically generates an interrupt request which is serviced by a conventional interrupt handler performed by the processor of personal computer 52. This conventional interrupt handler (which is provided with conventional speech processor 60) reads the next portion of the digitized speech file from mass storage device 56 and transfers the data to speech processor 60. Since the transfer of information is performed under interrupt control for only small blocks of data at a time, the process is virtually transparent to the user and results in only a negligible slowing of the response time of personal computer 52.

Once system 50 begins reproducing the audio corresponding to a particular lesson passage (block 226), it continues to produce the entire audio passage until it reaches the end of the passage or until the student depresses the ESC key (decision block 228). Upon the occurrence of either of these two events, display 58 is cleared and a command line is displayed to permit the user to select another option (block 230).

The user may at any time depress the enter key to enter the LAB mode (blocks 194-230 being part of the PREVIEW mode discussed previously). Upon entering the LAB mode, system 50 first determines whether text display is on or off (e.g., by testing the value of the text on flag (decision block 232). If text display is off, system 50 displays the "current phrase" on display 58 (block 234)—that is, the phrase that was being "played back" while in the PREVIEW mode. PREVIEW mode plays all the phrases. When the student first enters Text Lab mode, the first phrase is the current mode. System 50 then waits for the student to depress a control key to select one of the LAB options (block 236, decode block 238).

The LAB mode provides its own help screen support upon depression of the F1 key (blocks 240-244), and permits the user to exit back to the PREVIEW upon depressing the ESC key (block 246, with control being returned back to FIG. 7A block 188). Similarly, depressing the F9 key causes a "page two" display screen format to be displayed on display 68 if such a "page two" format exists (blocks 248-254).

If the user depresses the F2 key, system 50 reproduces to audio corresponding to the current phrase (block 256). Moving the cursor control keys down arrow or right arrow cause system 50 to select the "next phrase" (that is, the next file in a sequence of files that store the digitized speech phrases corresponding to the current lesson) while moving the up arrow or left arrow cursor control keys causes selection of the previous phrase (blocks 258, 264) (blocks 260, 262, 266, 268). The F6 key causes a phrase selected by the cursor control keys to be turned on (i.e., flagged) and turned off (i.e., unflagged) (blocks 270-274). A phrase that is turned on is displayed, while turning off a phrase causes that phrase to cease being displayed (block 276). The student may at any time turn display of the complete main text on and off by depressing the F7 key (blocks 278-284).

If the phrase flag is on, each phrase will be displayed as it is needed, even if text is off. If the phrase flag is off, each phrase will be erased as it is reached, even if text is on. The student may also at any time depress the F3 key in the preferred embodiment to record his own voice. When the F3 key is depressed, system 50 first gives the student the option to increase or decrease record level gain using the left arrow and right arrow cursor control keys (block 286, decode block 288, blocks 290, 292). If the student alters the record gain, the new gain is displayed in the lower right-hand corner of display 58 (blocks 294, 296) and the new record gain level is written to speech processor 60 in a conventional manner. The student depresses the space bar to begin the recording process (block 298). When recording is begun, speech processor 60 is controlled to begin converting signals at its audio input into digitized speech signals and writing those digitized speech signals onto the virtual disk. This process continues until either the user depresses the space bar again to terminate recording or until a preset recording time (the length in time of the model phrase in the preferred embodiment) has elapsed (block 302). A record flag is then set (block 304) to indicate that a phrase has been recorded, and the command line is displayed once again (block 306). If the student now depresses the F4 key to playback his recorded phrase, it is first determined whether the record flag has been set (decision block 308)—and if it has been set, system 50 controls speech processor 60 to convert the student's stored digitized speech into audio (block 310).

The LAB mode thus permits the student to concentrate on a specific phrase from the prerecorded spoken lesson. If the student has trouble with a particular phrase, however, he may wish to listen to small pieces of that phrase in isolation (e.g., one syllable at a time) so he can learn how to speak the entire phrase. The preferred embodiment of the present invention allows the student to concentrate on any portion of the current phrase by depressing the F5 key to enter the CLIP mode. Upon entering the CLIP mode, system 50 displays a "clip" line (a horizontal line at the bottom of the display indicating the length and position of the current "clip" relative to the current phrase display) and a new command line (block 312) and then waits for the student to depress a key. Depression of the ESC key deletes the CLIP line and returns to FIG. 7B block 236. A help screen is provided for the CLIP mode (block 318-322), and the CLIP mode also permits the user to play the current phrase from beginning to end by depressing the F2 key (block 324). Similarly, the student may record and play back his own speech just as in the LAB mode (blocks 326-348) by depressing the F3 and F4 keys, respectively.

Briefly, the clip mode provides two indexes into the digitized speech file relating to the currently selected phrase: r (the "right-hand pointer"—which points to the end of the "clip"); and l (the "left-hand pointer"— which points to the beginning of the clip). The right-hand pointer r is incremented and decremented by the right-arrow and down-arrow cursor control keys, respectively between the values of L (the beginning of the current phrase) and R (the end of the current phrase). Right-hand pointer r points to the end of the portion of the digitized speech phrase that is selected (blocks 350-354, 368-372). The left-hand pointer l is decremented and incremented by the left-arrow and up-arrow cursor control keys, respectively between the values of L and R (which thus set a range for both l and r—l and r cannot pass each other). The left-hand pointer l points to the beginning of the "clip" (blocks 356-366).

In the preferred embodiment, the left-hand pointer l and the right-hand pointer r define absolute time offsets into the file containing digitized data representing the current phrase. Thus, depressing the uparrow key moves the left-hand pointer l to the right (toward the end of the phrase); depressing the leftarrow key moves the left-hand pointer l to the left (toward the beginning of the phrase); depressing the downarrow key moves the right-hand pointer r to the left (toward the beginning of the phrase); and depressing the rightarrow key moves the right-hand pointer r to the right (toward the end of the phrase).

In the preferred embodiment, the "clip" mode works on the basis of time. That is, system 50 controls the speech processor 60 (and associated disk read interrupt routine) to seek directly to the point in the phrase file pointed to by the left-hand pointer l and to begin playing back the file from that point until the point pointed to by the right-hand pointer r (at which point the play back ceases) (block 378). The effect is that the user can select and "play back" any arbitrarily small portion of the current phrase (within the range of resolution of variables l and r—0.1 seconds in the preferred embodiment) without having to hear the remaining part of the phrase (and also without having to wait for the delays during which the remaining portions of the phrase would be played back). In the preferred embodiment, the CLIP mode is more than merely a "mute" function since it actually presents only the desired digitized speech data to speech processor 60 for conversion to audio signals.

Figure 8A:
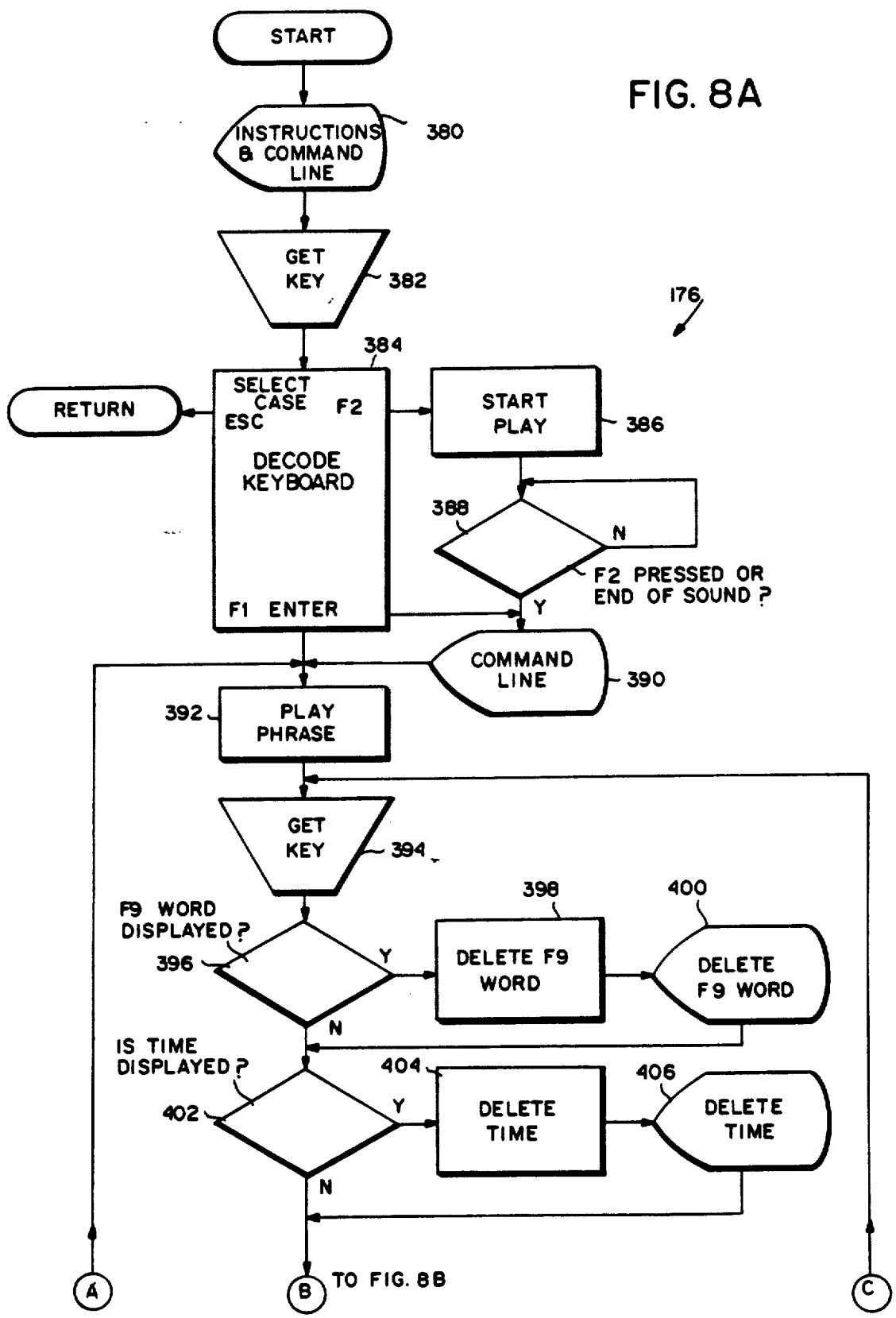
FIGS. 8A-8B are together a schematic flow chart of exemplary program control steps related to the AudioWrite routine (function) shown in FIG. 6.
Figure 8B:
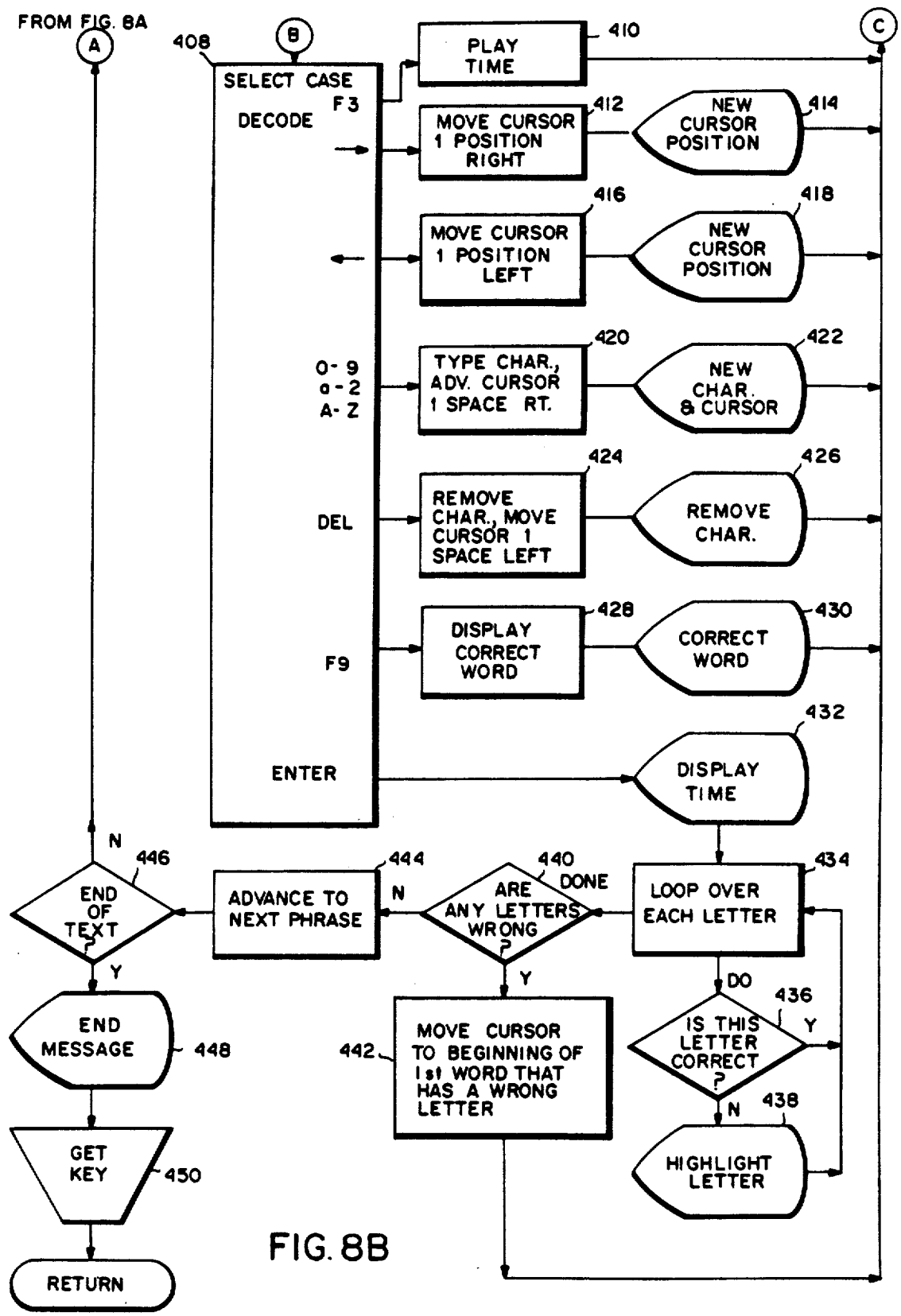

FIGS. 8A-8B are together a flow chart of exemplary program control steps performed by system 50 to implement the AudioWrite function shown in FIG. 6. When the student selects the AudioWrite function (see FIG. 6, blocks 172, 176), instructions in a command line are displayed (block 380) and then system waits for the student to select one of the options presented to him by the AudioWrite function. Depressing the ESC key causes control to return to the main routine (FIG. 6, block 170). The student may depress the F2 key to play back the audio corresponding to the current lesson (blocks 386, 388). Depressing the F1 key or the enter key causes system 50 to display a command line (block 390) and then play back the first phrase from the current lesson (block 392). System 50 then waits for the student to input either the words matching the phrase he just heard or a control key (block 394). If a word from the model text is displayed upon depressing this key, this word is removed from the display (blocks 396-100)—and likewise, display of the elapsed time is suppressed if the elapsed time is displayed when the next key is depressed (blocks 402 and 406).

The code block 408 then determines which key the user has depressed. If the user depresses the F3 key, the time that has elapsed since the AudioWrite exercise began is displayed in a conventional manner (block 410). The cursor control keys cause the cursor to move to the right or the left on display 58 (blocks 412-418).

The "object" of the AudioWrite exercise is for the student to input alphanumeric characters which match the phrase he is hearing from speech processor 60 (and thus also the textual version of the same phrase from the main text). If the student inputs an alphanumeric key, the character corresponding to the key he inputs is displayed on the display and the cursor is moved one character to the right (blocks 420, 422). Block 420 also causes the character corresponding to the key depressed by the user to be added to a text string buffer for analysis when the user depresses the enter key. System 50 automatically "fills in" spaces and punctuation and changes the case of the displayed characters if necessary to match the "model" text. If the user depresses the delete key, the character displayed immediately to the left of the cursor is deleted from the display (and also from the text string buffer) (blocks 424, 426). If the student depresses the F9 key, a word from the model text corresponding to the exercise is displayed in the lower right-hand corner of display 58 in the preferred embodiment (blocks 428, 430). Depressing the enter key causes system 50 to check the user inputted contents of the text string buffer against the model text string (character by character) and indicate errors in the user inputted string—as will now be explained.

Upon depressing the enter key, system 50 first displays the elapsed time in the lower right-hand corner of display 50 (block 432). System 50 then scans through the student inputted text string buffer one character at a time beginning with the first character in the buffer (block 434). System 50 compares, for example, the first character in the student inputted buffer with the first character of a model text string stored on mass storage device 56 corresponding to the current phrase. If these two characters correspond, no action is taken (decision block 436). On the other hand, if the characters do not correspond, the display of the first character is highlighted on display 58 (block 438). This process (blocks 434-438) continues until all letters in the student inputted text string buffer have been compared with the model text string characters (spaces and punctuation being ignored). If any letters are incorrect (decision block 440), system 50 moves the cursor to the beginning of the first word that has a wrong character to permit the student to correct his error (block 442). If all characters of the student inputted text string correspond exactly to the characters in the model text string (meaning that the student-inputted string is both entirely correct and complete), system 50 waits for enter to be depressed, then advances to the next phrase (block 444) and repeats blocks 392-442 for that next phrase. If the entire lesson has been analyzed (as tested for by decision block 446), an end of lesson message is displayed (block 448) and upon inputting another key (wait block 450) control returns to FIG. 6 block 170.

Figure 9B:
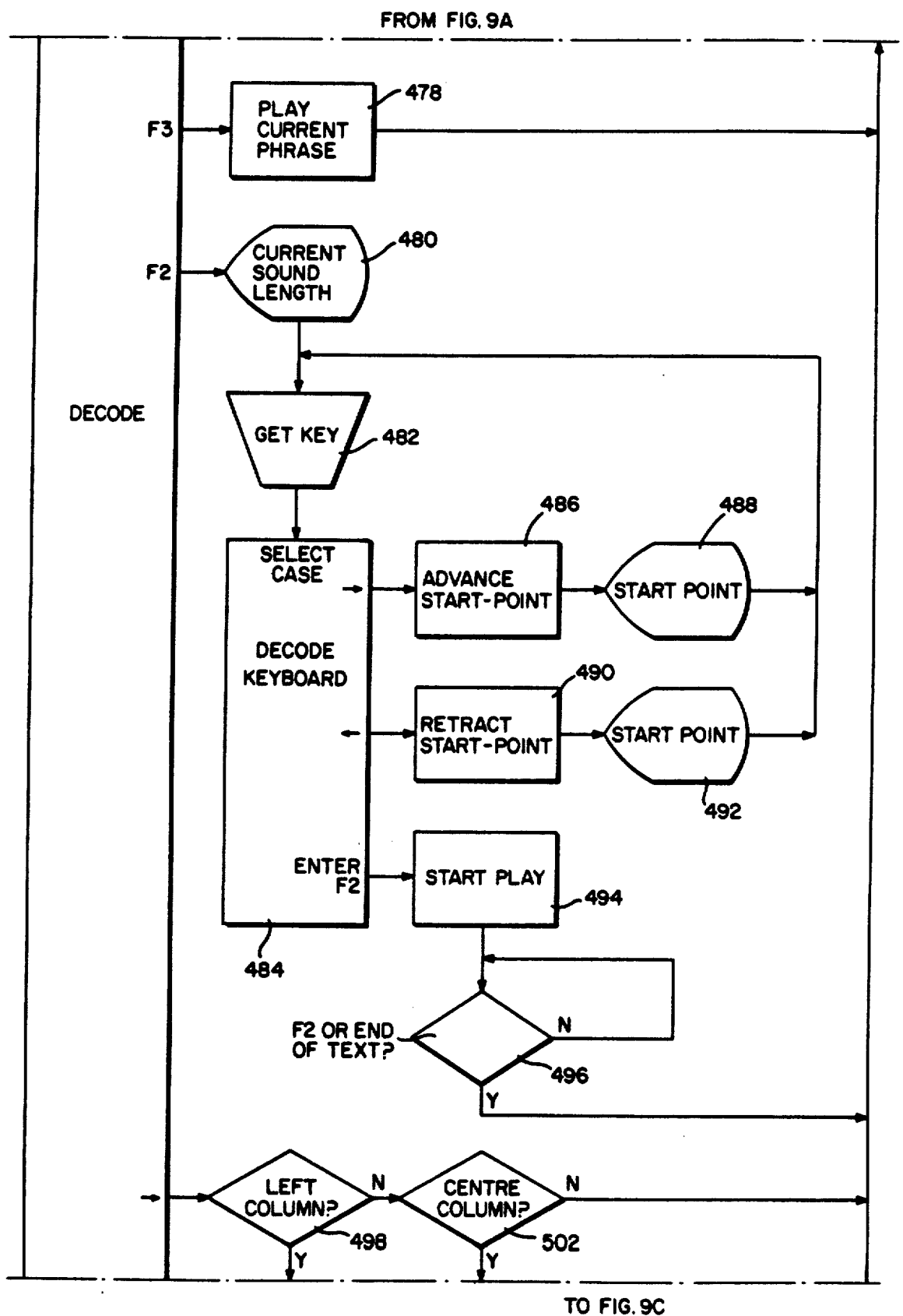
FIGS. 9A-9C are together a schematic flow chart of exemplary program control steps performed by the FIG. 1 system upon execution of the SoundSort routine (function) shown in FIG. 6.
Figure 9C:
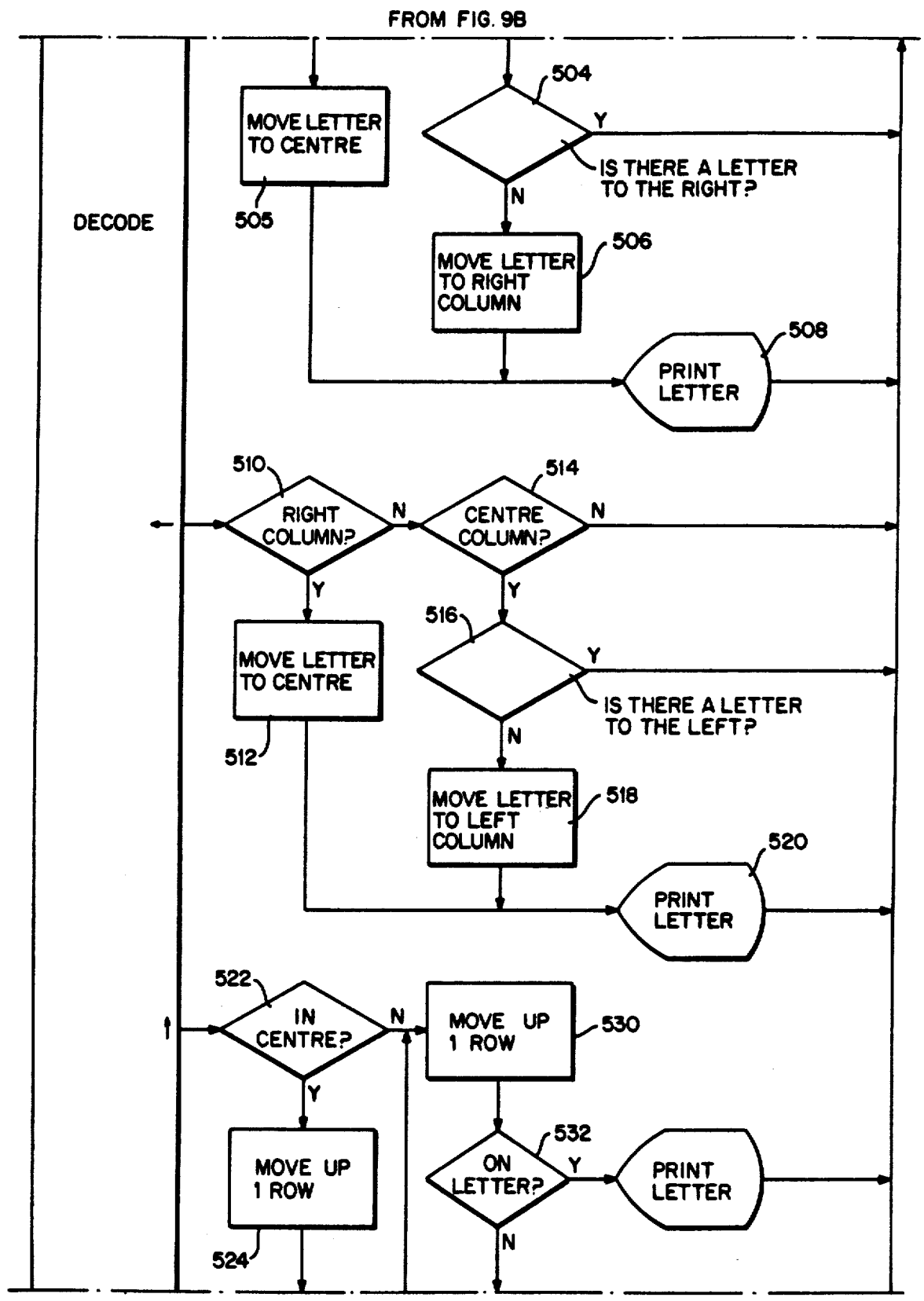
Figure 9D:
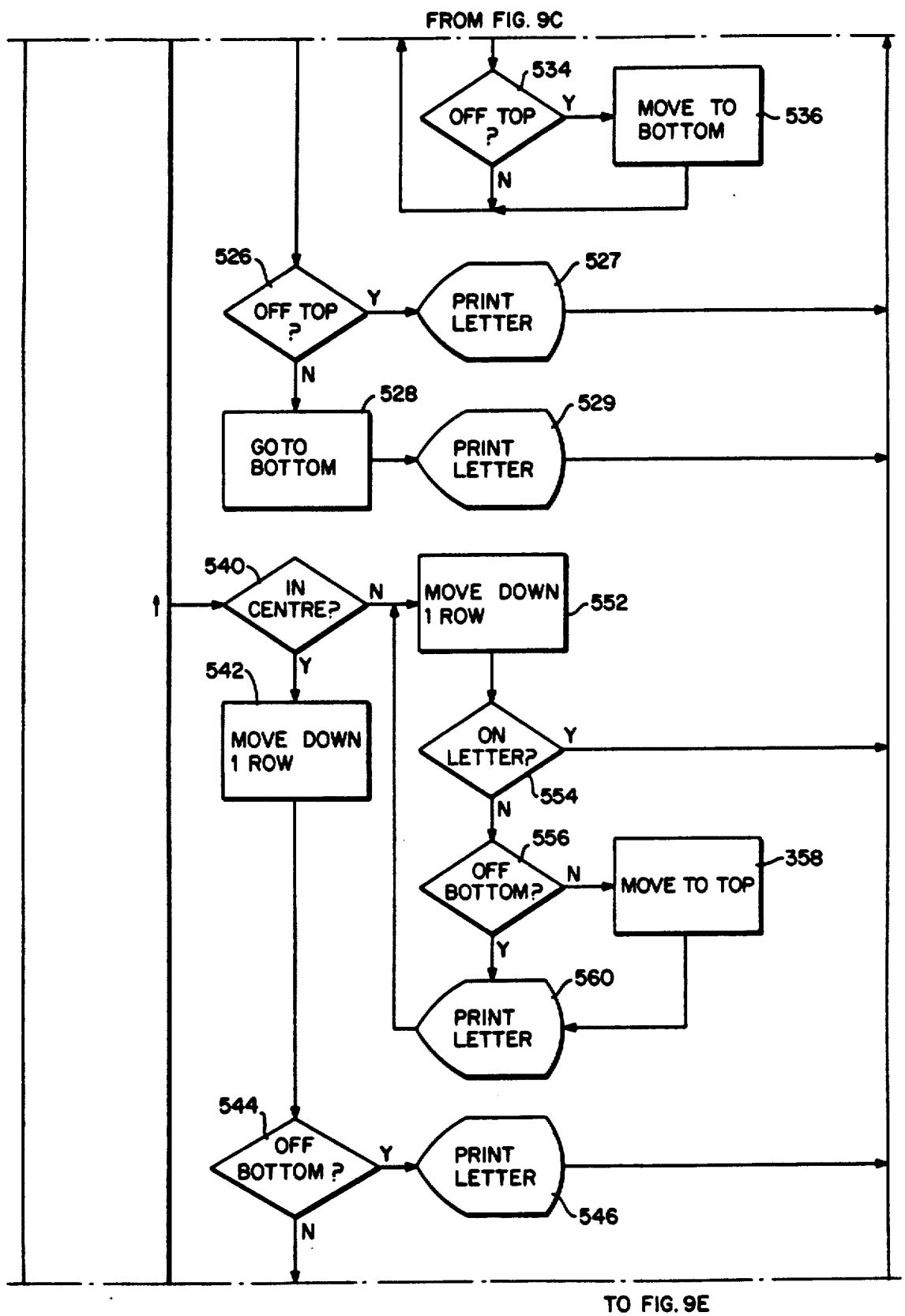
Figure 9E:
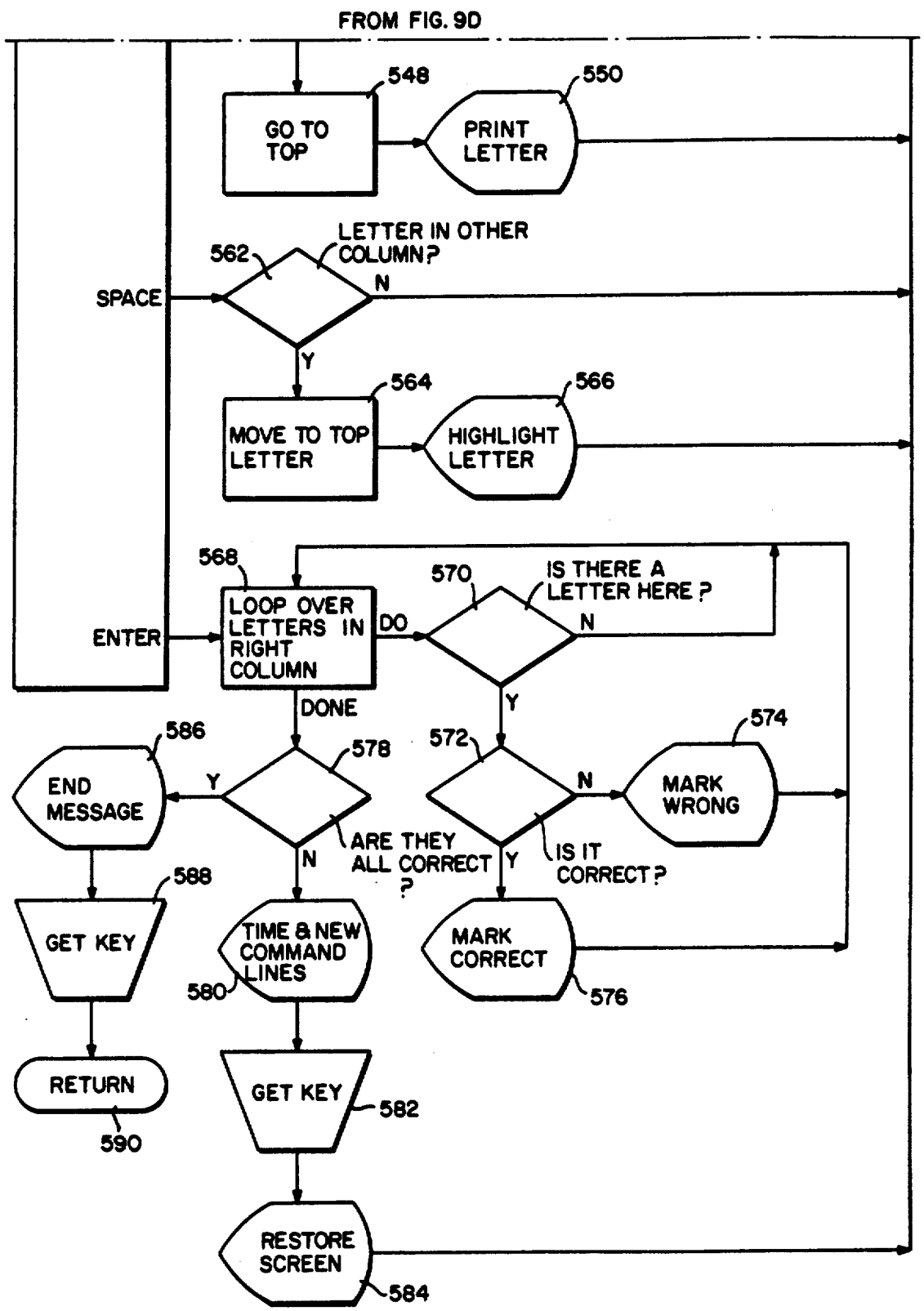

FIGS. 9A-9C are together a detailed flow chart of exemplary program control steps performed by system 50 to implement the SoundSort function of the preferred embodiment of the present invention. As will be recalled from the discussion above, the SoundSort function presents the student with a game in which he is expected to move symbols on display 58 corresponding to phrases of a sentence or passage into the correct order (after system 50 has reordered the phrases into a random order).

Upon initiating the SoundSort routine (from decode block 172, FIG. 6), it is first determined (e.g., by checking a flag) if this is the first time the student has used SoundSort in this session (decision block 452). If the current execution is the first time of use, an introductory screen explaining how to play the SoundSort game is displayed by display 58 (blocks 454, 456). System 50 then accesses a sentence or passage of the lesson stored on mass storage device 56, this sentence including plural phrases. In the preferred embodiment, only passages with a relatively small number of (e.g., a maximum of 21) phrases are especially suitable for SoundSort since the SoundSort function uses the first 21 phrases of a given lesson (additional phrases are ignored). SoundSort then randomizes the sequence of phrases within the lesson (e.g., using a conventional pseudo-randomizing algorithm) to provide a randomized ("jumbled") sequence of the original phrase sequence.

System 50 then assigns a symbol (alphabetical letters in the preferred embodiment) to each one of the random-order phrases (block 458). For example, suppose the four phrase sequence involved is: "Cats" "have" "four" "legs." With each word being a discrete phrase, block 458 might randomize the order of the phrases to result in: "Four" "legs" "cats" "have", and then assign the symbol A to symbolize the phrase "four"; the symbol B to symbolize the phrase "legs"; the symbol "C" to symbolize the phrase "cats"; and the symbol "D" to symbolize the phrase "have". System 50 then displays on display screen 58 the symbols corresponding to the reordered phrase sequence in the left-hand column of the display (see FIG. 5) so that the phrases, if heard in the order of the symbols displayed on the display, would be in the randomized order (block 460). System 50 then waits for the student to depress a key to select the next function to be performed (blocks 462, 464).

The SoundSort function 178 in the preferred embodiment provides a help screen giving the student instructions for what to do next if he gets confused (blocks 472-476). The student may exit the SoundSort function 178 at any time by depressing the ESC key (decode block 464). If the student confirms he wishes to leave the SoundSort function, a return to main routine block 170, FIG. 6A is performed (blocks 468, 470). On the other hand, if the student does not confirm he wishes to leave the SoundSort function, he is returned back to the get key block 462 to select the next function (decision block 468).

If the student depresses the F3 key in the preferred embodiment, system 50 plays back the phrase associated with the symbol the cursor is presently pointing to (block 478). Upon depressing the F2 key, system 50 displays on display 58 a prompt which prompts the user for "starting point?" (block 480), and then waits for the user to input another selection (blocks 482, 484). By striking the F2 key, the student may playback the entire sequence of phrases in their correct order—or can select a portion of the correctly ordered sequence of phrases to hear the audio corresponding to. After the depressing the F2 key, if the student again depresses F2 (or depresses the ENTER key), system 50 plays back a phrase sequence beginning at a portion of the sequence pointed to by a pointer called a "start point" which is initially set at the beginning of the correctly ordered phrase sequence (but may be changed by the student) (block 494). Once the phrase sequence playback has begun, it will continue to the end of the sequence of phrases or until the student again hits the F2 (decision 496). If, instead of striking the F2 key or the ENTER key, the student depresses the left arrow or right arrow keys in the preferred embodiment, the effect will be to change the value of start point. In particular, if the student depresses the right arrow key, the start point pointer value is advanced in the phrase sequence and its new value is displayed (blocks 486, 488). Similarly, by depressing the left arrow key, the start point pointer value is retracted toward the beginning of the phrase sequence (blocks 490, 492). This allows the student to concentrate on the last portion of the correctly ordered phrase sequence, for example, (or on any portion of the phrase sequence since he can strike the F2 key to discontinue phrase sequence playback) and is especially useful for long phrase sequences since it permits the student to listen to three or four phrases in the sequence, for example, rather than the entire sequence (which may be of arbitrary length).

In the preferred embodiment, the left arrow and right arrow cursor control keys only have the effect of changing the phrase sequence playback beginning point after the F2 key has been depressed. Otherwise, they control movement of the displayed symbols on display screen 58. Depressing the right arrow key causes system 50 to first determine whether the curson is in the left column or the center column (decision blocks 498, 502, respectively). The objective in the SoundSort function is to move the symbols displayed in the left column further to a center column—and then to move those symbols into a right-hand column in the correct order based upon aural clues. If the cursor is in the left column (and thus is pointing to a symbol displayed in the left column), and the user depresses the right arrow key, the symbol pointed to by the cursor is removed from the left column and displayed in the center column (block 500), using conventional screen control techniques. Similarly, if the cursor is pointing to a symbol in the middle column and the user depresses the right arrow key, the symbol is moved to a right column position so long as there isn't already a symbol displayed immediately to the right in the right column (decision block 502, 506). Striking the left arrow key permits the student to move a symbol in the right column back to the middle column or from the middle column back to the left column (blocks 510-520).

In the preferred embodiment, the student changes the order of symbols by moving them to the center column and then moving them vertically before placing them into "slots" in the right column (these slots correspond to entries in an array maintained in memory). Upon depressing the up arrow key, for example, system 50 first determines whether the cursor is pointing to a symbol in the center column (decision block 522). If so, the pointed to symbol is moved up one row in the center column (thus, the symbol is already in the top row in which case it is wrapped around to the bottom) (blocks 524-528). If the cursor points to a symbol in the left-hand or right-hand column, on the other hand, the cursor is moved up one row (block 530) and then system 50 determines whether the new cursor position is on the letter in the left or right column (decision block 532). If the cursor does not point to a letter in its new position, it is either moved up or wrapped around (decision block 534, 536). Similar symbol movement occurs upon depressing the down arrow key (blocks 540-560).

Depressing the space bar in the preferred embodiment controls the cursor to move between left and right columns. For example, if there are symbols displayed in both the left column and the right column and the cursor is presently in the center column, striking the space bar will do nothing. Space only has an effect if the cursor is in either the left or right column. In the preferred embodiment, the space bar will only move the cursor to columns where symbols are displayed. It only moves the cursor between the left and the right columns (and is ignored when the cursor is in the center column), and always results in the cursor pointing to the uppermost symbol in the new column (blocks 562, 564, 566).

Depressing the ENTER key controls system 50 to check the right column entries to determine which ones are correct and which ones are incorrect so that the student can monitor his progress. Upon depressing the ENTER key, system 50 examines the contents of the right column positions one at a time (block 568). If the student has moved a symbol into a certain position, system 50 compares that symbol with a symbol order string (array) it formed at block 458 indicating the correct order of the symbols (decision block 570). If the symbol under examination in the right-hand column corresponds to the symbol order (array) in the model symbol string, it is marked on the display as being correct (blocks 572, 576). If the symbol is incorrect, it is marked on the display as being wrong (e.g., by highlighting) (blocks 572, 574). After all of the right-hand column positions have been marked correct or incorrect by blocks 570-576, system 50 determines whether any one has been marked incorrect (decision block 578). If at least one symbol in the right-hand column is wrong (or missing), an elapsed time indicator is displayed along with new command lines and system 50 then waits for the student to depress a key (blocks 580, 582). Upon depressing a key, the work screen is restored to permit the student to continue moving the symbols (blocks 584, 462, 464). If, on the other hand, the student has successfully moved all of the symbols to the right-hand column in the correct order, an end message is displayed (block 586) and control returns to main routine (blocks 170, 172).

STUDIO ROUTINE

Figure 10:
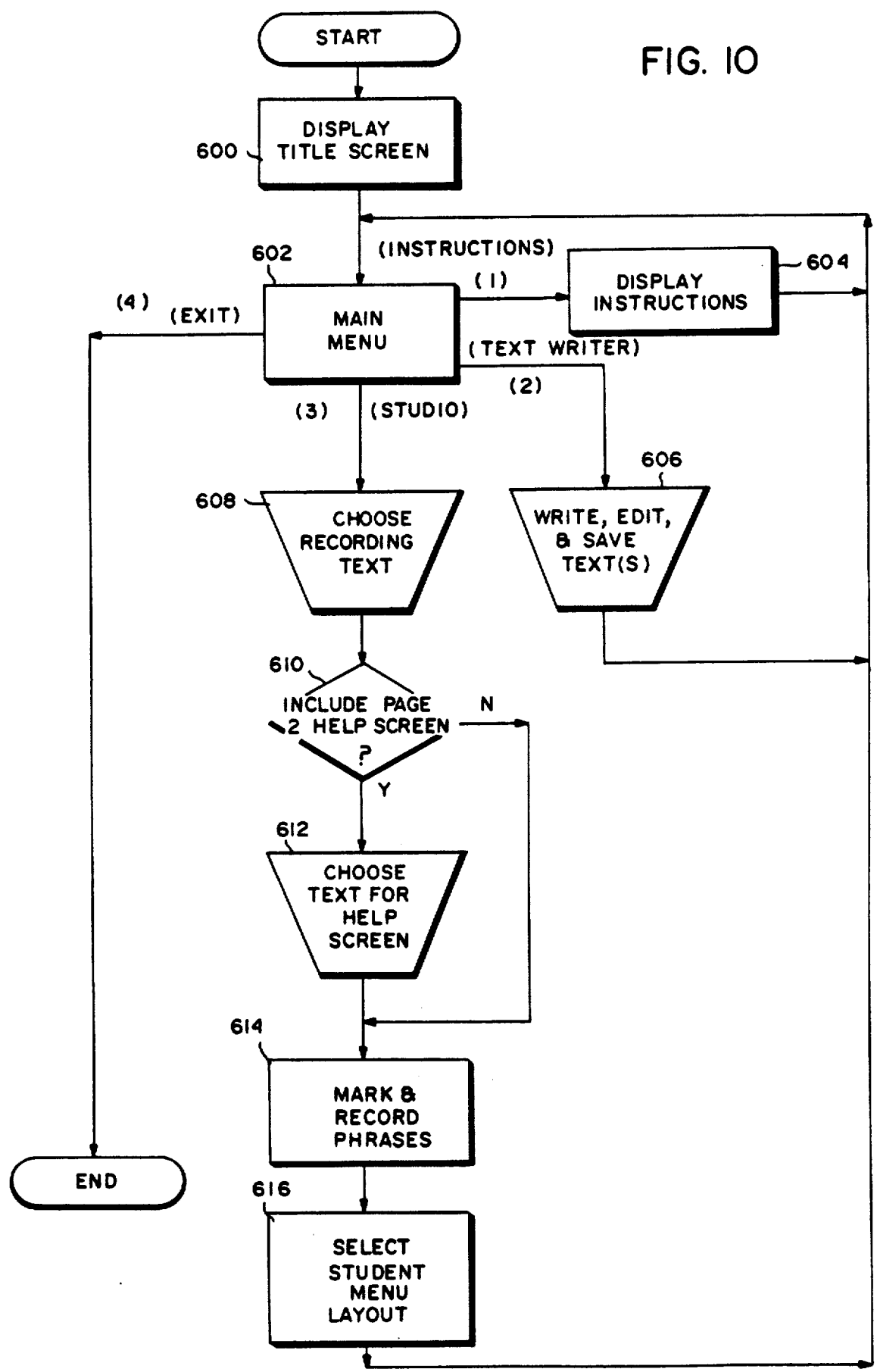
FIG. 10 is a high-level schematic flow chart-type diagram of the options presented to a teacher by the FIG. 1 system to permit the teacher to create lessons.

FIGS. 10-16 describe utilities provided by the presently preferred exemplary embodiment of the present invention to permit a teacher to form and/or customize lessons and exercises for use by students. FIG. 10 is a high-level flow chart-type diagram of the user interface presented to the teacher. Upon starting the studio routine in the preferred embodiment, the title screen is displayed along with options available to the teacher (block 600). In the preferred embodiment, the teacher may select between four different options (1) an instruction display; (2) a Text Writer word processor-type function; (3) an AudioLab studio function; (4) exit. In the preferred embodiment, selecting option number 1 displays an instruction screen (block 604) in which the teacher is told about a suggested general methodology for using the AudioLab studio and Text Writer functions. Briefly, the teacher generally first uses the Text Writer function to type in one or more screens of text the students are to view on the screen during the lesson —including the page one and page two screens described previously. The page one screen generally is (but need not be) the textual version of the recorded audio. The page two screen may be help or instructions. After the Text Writer function (block 606) has been used to input one or two screens of text, the AudioLab studio function is used to convert spoken audio into digitized speech phrase files stored on mass storage device 56 and to associate that recorded audio with the text previously entered using the Text Writer function. Specifically, the teacher first chooses recording text (block 608) and then may choose whether of not to include a page two help screen (block 610, 612). The teacher then marks and records phrases using speech processor 60 (block 614), and is finally permitted to select student menu layout for the lesson (block 616).

In the preferred embodiment, in the TextWriter routine (block 606) a format different from ASCII is used for convenience and a utility is provided for converting from ASCII to the different format. Preferably, the text files created by the Text Writer program routine (block 606) are of limited length so that they can each fit on a single display screen (80×21).

Figure 11A:
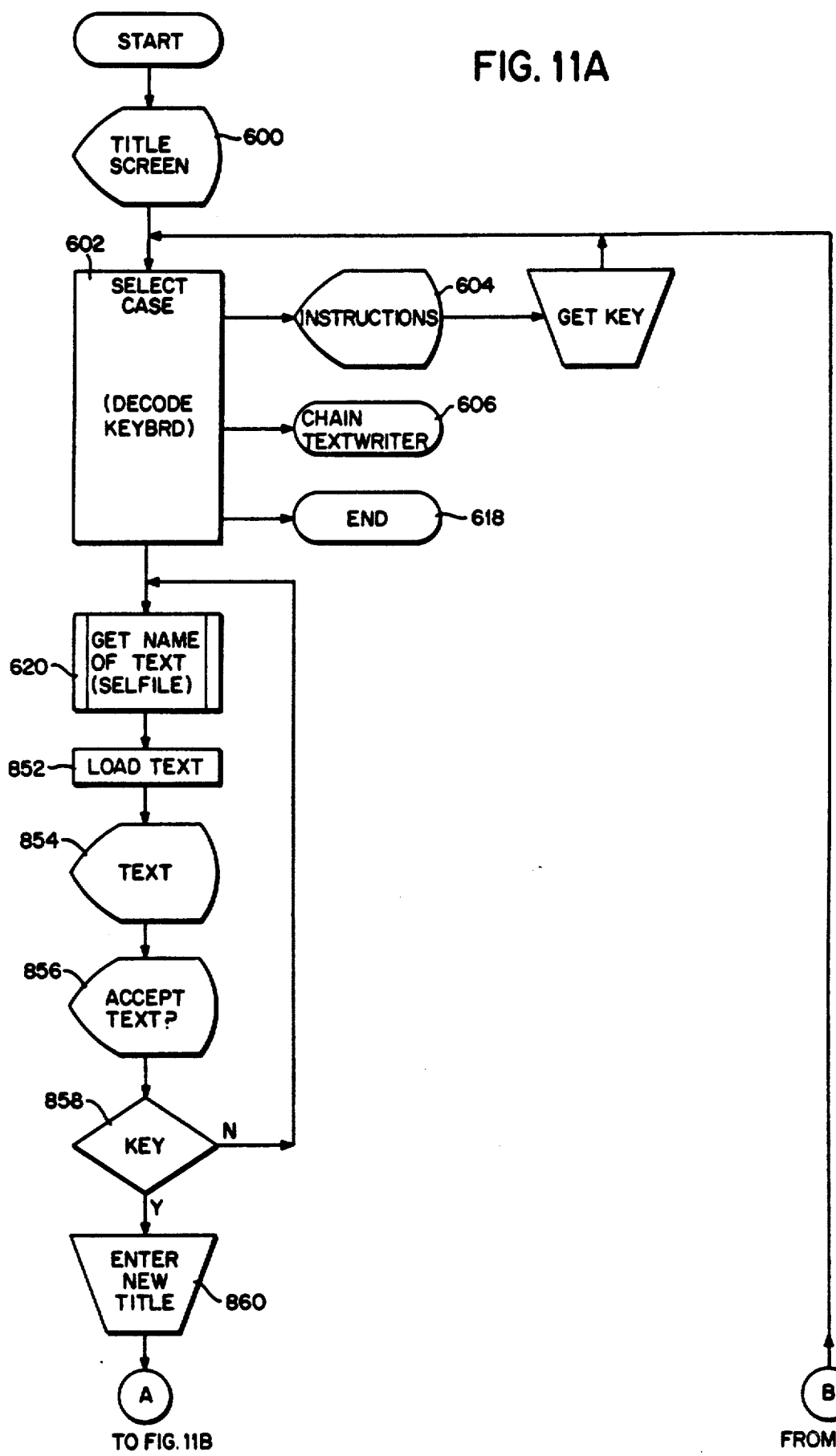
FIGS. 11A-11E are together a schematic flow chart of exemplary program control steps performed by the FIG. 1 system to permit a teacher to create lessons.
Figure 11B:
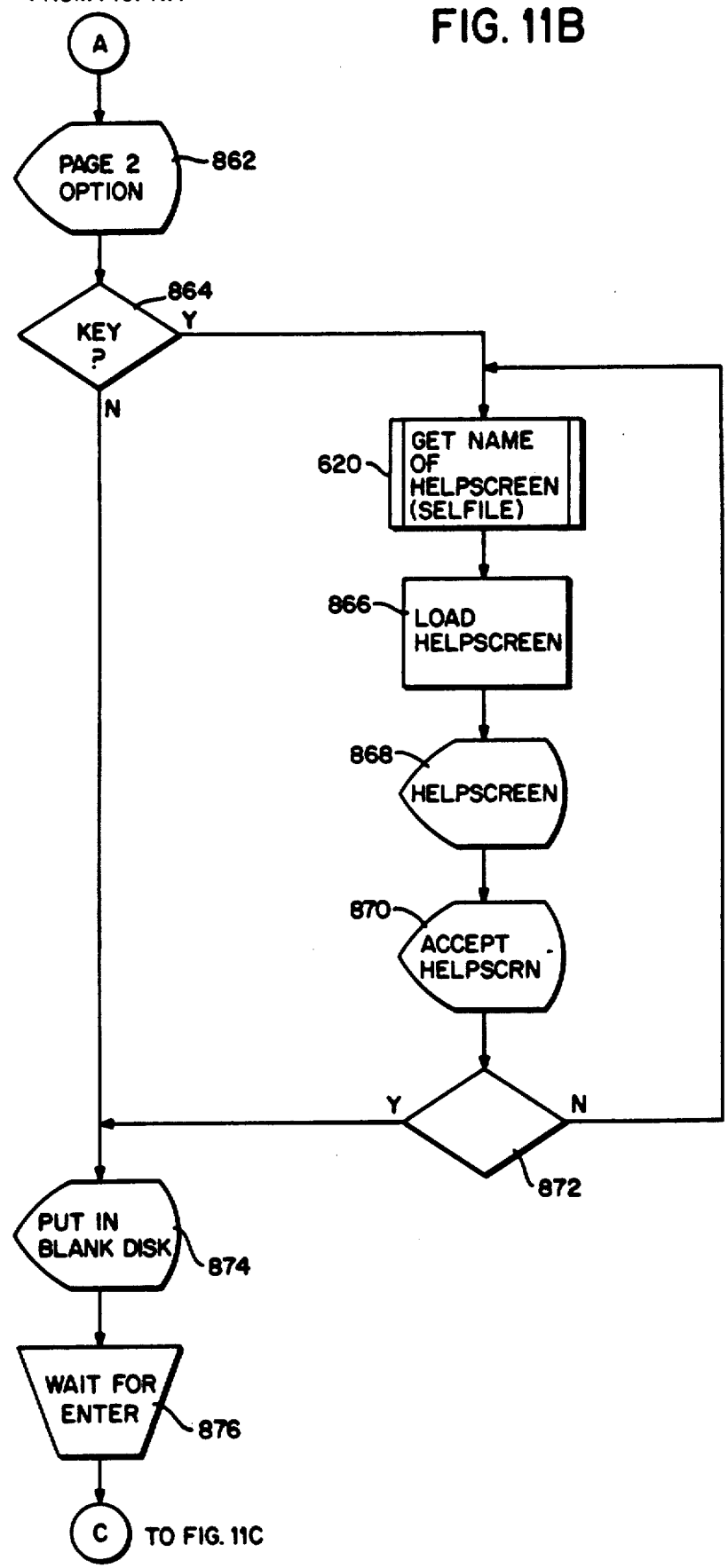
Figure 11C:
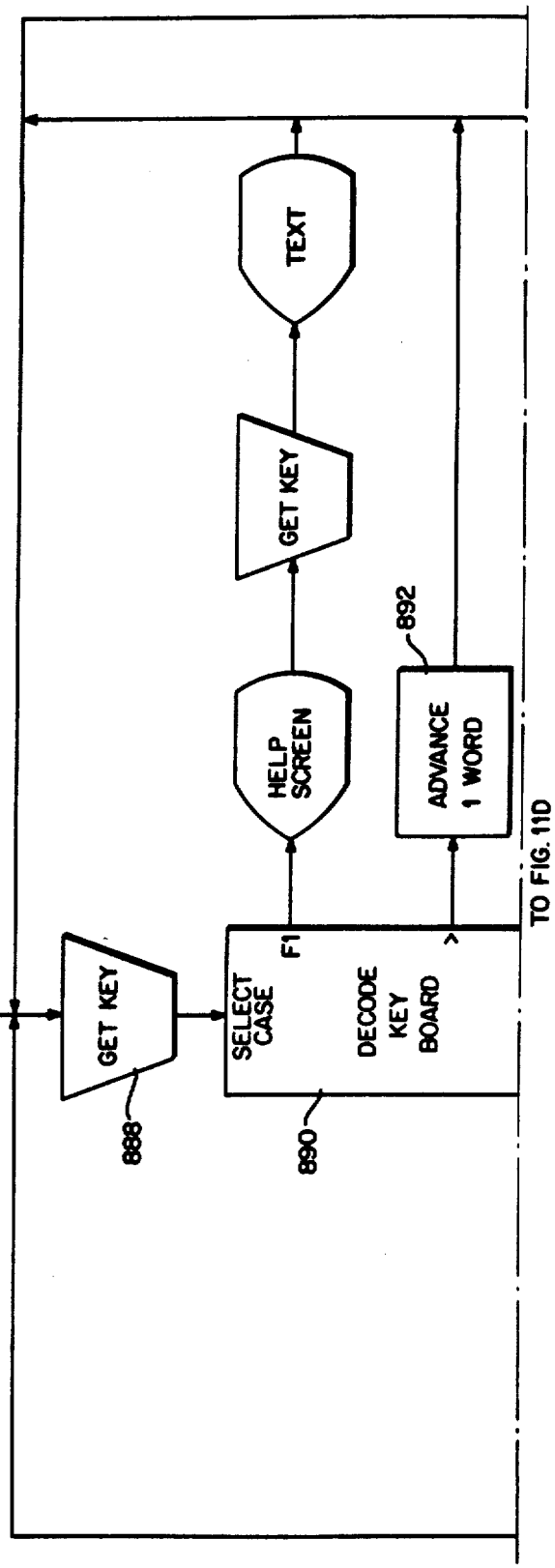
Figure 11D:
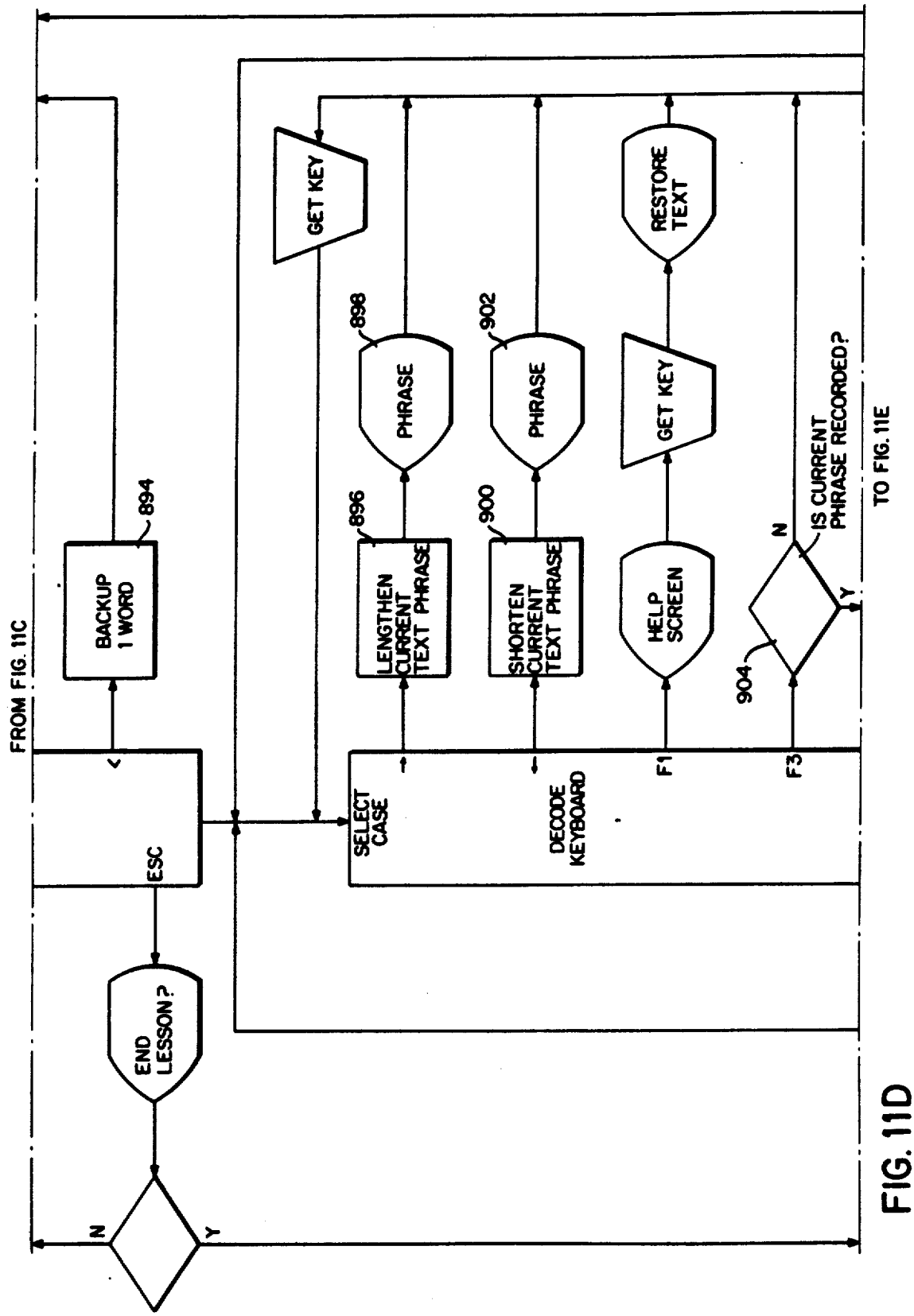
Figure 11E:
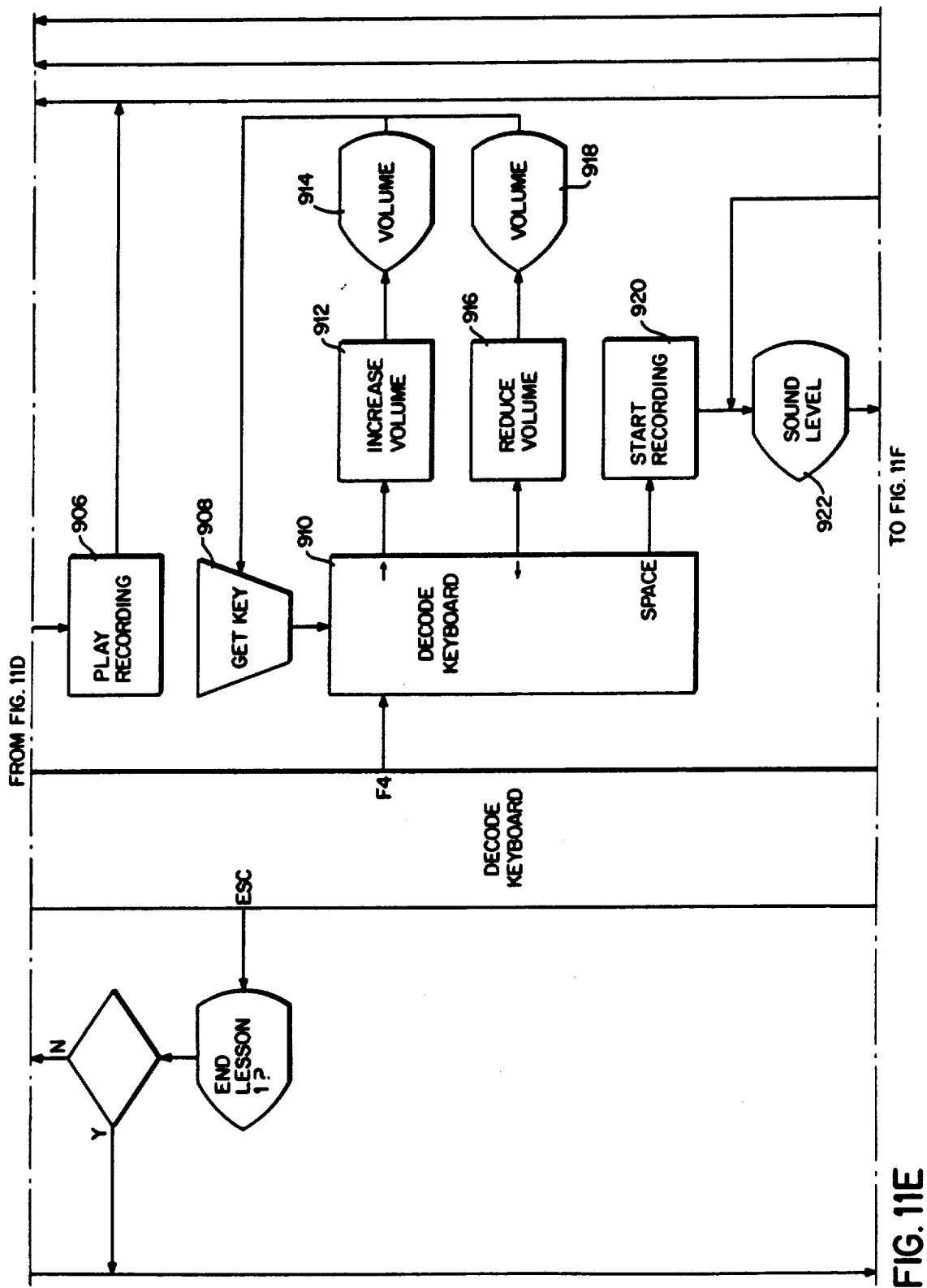
Figure 11F:
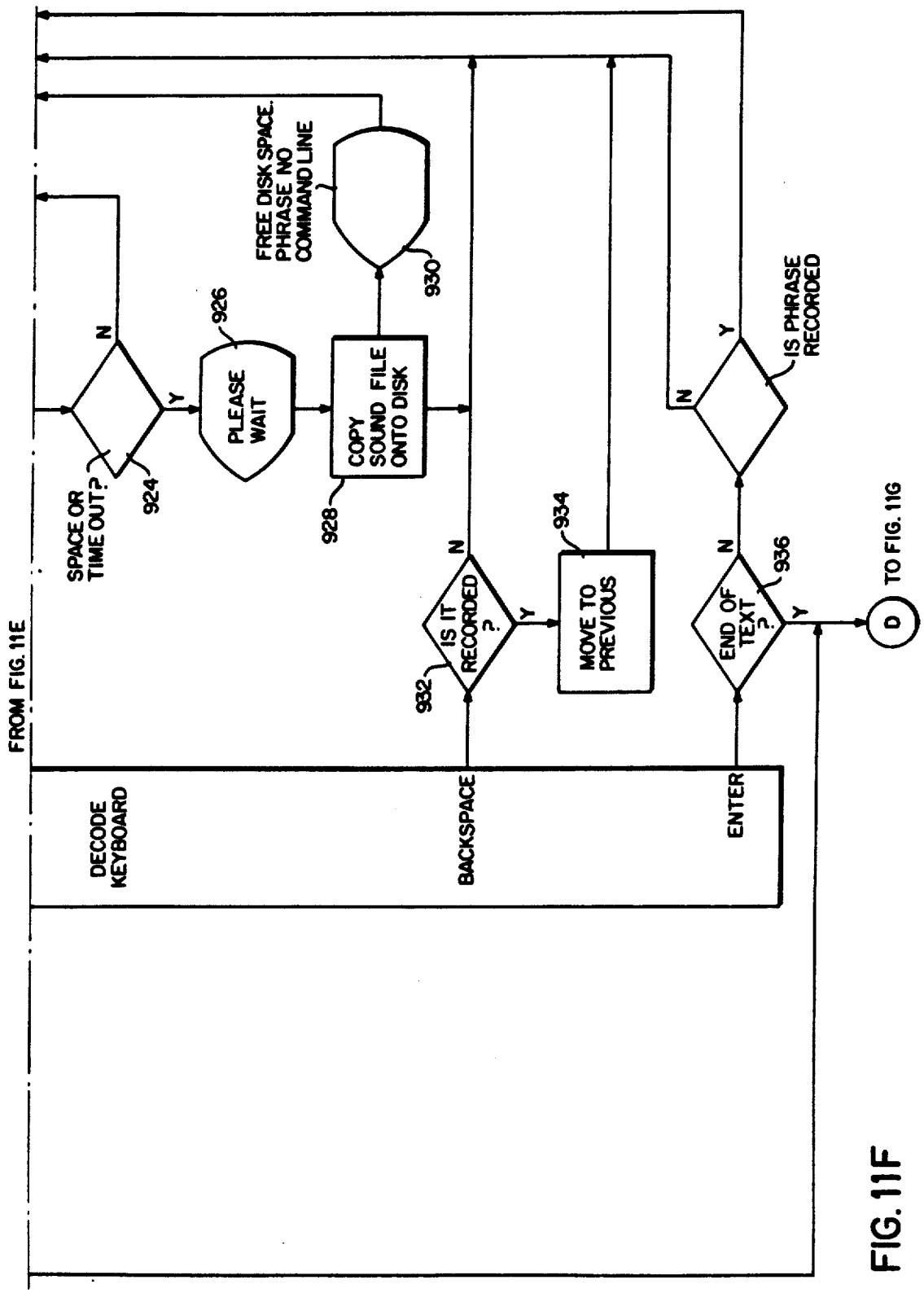
Figure 11G:
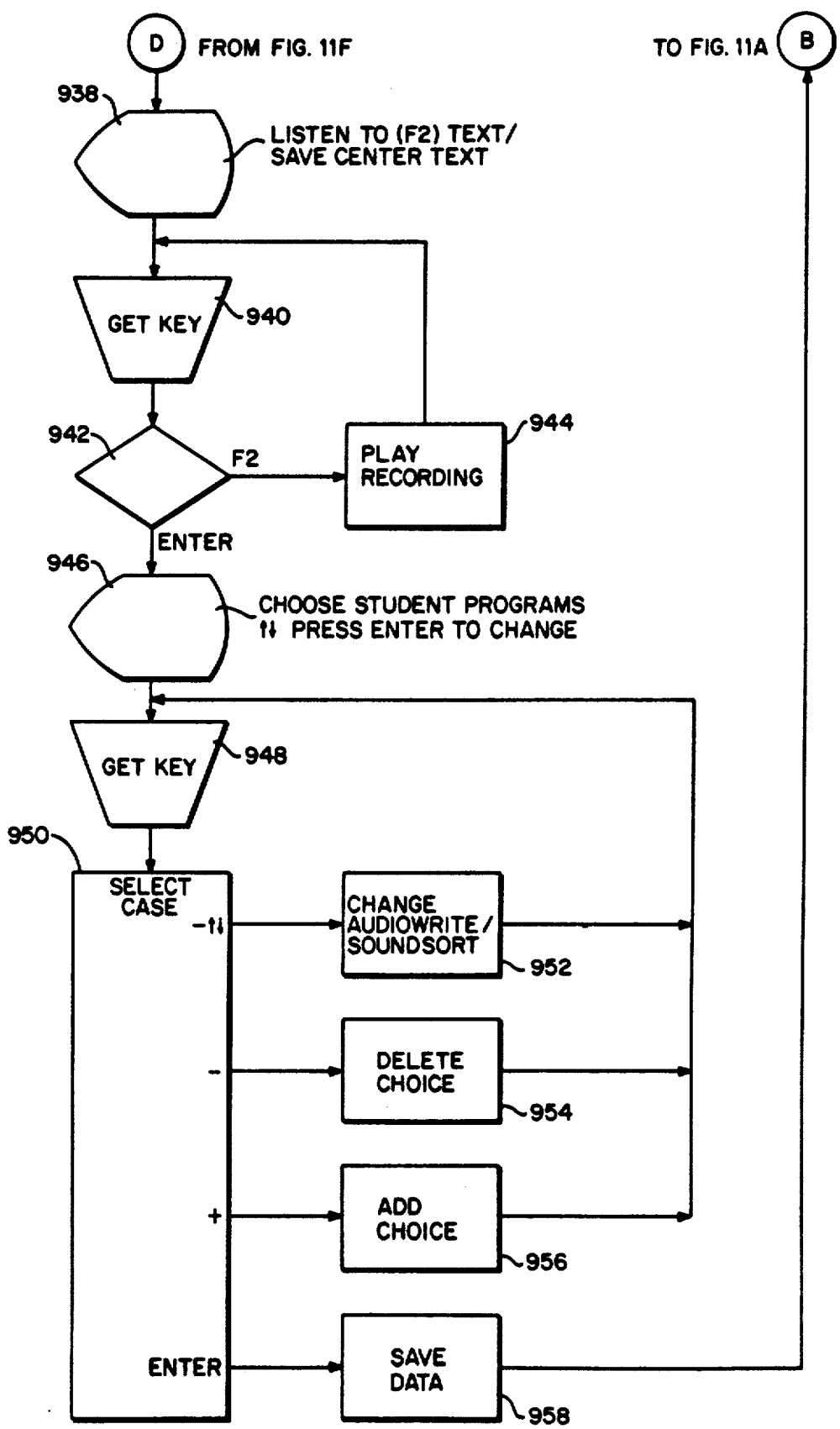
Figure 12A:
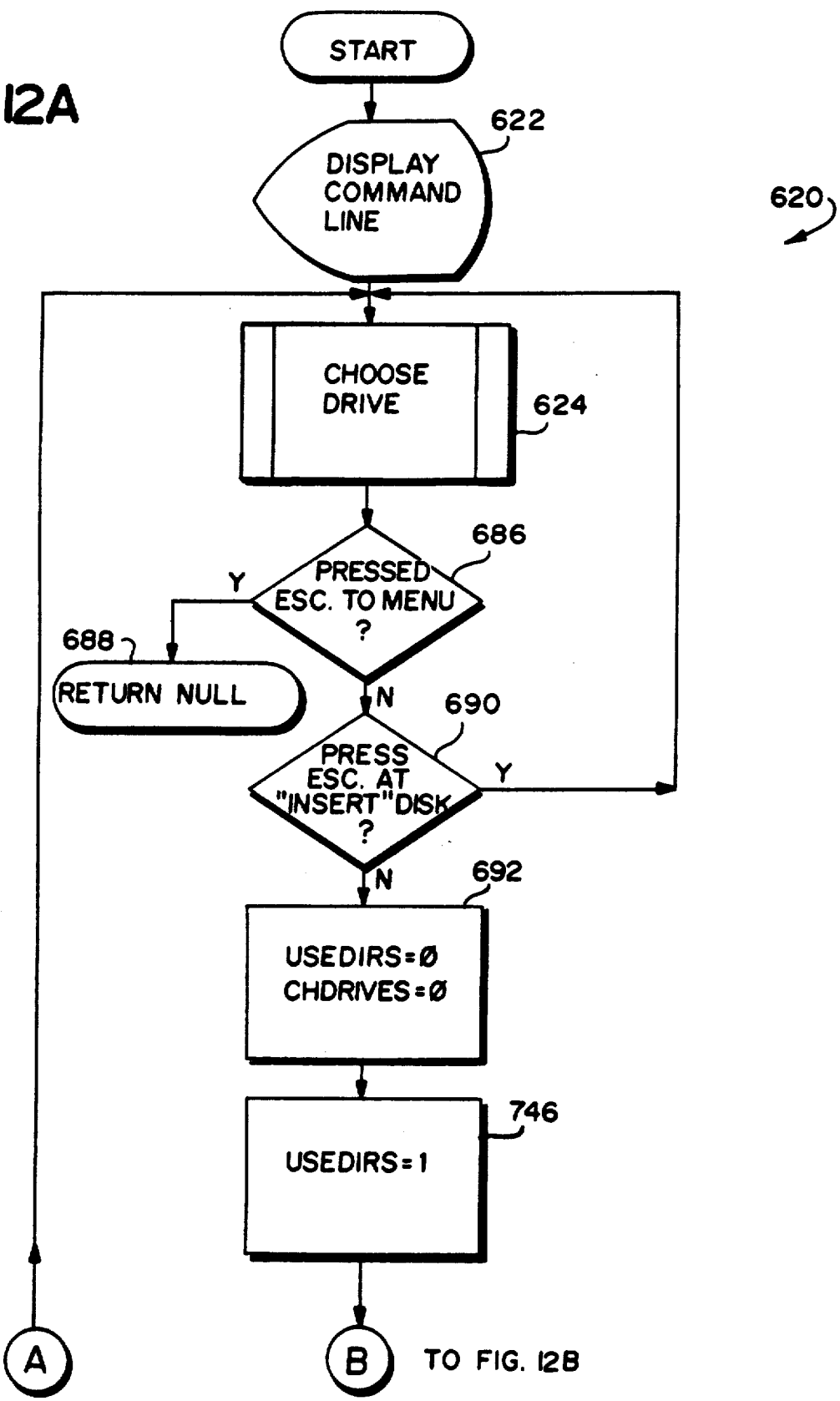
FIG. 12 is a flow chart of exemplary program control steps performed by the "Select File" routine shown in FIG. 11A.
Figure 12B:
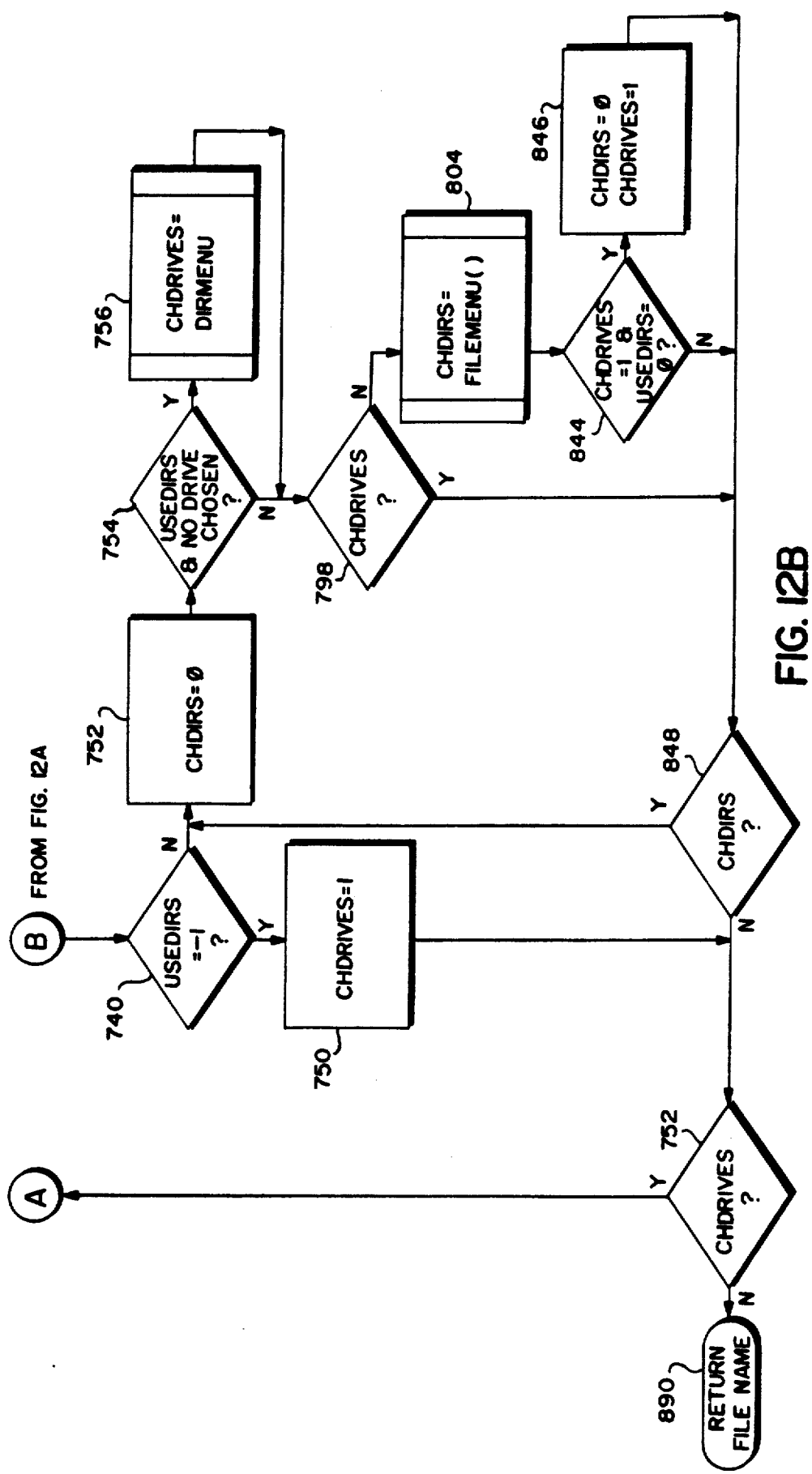
Figure 13A:
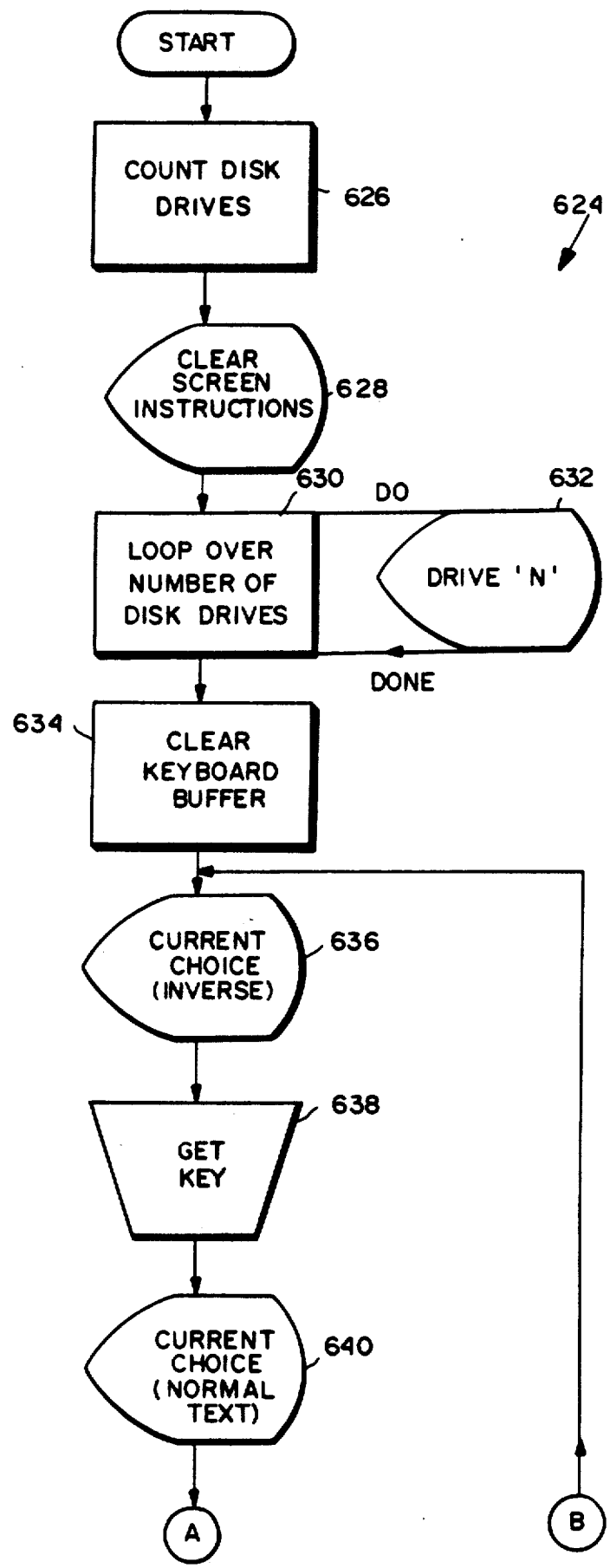
FIG. 13 is a schematic flow chart of exemplary program control steps performed by the "Choose Drive" routine shown in FIG. 12.
Figure 13B:
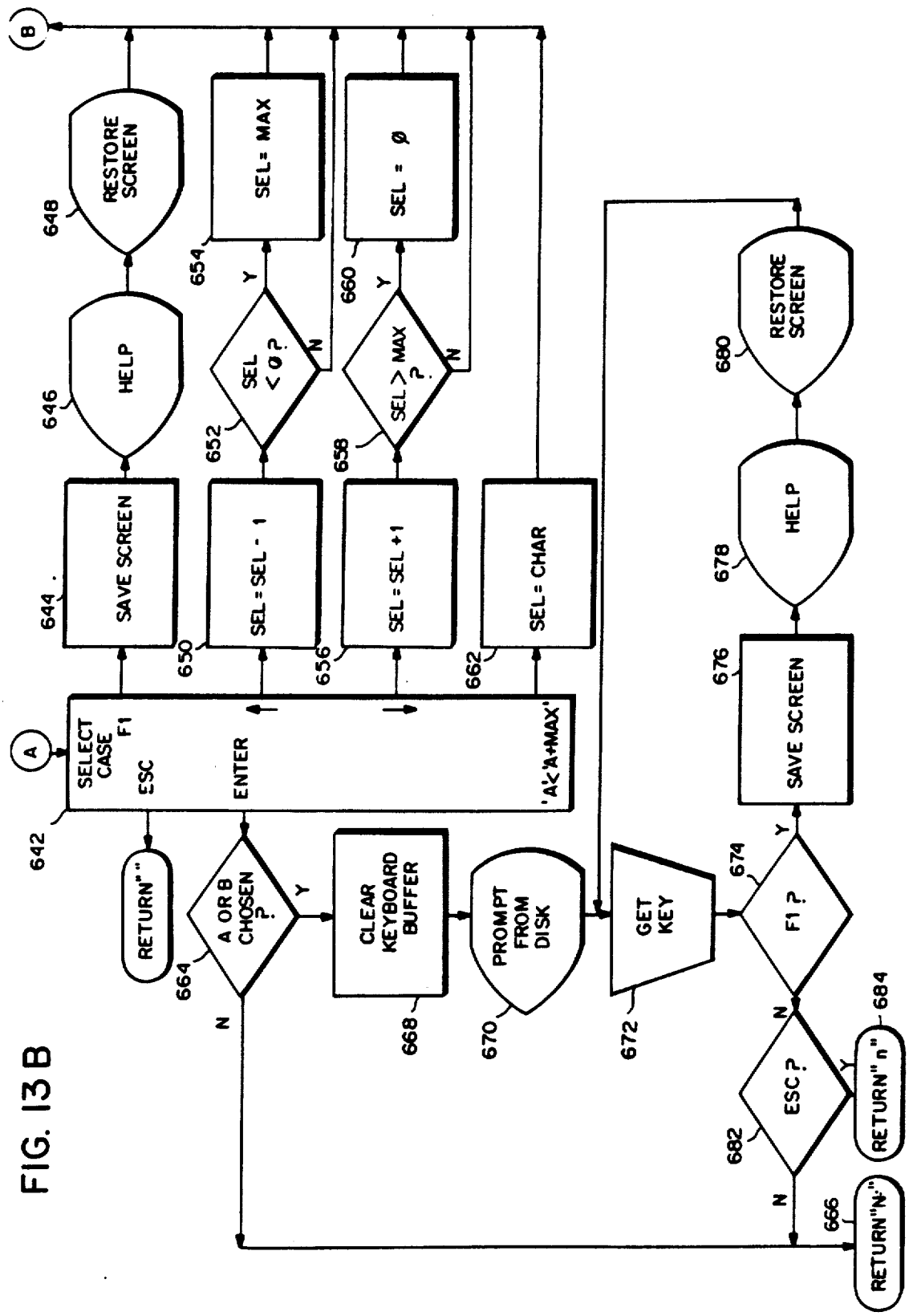

FIG. 11A is a detailed flow chart of exemplary program control steps performed by the studio routine shown in FIG. 10. As mentioned previously, upon initiating this studio routine, the title screen is displayed (block 600) and then the keyboard input is decoded to allow the teacher to select one of four options (block 602). Instructions may be displayed, the text writer conventional word processor may be called (block 606) or the studio routine may be exited. Once the teacher has inputted one or two text screens using the Text Writer word processor, he may select the AudioLab studio routine to actually assemble the textual and audio components of a lesson (beginning at block 620). Upon selecting the AudioLab studio function, system 50 first calls a select file routine (named "selfile" in the preferred embodiment) to choose a main text format to be associated with the lesson. A detailed flow chart of the select file routine 620 is shown in FIG. 12.

Upon initiating the select file routine 620, system 50 first displays a command line (block 622) and then calls a routine called "choose drive" 624 to permit the teacher to select which of several drives he wishes to use. As is well known, personal computer 52 may have one or more hard disk drives and one or more floppy diskette drives (all of which are shown schematically in FIG. 1 as mass storage block 56). Generally, the teacher wishes to store lessons on floppy diskettes so that they can be easily copied and distributed to students. The choose drive routine 624 (shown in detail in FIG. 13) uses conventional MS/DOS utilities in the preferred embodiment to count the number of disk drives (block 626), then clears the display screen 58 (block 628) and then displays a window setting forth the drive designations of each of the existing mass storage drives (blocks 630, 632). The personal computer 52 keyboard buffer is then cleared (block 634) and system 50 prompts for the teacher's choice (block 636–642) Depressing the F1 key displays help text (block 644–648). If the teacher depresses the up arrow or down arrow cursor control keys, different drive designation options displayed by display 58 are highlighted so as to permit the teacher to alter the drive selection in a conventional manner (blocks 650–660). If the teacher keys in a valid drive designation letter rather than using the cursor controls, that value is selected as the designated drive (block 662). Otherwise, depressing the ENTER key causes the drive designation selected by the cursor control keys to be selected. Upon depressing the ENTER key, system 50 first determines whether the A or B floppy diskette drives have been chosen (decision block 664). If not, then a hard disk has been selected and the hard disk designation is returned (block 666). If a floppy diskette drive has been selected, (decision block 6664), the keyboard buffer is cleared once again (block 668) and the system prompts the teacher to insert a diskette in the diskette drive (blocks 670, 672). Striking the F1 key at this point displays help text (block 674–680). If the teacher depresses the ESC key, the routine is aborted (decision block 682, 684). If any other key is depressed, routine key 624 returns to FIG. 12 block 686, with the A or B drive designation selected (block 666).

Referring once again to FIG. 12, system 50 then determines the reason why the choose drive routine 624 was exited. If the reason was because the teacher depressed the ESC key at block 638, control returns to FIG. 11A block 620 with a null return string (decision block 686, 688). If, on the other hand, the teacher depressed the ESC key at FIG. 15 block 682, routine 624 is called again to permit choosing of another drive (decision block 690).

In the preferred embodiment, all files associated with a particular lesson are preferably collected within a common subdirectory. The teacher may create the subdirectory before initiating the FIG. 10 routine using conventional DOS utilities, or a conventional create directory routine may be included in the select file routine to permit the teacher to create a subdirectory on the file.

Figure 14A:
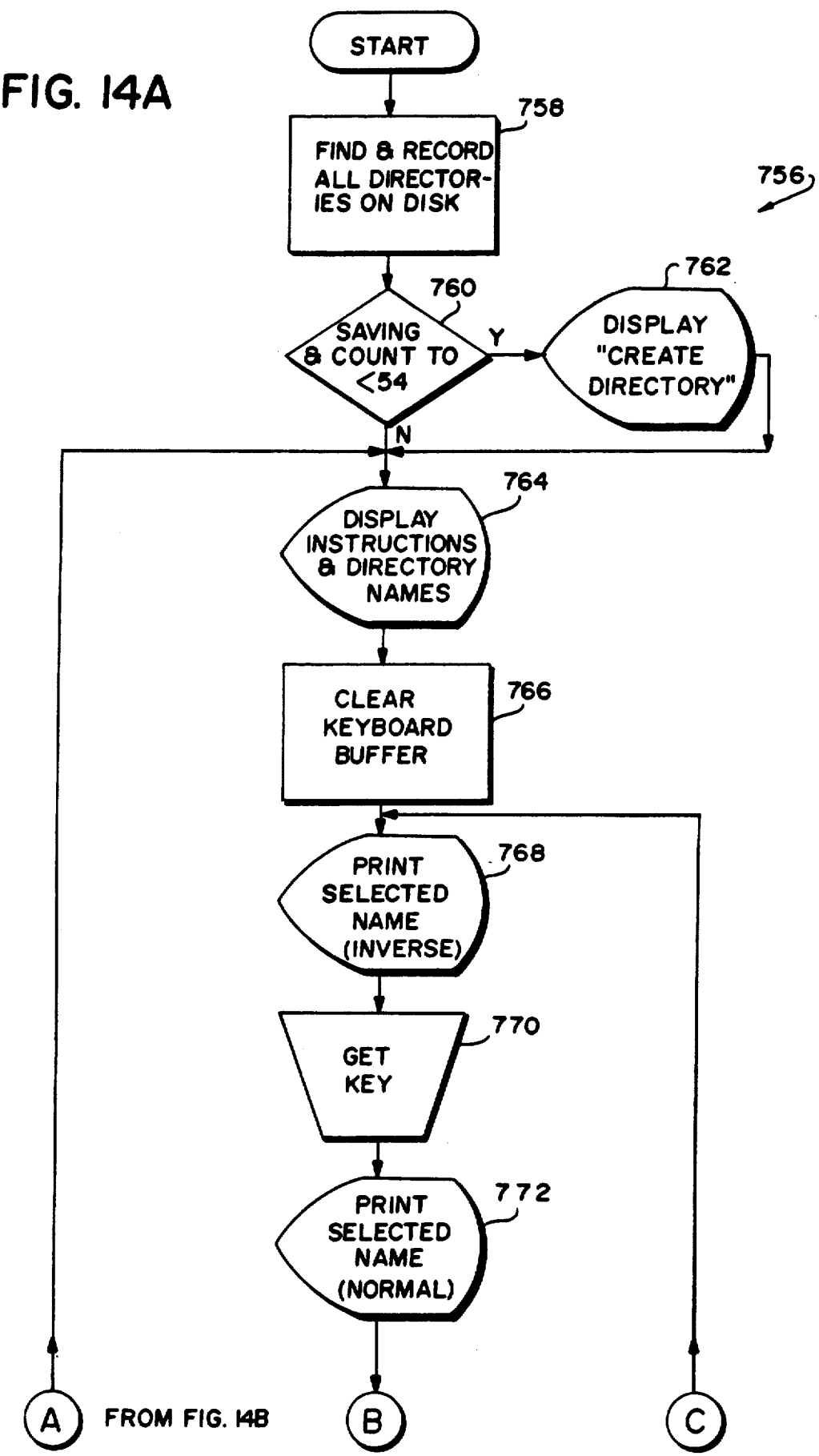
FIG. 14 is a schematic flow chart of exemplary program control steps performed by the "DIR MENU" routine shown in FIG. 12.
Figure 14B:
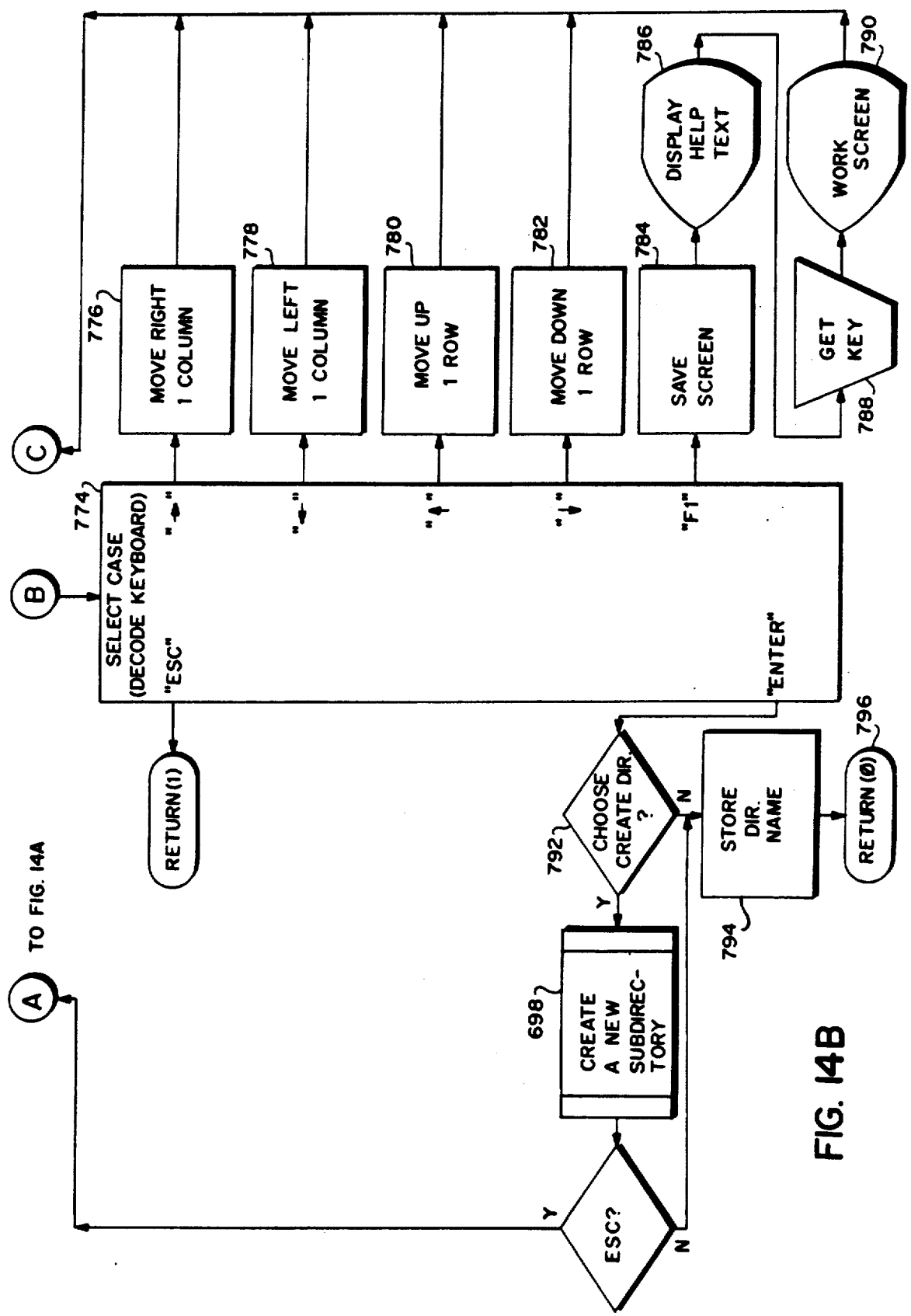

Once a valid subdirectory exists on mass storage device 56, system 50 permits the teacher to select between different subdirectories that may exist if multiple subdirectories exist. Specifically, the flag USEDIRS is set by system 50 whenever at least one user subdirectory exist on mass storage device 56 (block 746, 744). A flag CHDRIVES is set to eventually require the user to choose another drive using the choose drive routine 624 (blocks 748–752) if no valid subdirectory exists. Otherwise, the flag CHDIRS is set to 0 (block 752) and decision block 754 determines whether it is necessary for the teacher to select between user subdirectories (e.g., if more than one subdirectory exist). If subdirectory selection is required, a routine DIRMENU 756 is called to permit subdirectory selection. A detailed flow chart of this routine 756 is shown in FIG. 14.

The DIRMENU routine 756 first uses conventional DOS utilities to find and record all subdirectories on mass storage device 56 (block 758). This option is not available in Studio. The new lesson is always saved on a floppy disk (drive A). So long as additional subdirectories can be created, the teacher is given the option to create a new subdirectory for the new lesson (blocks 760, 762). Next, instructions and a list of all of the subdirectory names existing on mass storage device 56 are displayed (block 764), and system 50 then awaits user input (blocks 756–774). The cursor control keys are used to highlight different displayed subdirectory names in a conventional manner (blocks 776–782), and a conventional help facility is also provided (blocks 784–790). Upon depressing the ENTER key, system 50 determines whether selected the option to create a new subdirectory (decision block 792), and if so, may create a new subdirectory in an entirely conventional manner using the DOS "MKDIR" utility or the like. Otherwise, the subdirectory name is stored (block 794) and a return to routine 620 is performed (block 796).

The teacher may depress the ESC key at any time to select another drive or another diskette, (and thus call the choose drive routine 624) (decision block 798). Otherwise, the teacher is permitted to select between files within the selected subdirectory using the FILEMENU routine 804. A detailed schematic flow chart of the exemplary program control steps related to the FILEMENU routine 804 is shown in FIGS. 15A–15B.

Figure 15A:
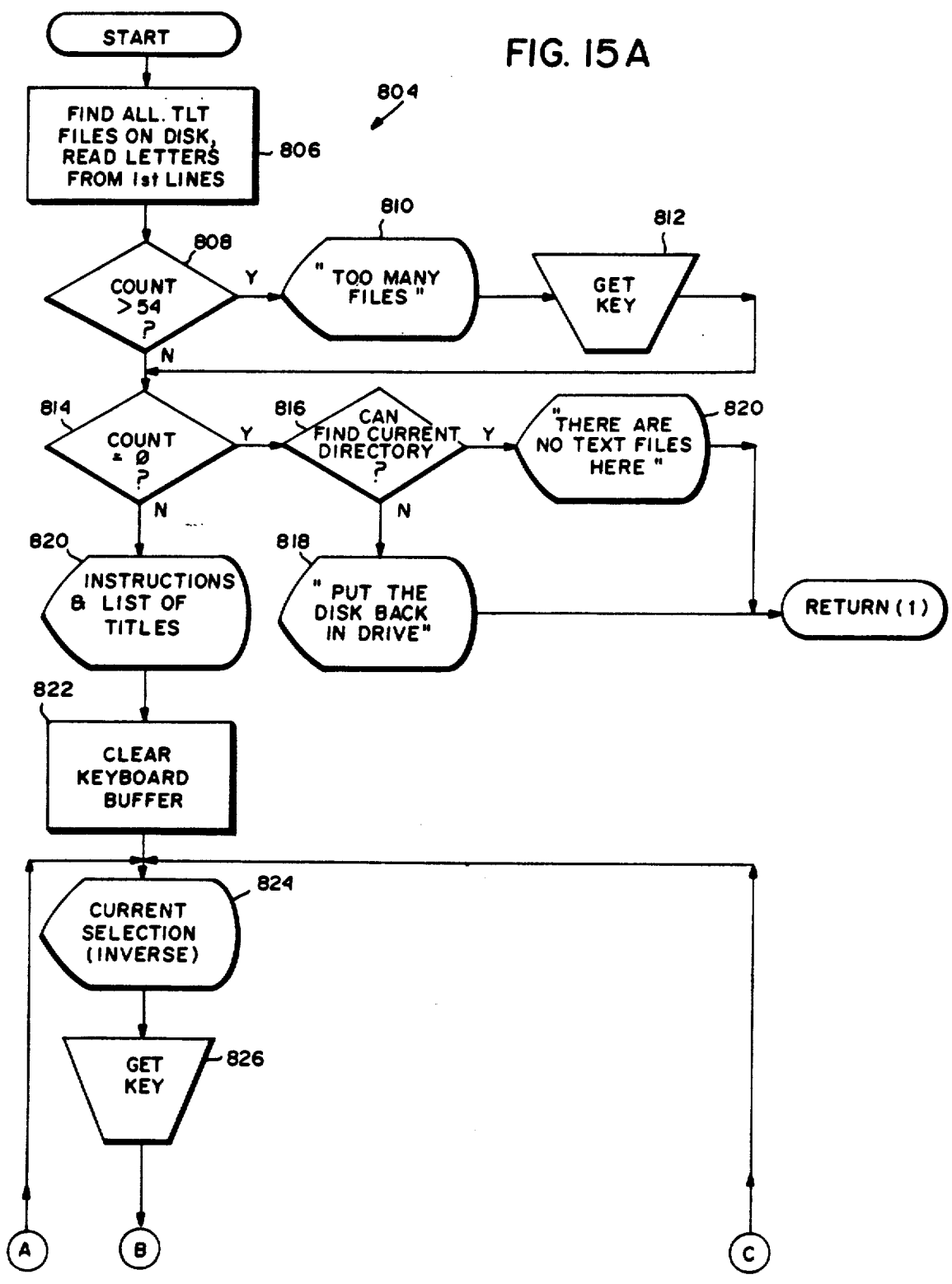
FIG. 15A-15B are together a schematic flow chart of exemplary program control steps performed by the FIG. 1 system to execute the "FILE MENU" routine shown in FIG. 12.
Figure 15B:
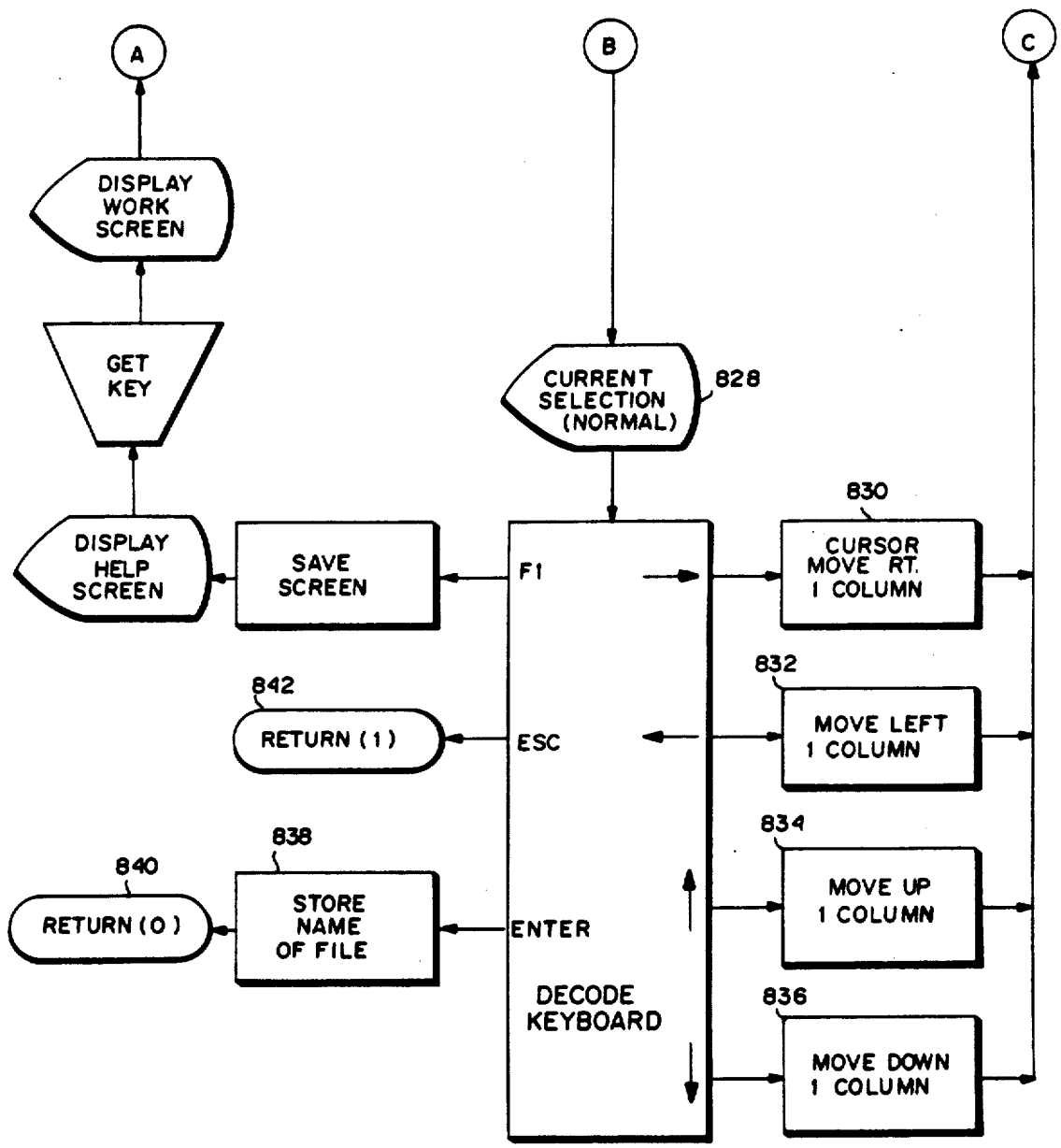

Referring now to FIG. 15A, routine 804 first scans the selected subdirectory (using conventional DOS utilities for all files having the extension ".tlt" (block 806). If more than the number of such files exist than will fit on the display, a warning message is displayed (block 808–812). If no such files exist, system 50 determines whether the teacher has mistakenly removed the diskette from the drive (block 814, 816) and if he has displays an error message (block 818). If no such files exist and the diskette is still within the drive, an error message indicating that no text files exist is displayed (block 820).

If decision block 814 determines that some ".tlt" files do exist, system 50 displays instructions and a list of the ".tlt" files (block 820) and then permits the teacher to select one of the listed files (blocks 822–828). By manipulating the cursor control keys, the teacher can highlight any selected file name displayed on display 58 (blocks 830–836), and may select the highlighted file by depressing the ENTER key (block 838, 840). Depressing the ESC key exits routine 804 without selecting a file name (block 842).

Referring now once again to FIG. 12, if the teacher failed to select a file name (determined by decision block 844), the flags are set appropriately (block 846) to permit the teacher to select another subdirectory (decision block 848, blocks 752, 756). Otherwise, the selected file name is returned at block 850 to FIG. 11A block 852.

FIG. 11A block 852 reads the text of the selected file and displays it on display 58 (blocks 852, 854). System 50 then prompts the teacher whether he wishes to accept the text (blocks 856, 858). If he does not accept the text, routine 620 is called again to permit him to select another file. Otherwise, the teacher is prompted to enter a new lesson title (block 860) and is asked whether he wishes to include a second page of help or instructions in the lesson (block 862, 864). If a page two screen is to be included, routine 620 is called to permit selection of the file containing the page two text and the teacher is given the opportunity to view and accept this page two text (blocks 866, 872). The second page need not necessarily be related to either the main page of text or the recorded speech—permitting great flexibility to the teacher in creating lesson formats. However, the page two screen typically is supplementary textual material or instructions which may be displayed by the student upon depressing a key.

Once both the main text screen and the page two text screens have been selected and accepted by the teacher, system 50 prompts the teacher to insert a data disk (block 874, 876) which should preferably be blank in the preferred embodiment to provide sufficient room (e.g., minimum 360K) for storing digitized speech corresponding to the lesson being created (blocks 878–884). System 50 in the preferred embodiment thus insists that a blank format is used for each lesson to ensure that recordings are transferred whole onto the diskette and thus decrease access time (by eliminating searches for different related speech files).

System 50 then displays once again the main text screen selected by routine 620 and accepted at blocks 856, 858 (block 886) and waits for the teacher to select a string of text on the display (blocks 888, 890). Briefly, in the preferred embodiment, the teacher first selects a phrase using the cursor control keys and then records digitized speech corresponding to the phrase using the F4 key. The teacher may re-record a given phrase if necessary. Depressing the ENTER key causes system 50 to move on to the next phrase. The "<" and ">" may be used to skip over displayed words the teacher does not wish to record. Each recorded phrase may be up to ten seconds long.

Blocks 892, 894 are used to skip over displayed words (so that not all words of the main text screen need to correspond to a recorded phrase). The left arrow and right arrow keys are used to lengthen and shorten the currently selected phrase, with the selected phrase being highlighted on the display to permit the teacher to see what phrase he has selected (blocks 896–902). Depressing the F3 key causes system 50 to determine whether a digitized speech file corresponding to the currently selected phrase has already been recorded (decision block 904). If one has been recorded, that recording can be played (block 906)—allowing the teacher to hear what he has recorded corresponding to the phrase. Depressing the F4 key allows the teacher to record (or re-record) up to ten seconds of digitized speech corresponding to the selected phrase (blocks 920–926). Once a phrase has been recorded, it is stored on the blank formatted diskette and the teacher is given an indication of the amount of free disk space remaining in seconds (blocks 928, 930). During recording, volume levels continuously displayed and recording time is also displayed in seconds. The teacher speaks into headset 62a microphone (or separate microphone 62b), and speech processor 60 converts his spoken speech into digitized data which is stored in the virtual disk of personal computer 52. Once the teacher again depresses the space bar (or there is a time out) (decision block 924), the stored information stored in the virtual disk is transferred to the floppy diskette or hard disk. This procedure greatly increases sound quality because final storage is not to take place on an interrupt driven basis.

In the preferred embodiment, each digitized speech phrase is provided with a unique name. Specifically, each digitized phrase file is automatically numbered in the preferred embodiment with sequentially ascending numbers (e.g., text1.SO, text2.SO, etc.) and the start and end of each text phrase is flagged in the main text file corresponding to the lesson. For example, a character sequence such as "textstart(1)" may be added to the text file at the point the teacher marked as corresponding to the first recorded phrase, and a character sequence such as "textend(1)" may be added to the text file at the point the teacher selected as the end of the corresponding text phrase. In this way, a linkage is established between teacher-selected text strings within the main text file and discrete files stored mass storage device 56 containing corresponding digitized text—with a one-to-one correspondence generally existing between text strings and digitized sound files in the preferred embodiment. The backspace key allows the teacher to easily move to a previously recorded phrase in order to re-record it or the like (block 932, 934). Depressing the ENTER key causes system 50 to go on to the next phrase if the previous phrase has been recorded (decision block 936)—or if all phrases have been recorded, to move on to block 938 (which permits the teacher to listen to the entire recorded speech on an uninterrupted basis or to depress the enter key to save the lesson (see blocks 940–944).

Finally, now that the teacher has stored the lesson he can preprogram which of the student functions will be available to the students for a particular lesson. In the preferred embodiment, the AudioLab function is always available to the student. However, certain exercises may not be suitable for the SoundSort or AudioWrite function. At block 946, system 50 prompts the teacher to choose student functions that should be available to students and to delete functions that should not be available to the student. Blocks 950-958 result in displaying the same main menu seen by the student and permitting the teacher to delete one or both of the AudioWrite or SoundSort options or to undelete those options (blocks 956, 954, respectively). Depressing the ENTER key saves the student selection data (block 958) and returns control to FIG. 11A block 602 to permit the teacher to either exit the studio routine or to work on creating another lesson.

The present invention thus provides an extremely flexible environment for creating preprogrammed audio visual lessons in which both the audio portion and the textual portion can be programmed by the teacher. Once lessons have been constructed in this fashion, they can be used by the student in a variety of different ways to develop different skills. For example, the Audiolab student function works on reading and listening comprehension; the AudioWrite function concentrates on listening, comprehension and writing skills; while the sound functions concentrates on listening, comprehension, grammatical and other skills. Since the same lesson can be used for various functions, the burden on the teacher is eased, while great flexibility is maintained. All of these features are provided by a truly interactive language learning system in which the student is exposed to both audio and visual stimuli and is capable of either listening to recorded model digitized speech and/or to his own attempts to pronounce the speech using self-correction methodology.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An interactive language learning system comprising:
   storing means for storing a digitized speech version of a passage of language and for also storing a digital data textual version of said same passage;
   a display for displaying text corresponding to said passage;
   selecting means operatively connected to said display and to said storing means and operable by a user for selecting a portion of said passage, and for causing the portion of said stored digital data textual version corresponding to said selected passage portion to be displayed as text on said display; and
   speech processing means for:
      selecting the portion of said stored digitized speech version corresponding to said selected portion of said passage,
      converting said selected digitized speech version portion to audio signals for use in generating speech sounds,
      converting audio signals representing user speech into digitized speech signals representing said user speech, and
      subsequently reconverting said digitized speech signals representing said user speech to audio signals for use in generating further speech sounds so as to permit said user to listen to and compare his own speech with a spoken version of said passage corresponding to said stored digitized speech version.

2. A system as in claim 1 wherein:
   said system further includes a transducer which converts user speech to audio signals;
   said speech processing means includes means connected to said transducer for converting said audio signals to digitized speech signals and for temporarily storing said digitized speech signals;
   said display also displays a symbol; and
   said system further includes user input means for permitting said user to (i) select said portion of said passage by manipulating the position of said symbol displayed by said display with respect to said displayed text, and (ii) control said speech processing means to rapidly alternate (a) converting said temporarily stored digitized speech signals representing his own speech to audio signals, and (b) converting said digitized speech signals corresponding to said selected portion of said passage to audio signals so as to alternately generate sounds corresponding to said user's speech and sounds corresponding to said stored digitized speech version.

3. A system as in claim 1 wherein:
   said speech processing means generates processor interrupts; and
   said system further includes interrupt means for reading said digitized speech version from said storing means for conversion to audio signals by said speech processing means in response to said generated processor interrupts.

4. A system as in claim 1 wherein:
   said selecting means includes means for selecting the position and length of a portion of said passage;
   said speech processing means includes further selecting means for selecting only those portions of said stored digitized speech version corresponding to said selected passage portion; and
   said speech processing means also includes means for converting only said selected stored digitized speech version portions to audio signals.

5. A system as in claim 1 wherein said first-mentioned selecting means comprises cursor control means manipulable by said user for selecting portions of said text displayed by said display and for thereby selecting corresponding portions of said stored digitized speech version for conversion to audio signals.

6. A system as in claim 5 further including means connected to said cursor control means and to said display for causing said selected text portions displayed by said display to have a different displayed appearance than the non-selected displayed text portions.

7. A system as in claim 5 wherein said system further includes text display selection means, manipulable by said user and operatively connected to said display, for alternately selecting: (a) display of only said selected text portions, and (b) display of the entire textual version of said passage including said selected text portion.

8. A system as in claim 1 wherein said speech processing means includes means for converting between audio signals and adaptive differential pulse code modulation encoded digitized speech signals representing said audio signals.

9. An interactive language learning system comprising:
- means for providing digitized speech signals representing a sequence of spoken phrases having an initial order;
- re-ordering means connected to said providing means for re-ordering said plural phrases into a sequence having an order different from said initial order;
- symbol display means connected to said re-ordering means for associating a symbol with each of said plural phrases and for presenting a display of said symbols in said re-ordered sequence;
- input means operatively connected to said re-ordering means and operable by a user for permitting said user to further re-order said plural phrases into a still further order and to thus change the order in which said symbols are presented by said symbol display means;
- speech processing means connected to said providing means and to said re-ordering means for converting said digitized speech signals to audio speech signals in said re-ordered sequence so as to generate spoken versions of said phrases in said re-ordered sequence; and
- testing means connected to said input means for comparing the user-selected re-ordered sequence with said initial order.

10. A system as in claim 9 wherein:
- said input means includes means for selecting any one of said symbols; and
- said speech processing means is also connected to said user input means and to said symbol display means and includes means for converting the stored digitized speech associated with said selected symbol to audio signals.

11. A system as in claim 9 wherein:
- said symbol display means includes:
  - a left-hand display column which displays said symbols in said first-mentioned re-ordered sequence, and
  - a right-hand display column which displays said symbols in said user-specified further order; and
- said input means includes means for moving said symbols from said left-hand display column to said right-hand display column in response to user commands.

12. A system as in claim 11 wherein said speech processing means is also connected to said user input means and includes means for generating sounds corresponding to said phrases in said initial order.

13. A system as in claim 9 wherein said speech processing means is also connected to said user input means and includes means for selecting a starting point within said re-ordered sequence, said selected starting point being different from the beginning of said sequence, and for converting said corresponding digitized speech signals to audio signals in said initial order of said phrases beginning from said starting point so as to provide audible speech corresponding to less than said entire sequence of phrases.

14. An interactive language lesson composing system comprising:
- user input means for inputting characters in response to user manipulation thereof;
- display means for displaying said inputted characters;
- storing means for storing digital data;
- word processing means connected to said user input means, said display means and said storing means, for permitting said user to input and edit a main text display format, for causing said storing means to store said main text display format, for permitting said user to input and edit a secondary text display format, and for causing said storing means to store said secondary text display format;
- selecting means connected to said user input means, said display means and said storing means for permitting said user to select plural portions of said main text display format; and
- speech processing means connected to receive an audio signal for converting said audio signal to digitized speech and for causing said storing means to store said digitized speech in discrete segments, each of said discrete segments being associated with a different one of said plural selected main text display format portions.

15. An interactive language learning system comprising:
- user input means for inputting characters in response to user manipulation thereof;
- display means for displaying said inputted characters;
- storing means for storing digitized speech corresponding to a text passage and for also storing a textual version of said text passage;
- speech processing means connected to said storing means for converting said digitized speech to audio signals; and
- comparing means connected to said input means for comparing said user inputted characters to said stored textual version of said text passage.

16. A system as in claim 15 further including means responsive to said stored text passage and to said input means and also connected to said display means for:
- controlling said display means to display only those user inputted characters which said comparing means reveals correspond to the characters of said stored text passage and to also display punctuation and spaces found in said stored text passage so as to relieve said user from having to input said punctuation and spaces.

17. An interactive language learning system comprising:
- means for providing digitized speech signals representing a sequence of spoken phrases having an initial order;
- re-ordering means connected to said providing means for re-ordering said plural phrases into a sequence having an order different from said initial order;
- user input means operatively connected to said re-ordering means and operable by a user for permitting said user to further re-order said plural phrases into a user-specified order; and
- speech processing means, connected to said providing means and to said re-ordering means and responsive to said digitized speech signals, for generating audible versions of said phrases so as to provide audible cues to said user.

18. An interactive language learning system as in claim 17 further including a display for displaying symbols representing said plural phrases in at least said user-specified order.

19. An interactive language learning system comprising:

random access storing means for storing digitized speech signals representing a sequence of plural speech phonemes;

display means for displaying the text corresponding to said plural phonemes;

user input means, operatively connected to said storing means and to said display means and operable by a user, for permitting said user to specify a subsequence of said speech phoneme sequence by delimiting corresponding text; and speech processing means, connected to said storing means and to said user input means and responsive to said stored digitized speech signals, for generating audible versions of phonemes in said user-specified sub-sequence.

20. An interactive language learning system as in claim 19 further including:

means for converting audio signals representing user speech into digitized speech signals representing said user speech and for subsequently reconverting said speech signals representing said user speech to audio signals so as to permit said user to listen to and compare his own speech with said audible versions of phonemes in said user-specified sub-sequence.

21. An interactive language learning system as in claim 19 wherein said user input means includes pointing symbol means operatively coupled to said display means for causing at least one pointing symbol to be displayed on said display at a position relative to said displayed test that is specified by said user, said pointing symbol means indicating said specified sub-sequence.

22. An interactive language learning system comprising:

a storage device which stores digitized speech signals representing a sequence of speech phrases;

a display capable of displaying symbols corresponding to said phrases;

a user input device operatively connected to said storing means and to said display means and operable by a user;

a speech processing circuit, connected to said storage device and to said user input device and responsive to said stored digitized speech signals, said speech processing circuit generating audible versions of said phrases in response to said digitized speech signals, said speech processing circuit also converting user speech into further digitized speech signals and generating audible versions of said user speech in response to said further digitized speech signals; and a processor operatively coupled to said display, said user input device and said speech processing circuit, said processor being preprogrammed so as to selectively perform at least the following functions:

(a) a lab function in which said processor controls said speech processing circuit to alternately generate audible versions of said stored digitized speech signals and said further user-speech digitized speech signals so as to permit the user to compare his own pronunciation with the pronunciation specified by said stored digitized speech signals, (b) a clip function in which said processor permits said user to specify subsequences of said speech phrases sequence and controls said speech processing circuit to generate an audible version of said subsequences, and (c) a sound sort function in which said processor controls said display to present said symbols in an order different from the order specified by said sequence, permits said user to re-order said presented symbols, and controls said speech processing circuit to generate audible versions of said phrases.

23. An interactive language learning system as in claim 22 wherein said processor in said clip function controls said speech processing circuit to alternately generate audible versions of said stored digitized speech signals and said further user-speech digitized speech signals so as to permit said user to listen to and compare his own speech with said audible versions of said user-specified sub-sequence.

24. An interactive language learning system as in claim 22 wherein said processor in said sound sort function permits said user to compare said re-ordered sequence with said initial order specified by said sequence.

25. An interactive language learning system comprising:

a storage device which stores digitized speech signals representing a sequence of speech phrases;

a display capable of displaying symbols corresponding to said phrases;

a user input device operatively connected to said storing means and to said display means and operable by a user;

a speech processing circuit, connected to said storage device and to said user input device and responsive to said stored digitized speech signals, said speech processing circuit generating audible versions of said phrases in response to said digitized speech signals, said speech processing circuit also converting user speech into further digitized speech signals and generating audible versions of said user speech in response to said further digitized speech signals; and a data processor including the following:

means for controlling said speech processing circuit to alternately generate audible versions of said stored digitized speech signals and said further user-speech digitized speech signals so as to permit the user to compare his own pronunciation with the pronunciation specified by said stored digitized speech signals, means for permitting said user to specify subsequences of said speech phrases sequence and for controlling said speech processing circuit to generate an audible version of said subsequences, and means for controlling said display to present said symbols in an order different from the order specified by an initial sequence, for permitting said user to re-order said presented symbols, for controlling said speech processing circuit to generate audible versions of said phrases, and for permitting said user to audibly and/or visually compare said re-ordered sequence with said initial sequence.

* * * * *